United States Patent [19]

Umeyama et al.

[11] Patent Number: 5,490,015
[45] Date of Patent: Feb. 6, 1996

[54] ACTUATOR APPARATUS

[75] Inventors: Koichi Umeyama, Kasukabe; Tatsuya Yamaguchi, Tokyo; Yasuhiro Ueda, Tokyo; Sakae Takehana, Tokyo; Hiroki Moriyama, Yokahama; Kazuhiro Yoshida; Yutaka Fujisawa, both of Tokyo; Ichiro Takahashi, Shirakawa; Masami Hamada, Tokyo; Keiichi Arai, Tokyo; Yutaka Tatsuno, Tokyo; Kenji Yoshino, Tokyo; Tomoki Funakubo, Tokyo, all of Japan

[73] Assignee: Olympus Optical Co., Ltd., Tokyo, Japan

[21] Appl. No.: 184,246

[22] Filed: Jan. 19, 1994

[30] Foreign Application Priority Data

| Mar. 4, 1993 | [JP] | Japan | 5-044140 |
| Apr. 27, 1993 | [JP] | Japan | 5-101372 |
| Apr. 27, 1993 | [JP] | Japan | 5-101374 |
| Apr. 27, 1993 | [JP] | Japan | 5-101448 |
| Apr. 27, 1993 | [JP] | Japan | 5-101449 |
| Jun. 21, 1993 | [JP] | Japan | 5-149460 |
| Oct. 8, 1993 | [JP] | Japan | 5-253354 |

[51] Int. Cl.[6] ........................ G02B 7/02
[52] U.S. Cl. ................ 359/824; 359/813; 359/826
[58] Field of Search ................ 359/823, 824, 359/826, 811, 813, 224, 230, 579; 128/4, 6; 385/33, 25, 26; 310/328, 320

[56] References Cited

U.S. PATENT DOCUMENTS

| 4,640,579 | 2/1987 | Takizawa | 359/826 |
| 4,660,941 | 4/1987 | Hattori et al. | 359/224 |
| 4,894,579 | 1/1990 | Higuchi et al. | 310/328 |
| 5,191,879 | 3/1993 | Krauter | 359/826 |
| 5,225,941 | 7/1993 | Saito et al. | 359/824 |
| 5,302,812 | 4/1994 | Li et al. | 359/824 |

FOREIGN PATENT DOCUMENTS

| 4-63309 | 2/1992 | Japan |
| 4-69071 | 3/1992 | Japan |
| 4-177214 | 6/1992 | Japan |

*Primary Examiner*—Loha Ben
*Attorney, Agent, or Firm*—Frishauf, Holtz, Goodman, Langer & Chick

[57] ABSTRACT

An actuator apparatus for driving a focus adjusting lens of a focus adjusting mechanism of an endoscope comprises a moving member put in slidable frictional engagement with a base of the endoscope, the moving member having coupling means for coupling with the movable portion within the endoscope, a piezoelectric element coupled to the moving member, the piezoelectric element and the moving member alone constituting a body of the actuator apparatus, and actuator control circuit for causing quick deformation in the piezoelectric element, enabling the piezoelectric element to apply an impulse force to the moving member, thereby moving the moving member against a frictional engagement force acting between the base and the moving member.

34 Claims, 28 Drawing Sheets

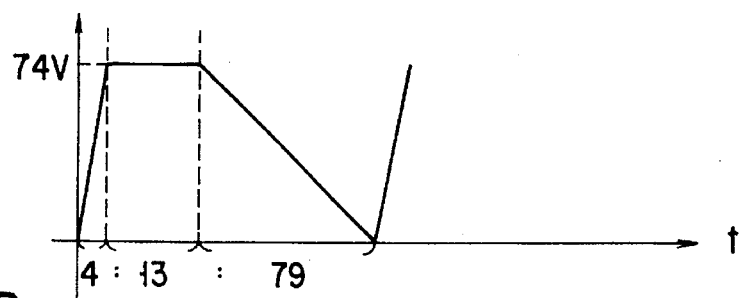
F I G. 6B
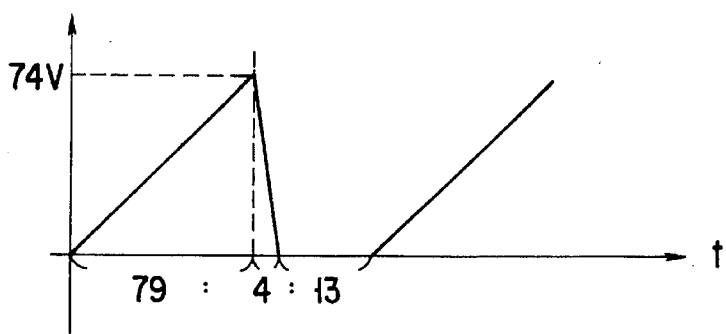
F I G. 6C
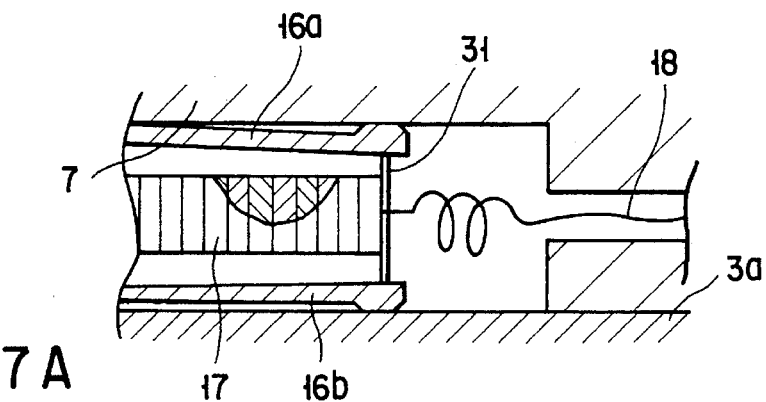
F I G. 7A
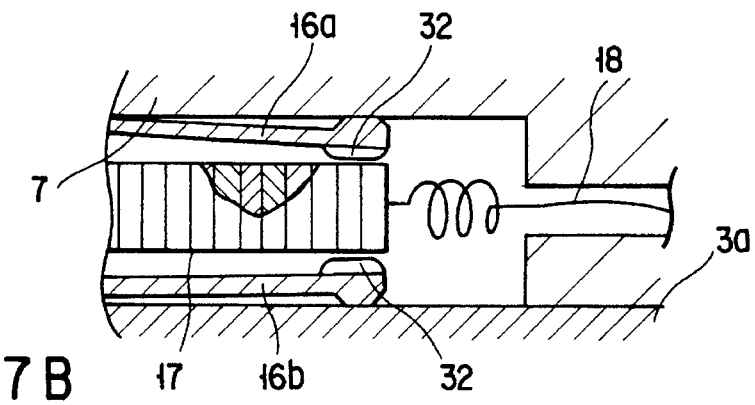
F I G. 7B

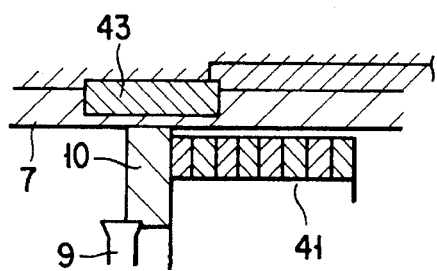
F I G. 11A
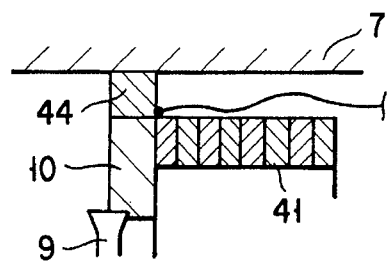
F I G. 11B
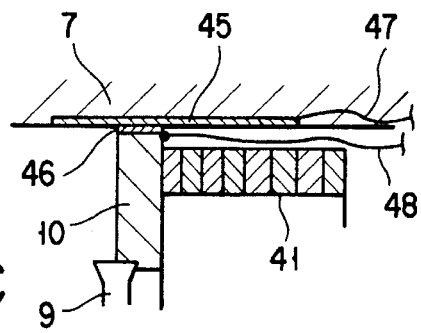
F I G. 11C
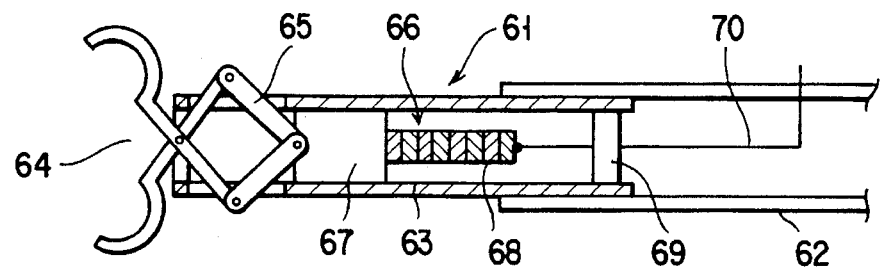
F I G. 12
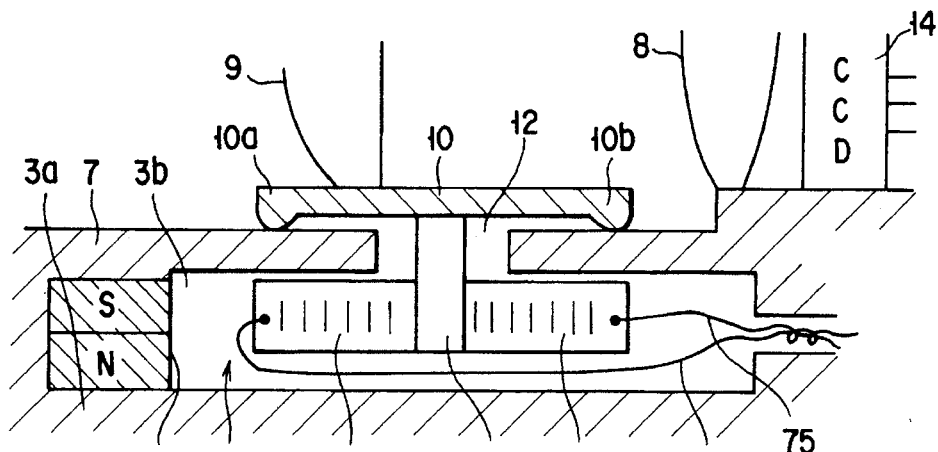
F I G. 13

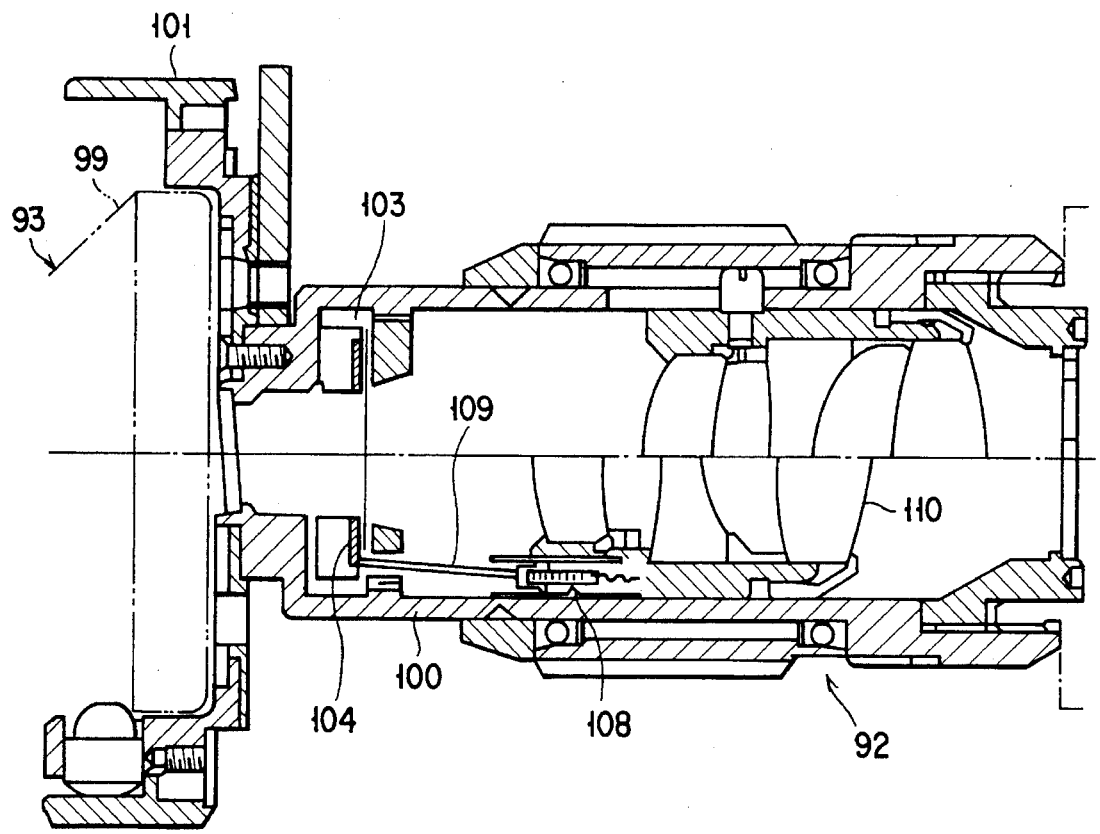
F I G. 20
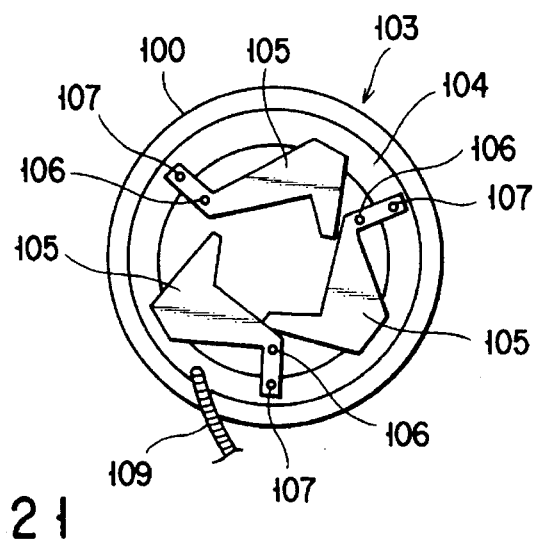
F I G. 21

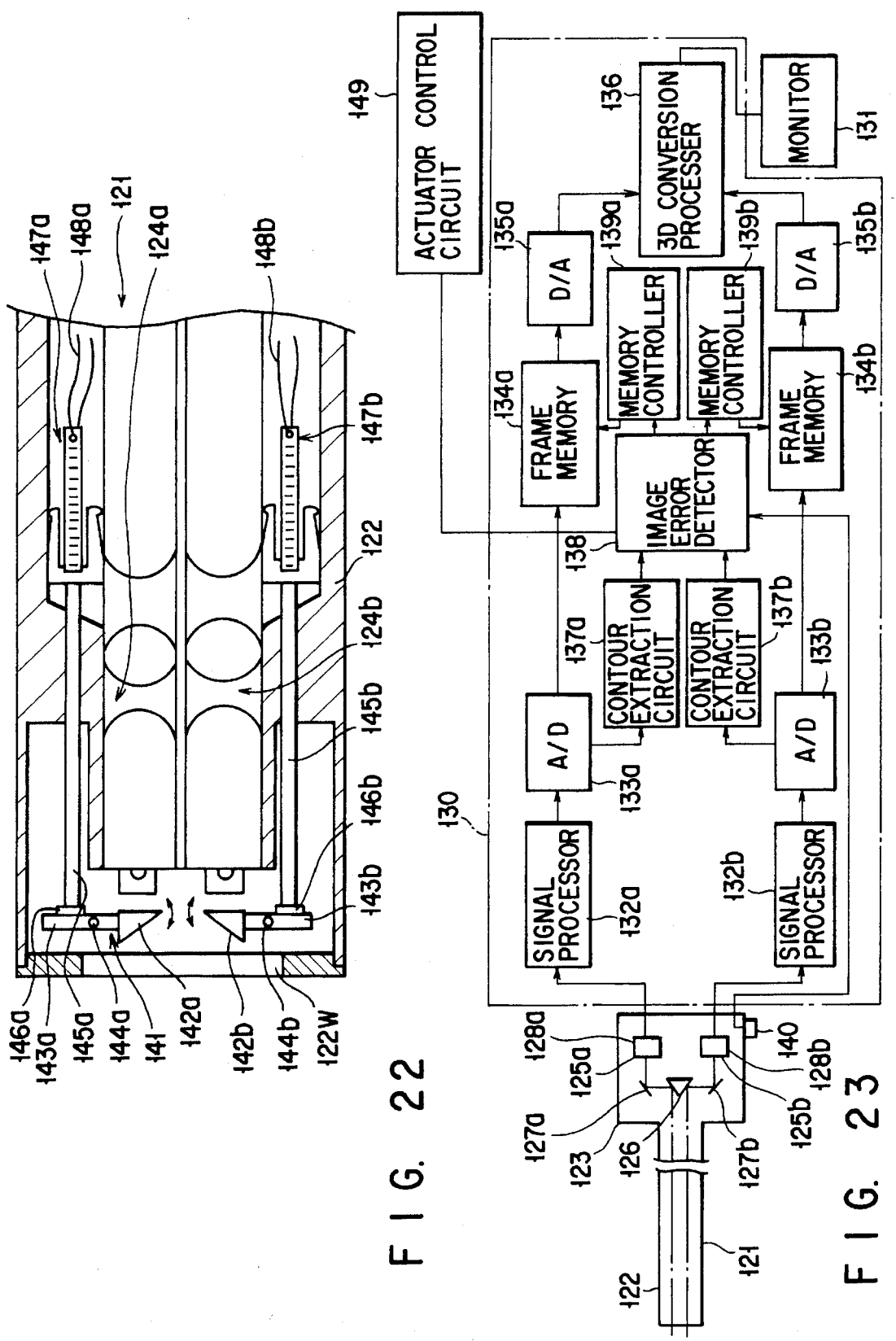
F I G. 22
F I G. 23

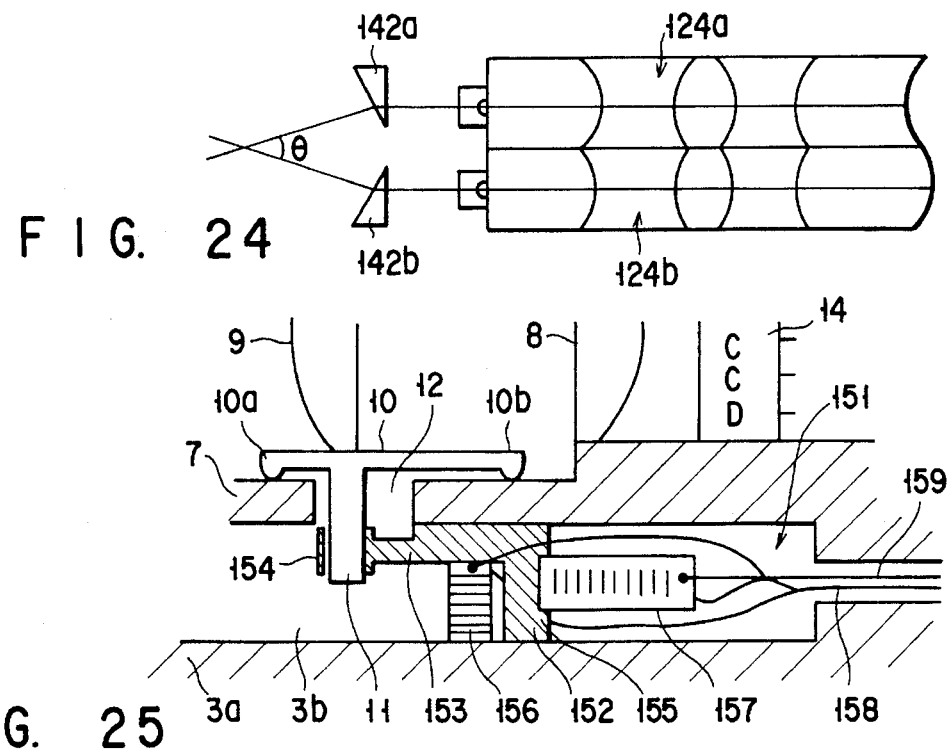
FIG. 24
FIG. 25
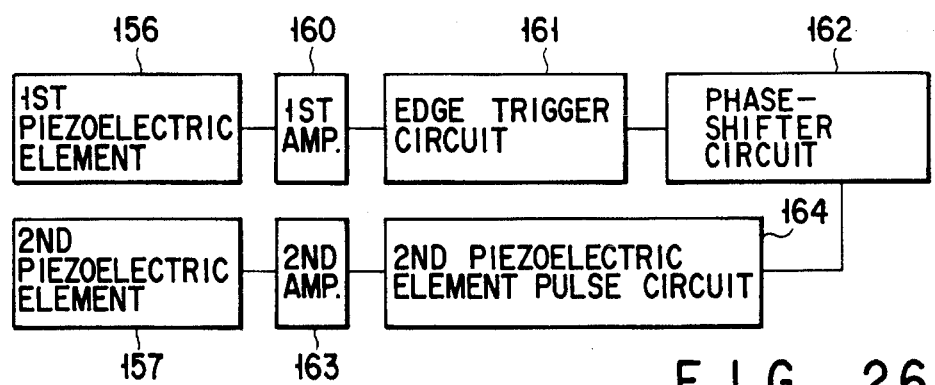
FIG. 26
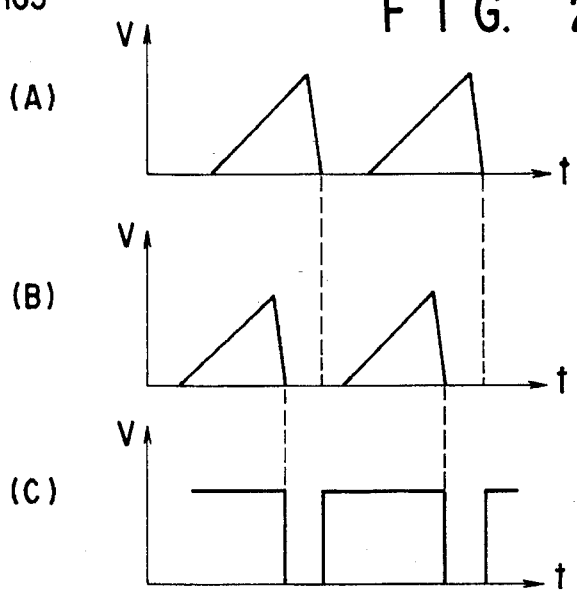
FIG. 27

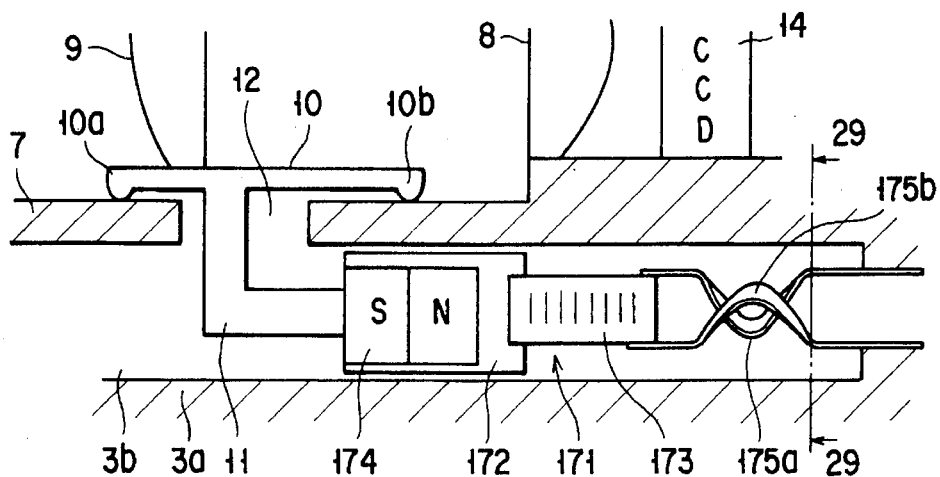
F I G. 28
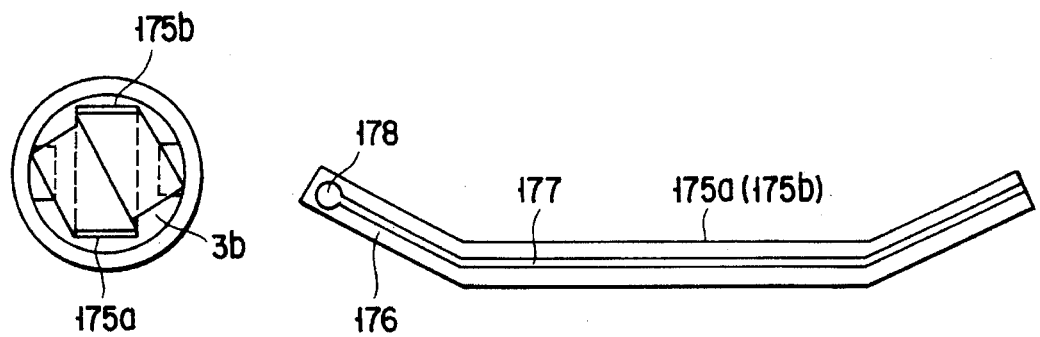
F I G. 29   F I G. 30
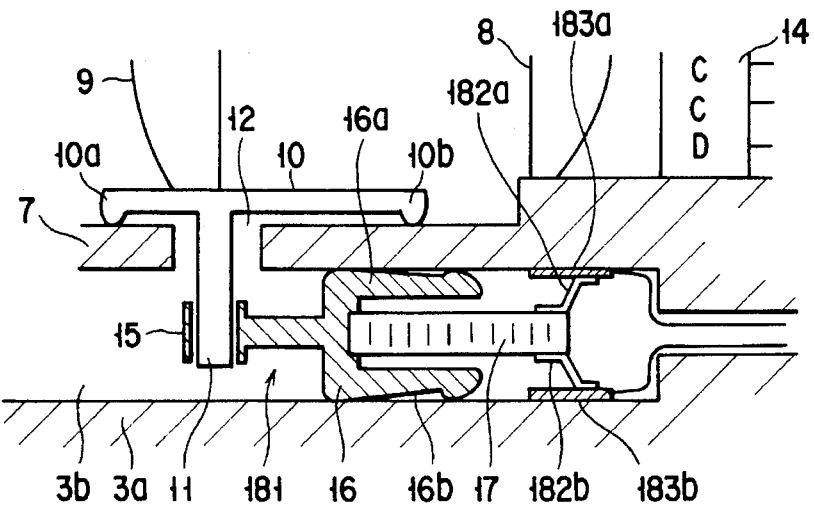
F I G. 31

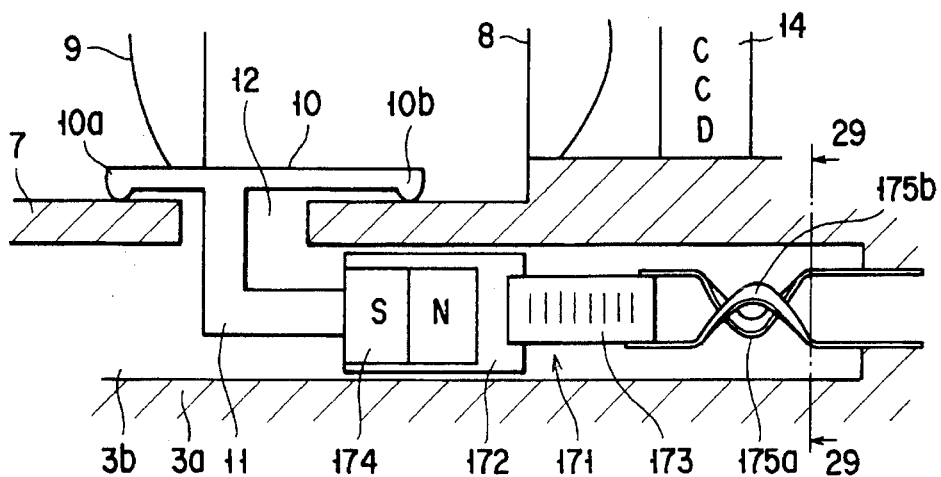
FIG. 28
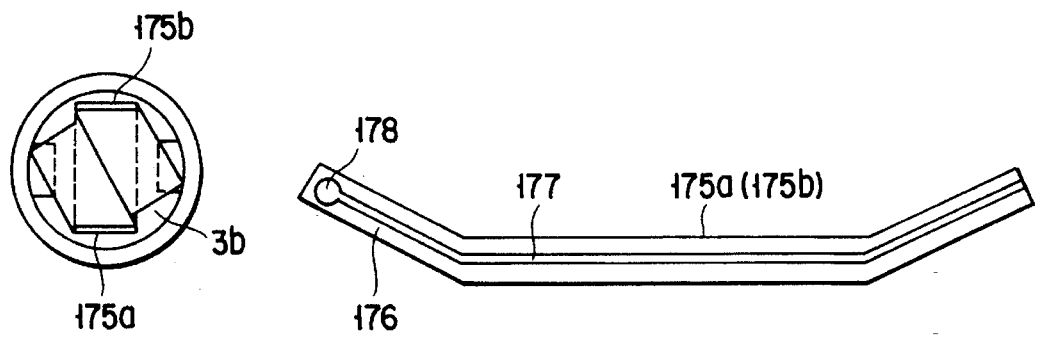
FIG. 29
FIG. 30
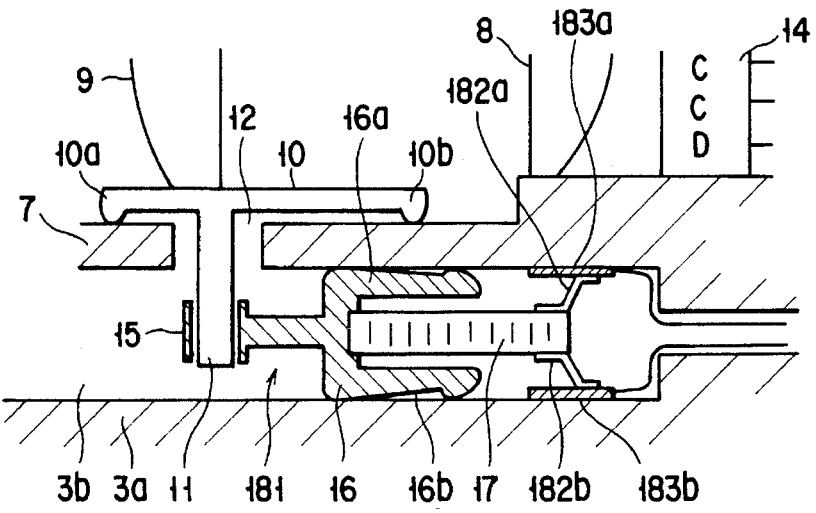
FIG. 31

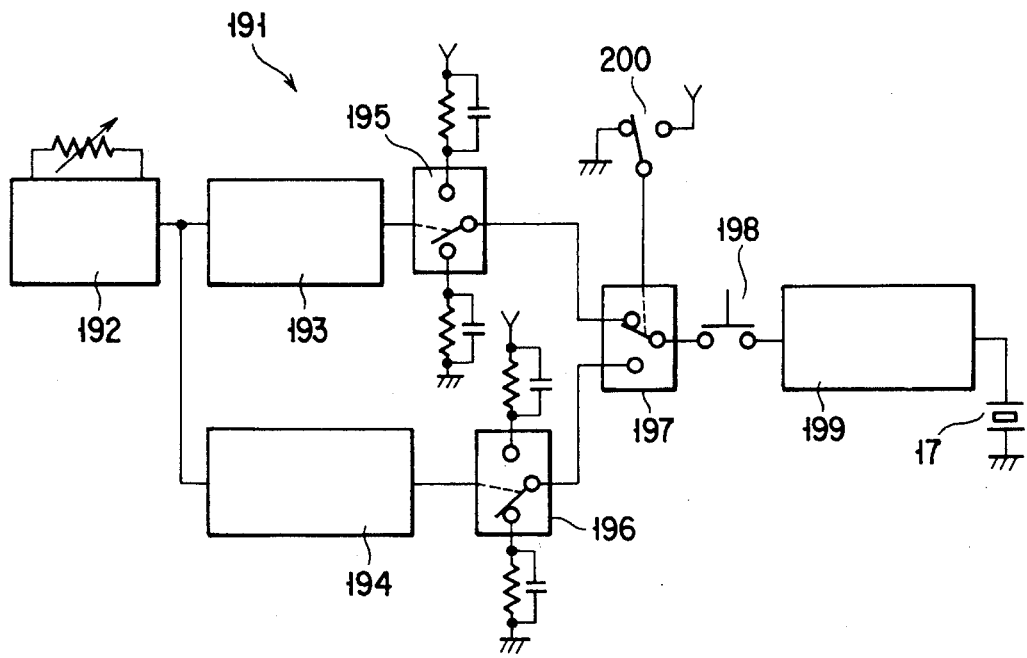
F I G. 32
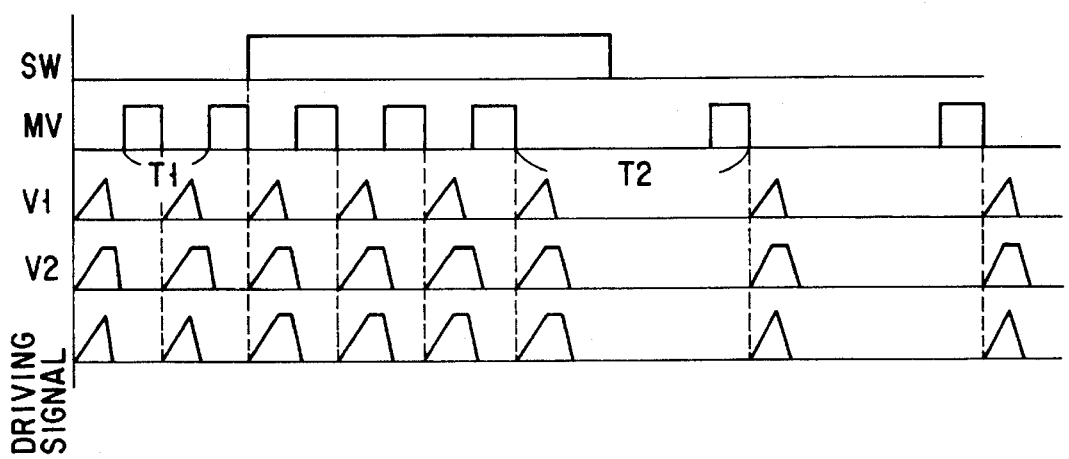
F I G. 33

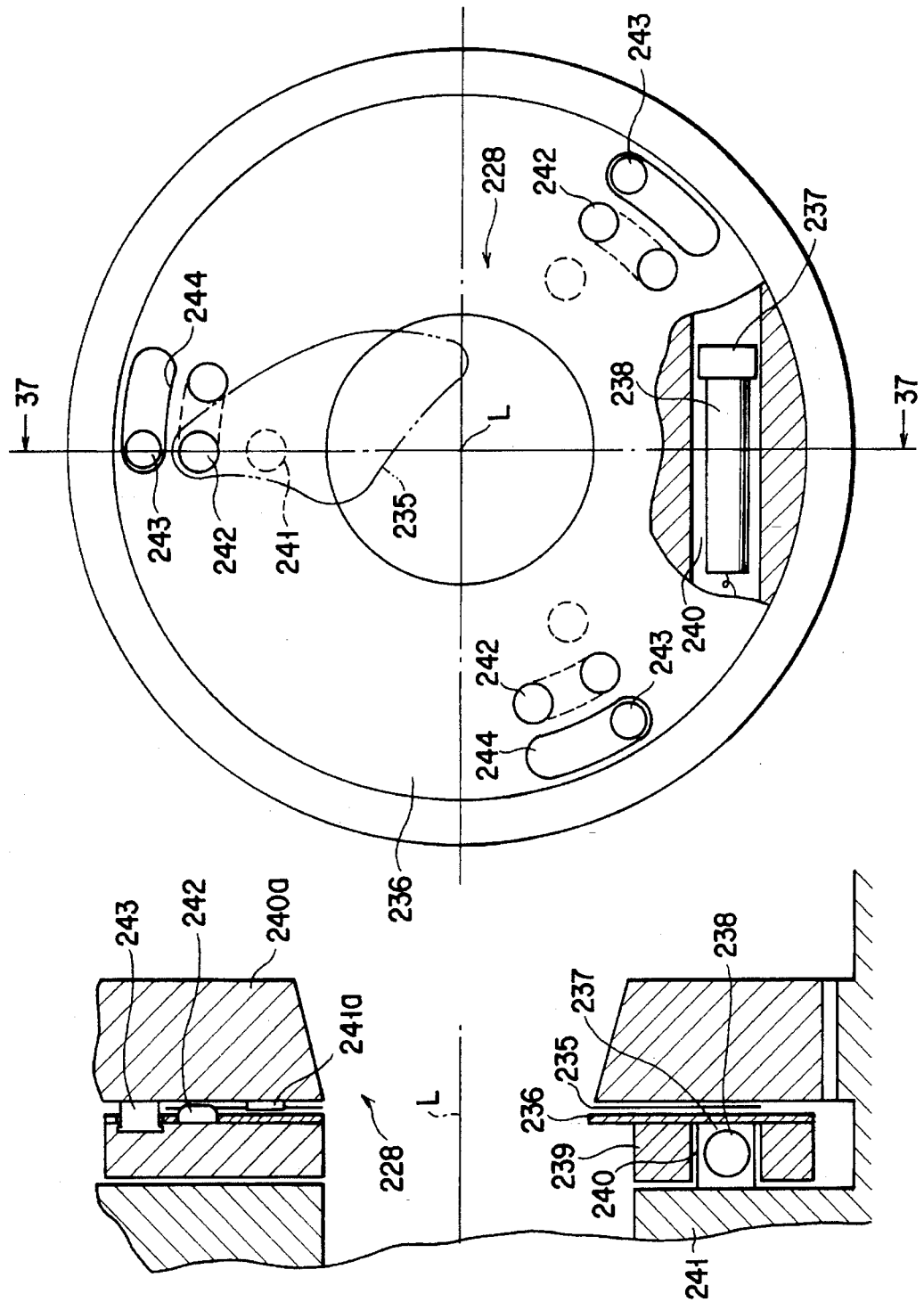

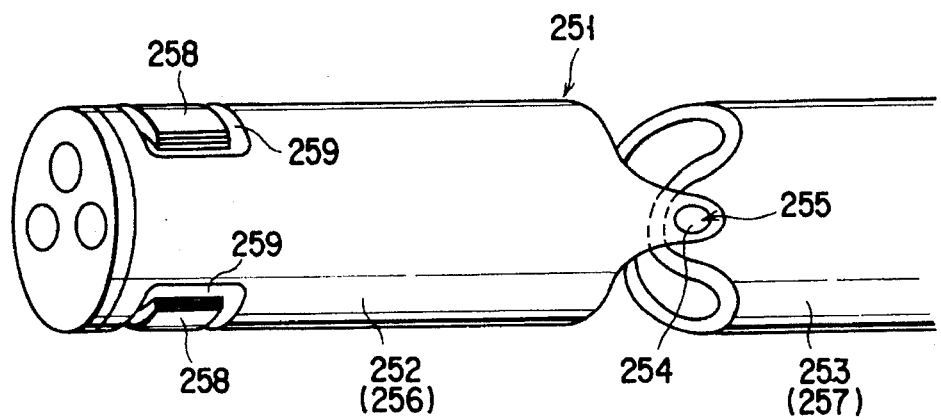
F I G. 41
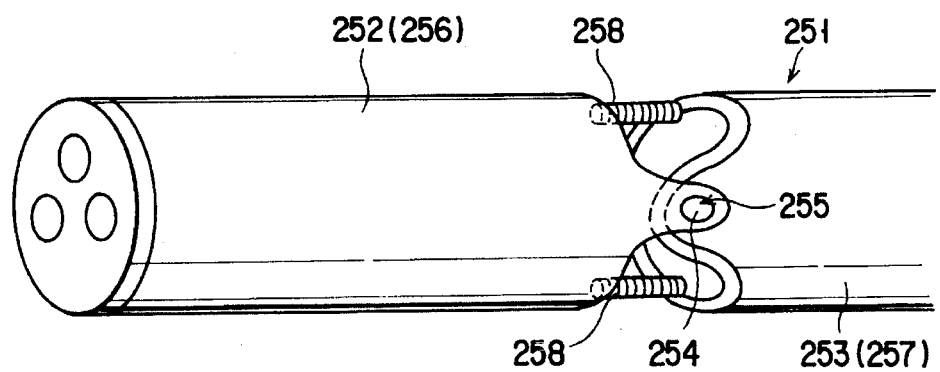
F I G. 42
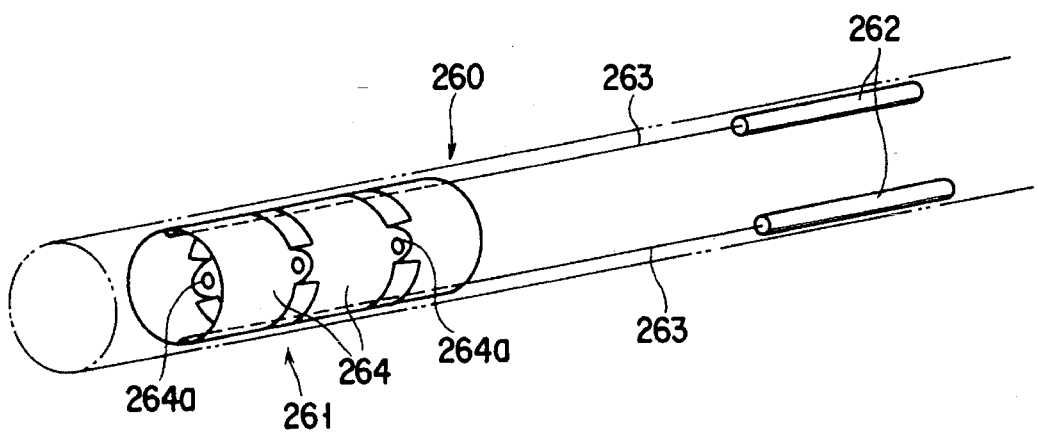
F I G. 43

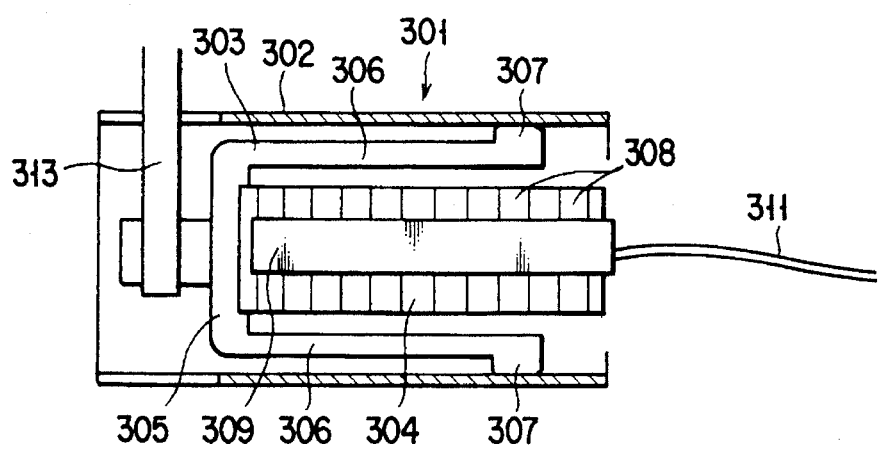
F I G. 48
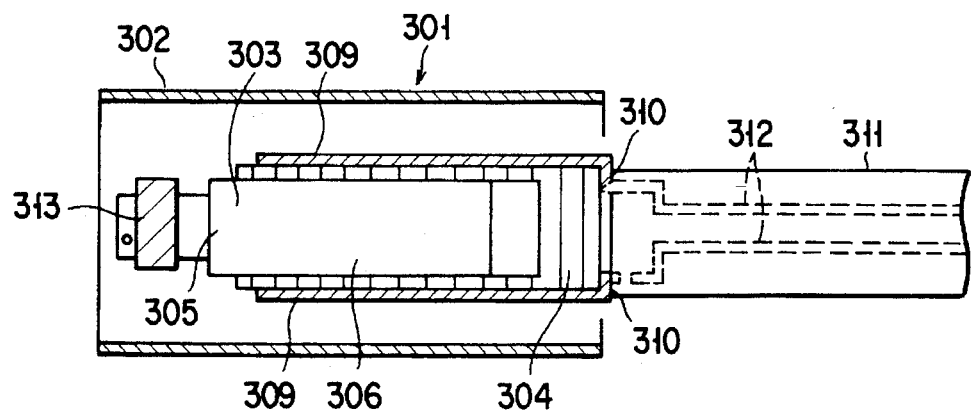
F I G. 49
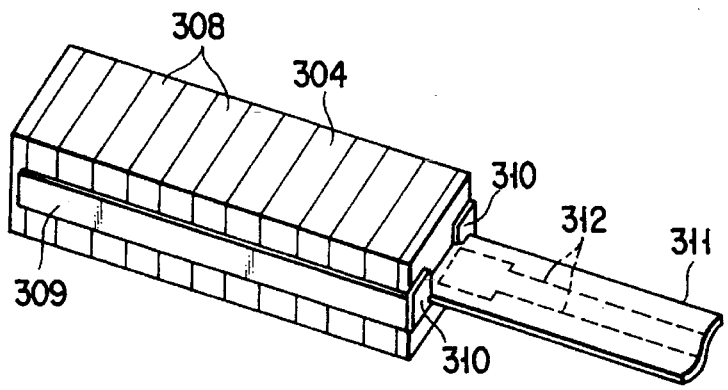
F I G. 50

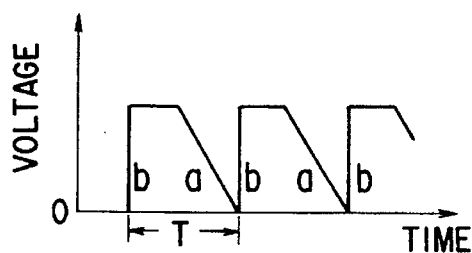
FIG. 51
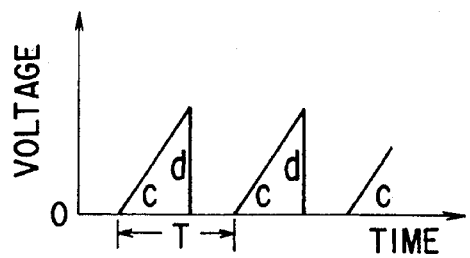
FIG. 52
FIG. 53
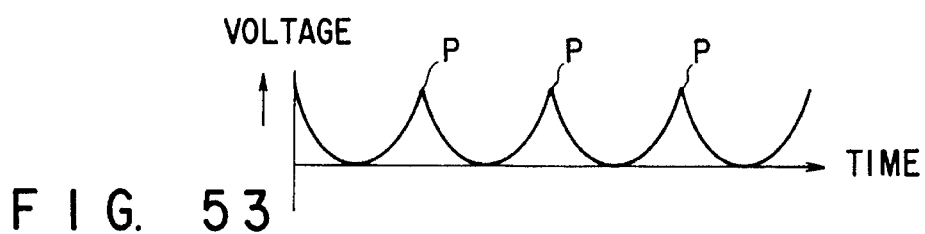
FIG. 54
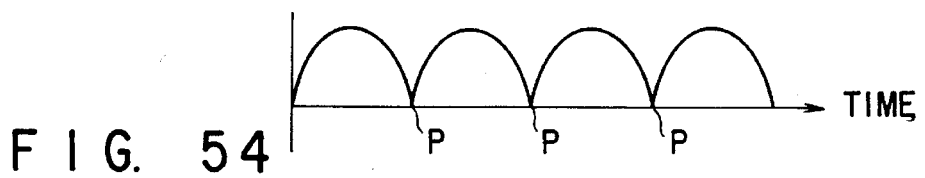
FIG. 55
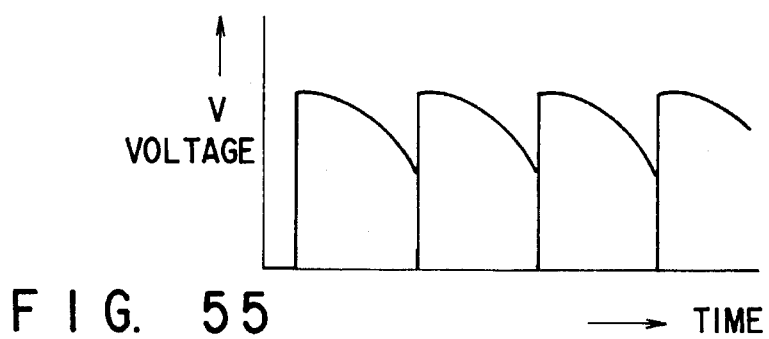
FIG. 56
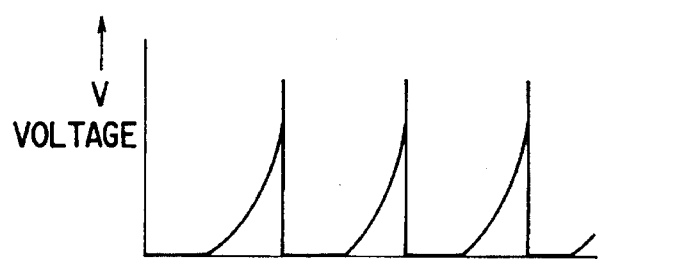

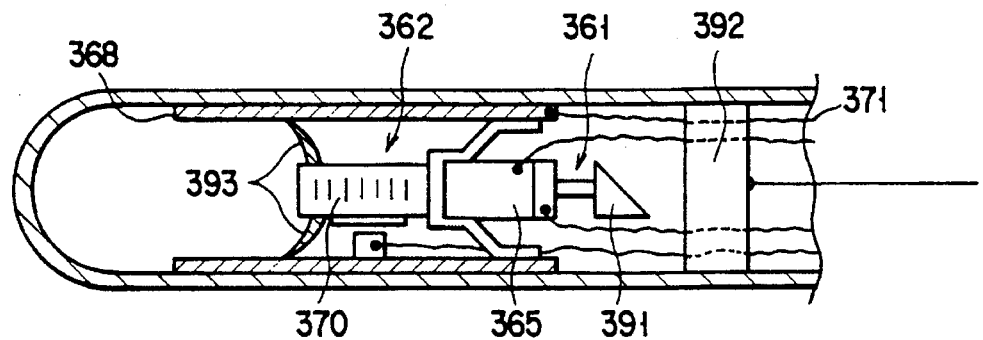
F I G. 58
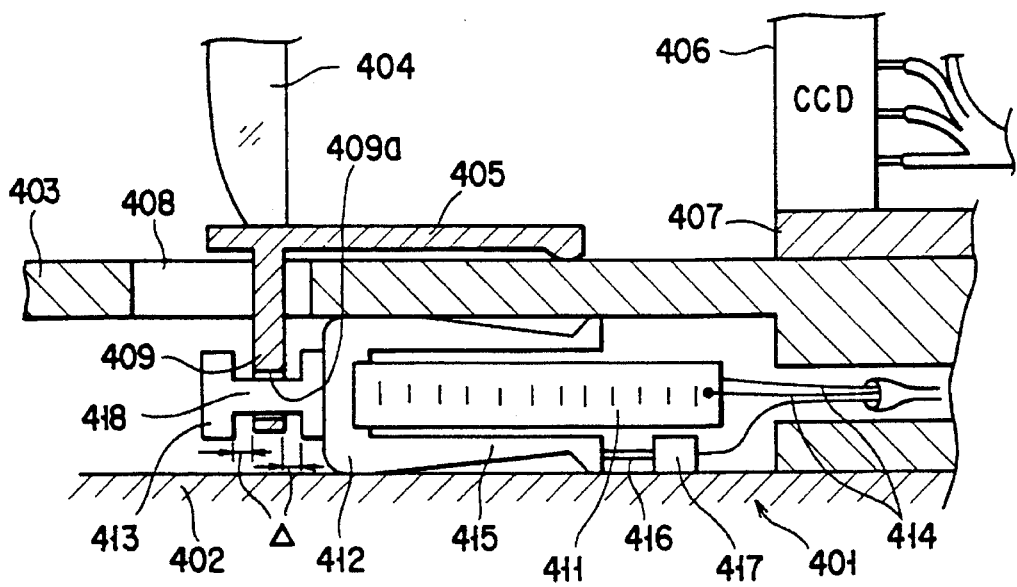
F I G. 59
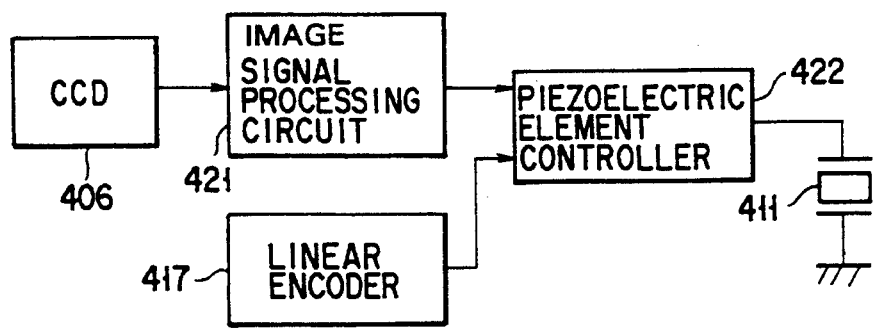
F I G. 60

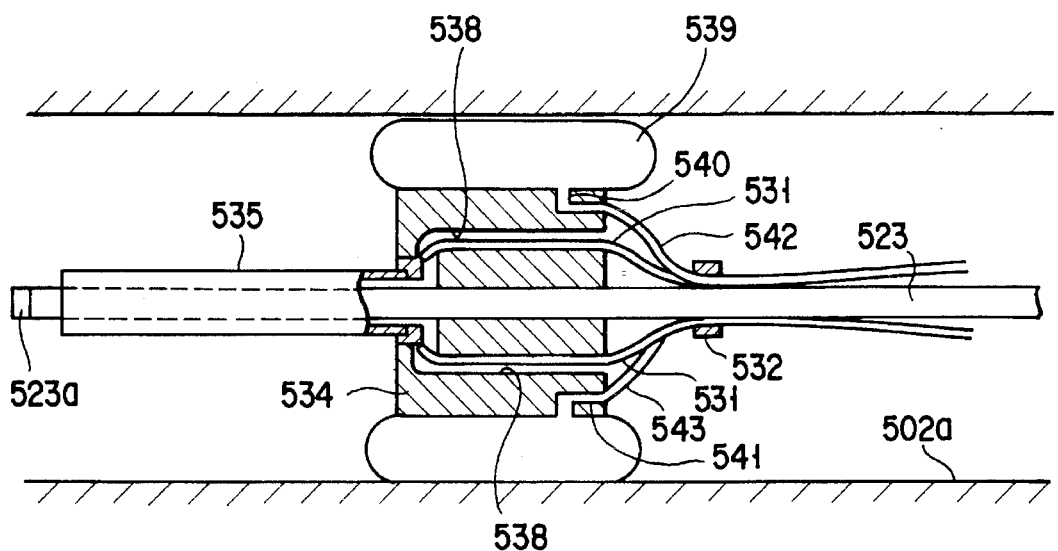
F I G. 65
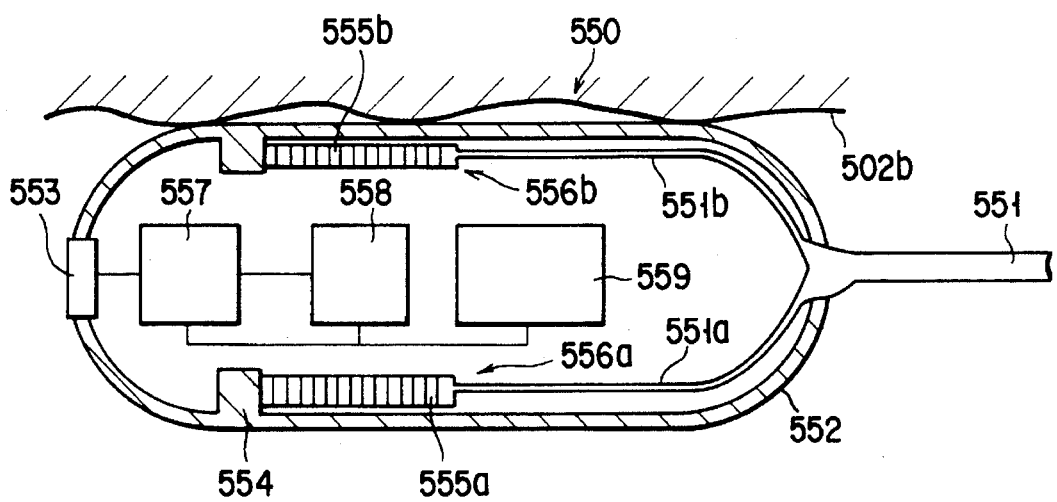
F I G. 66

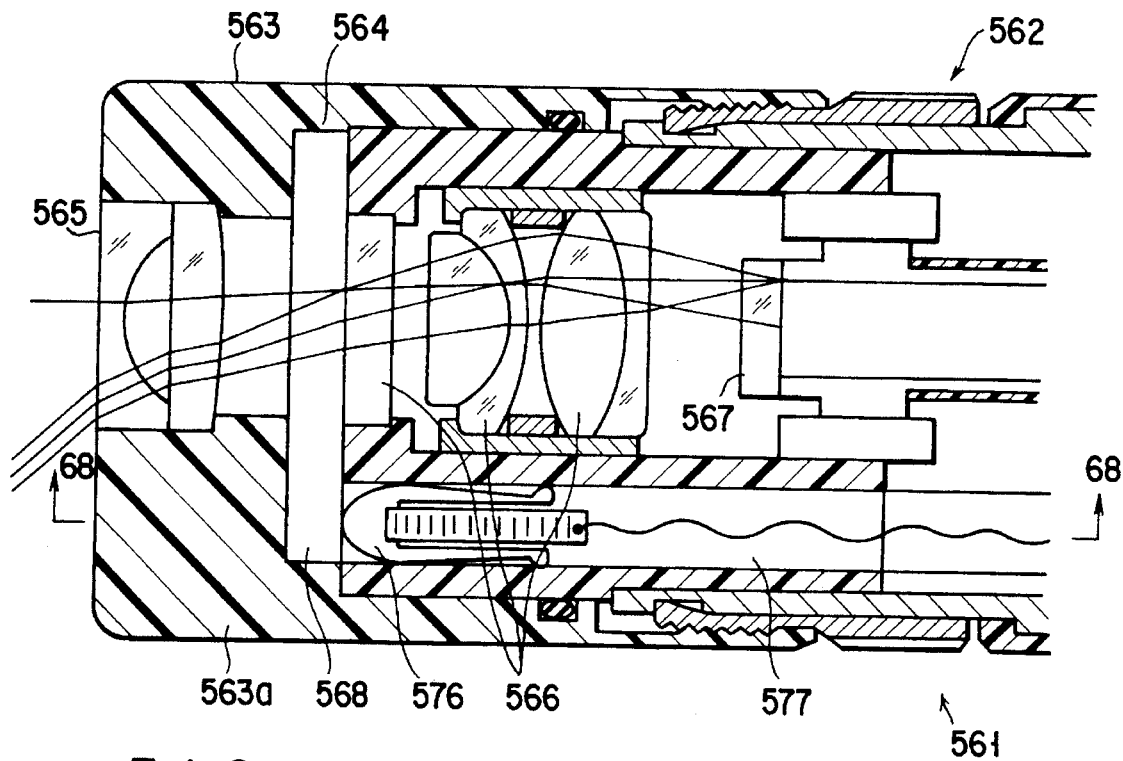
F I G. 67
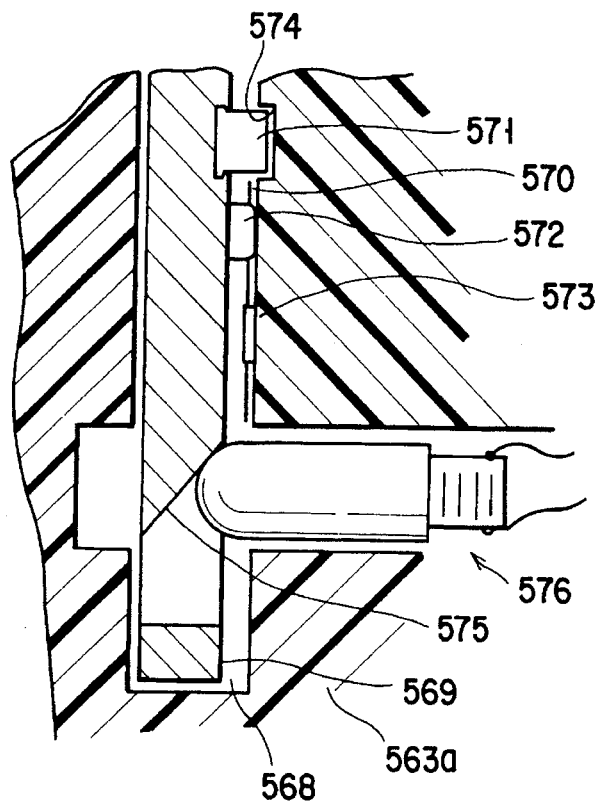
F I G. 68

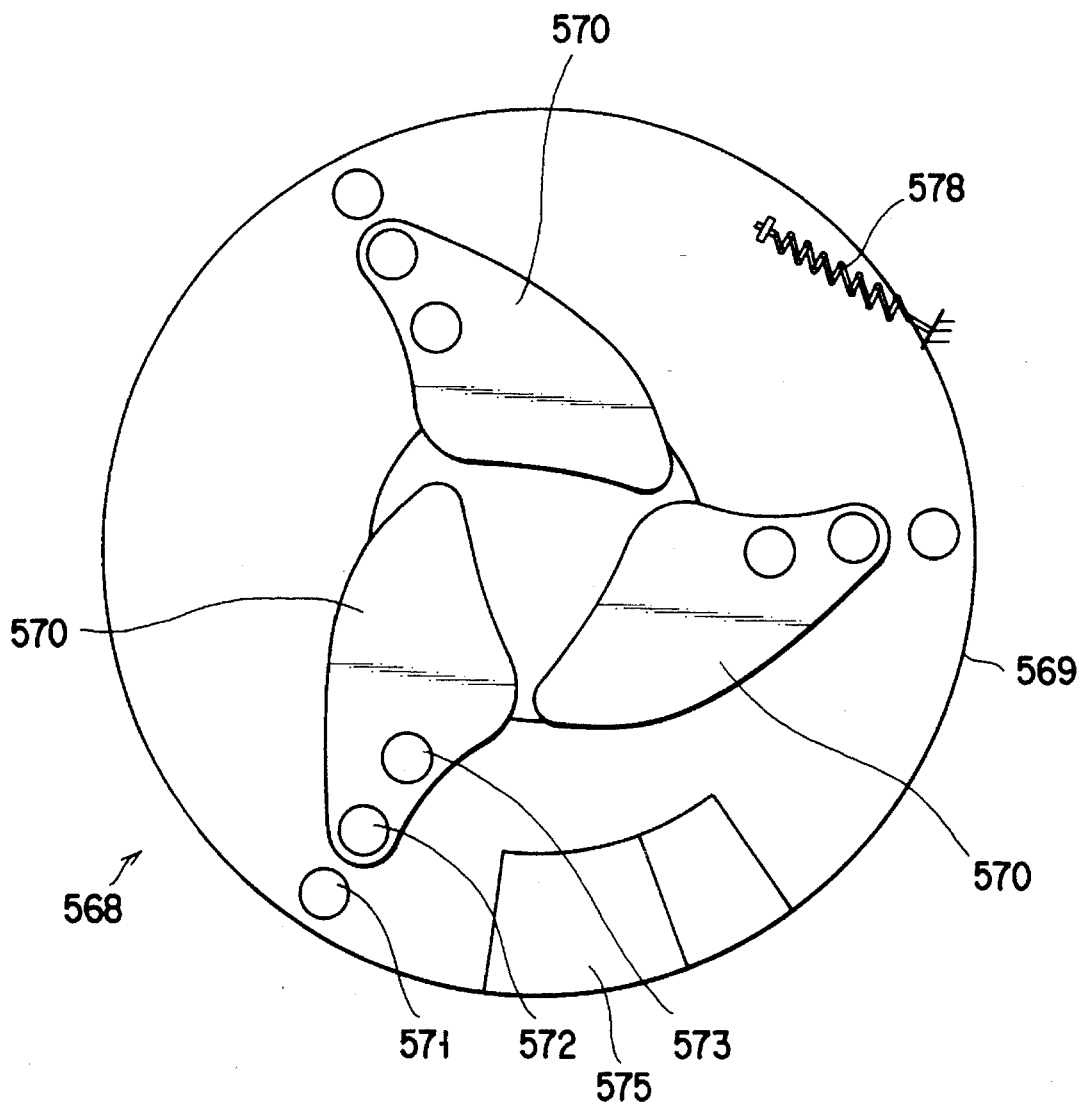
F I G. 69

ACTUATOR APPARATUS

BACKGROUND OF THE INVENTION

1. Field of the Invention

The present invention relates to an actuator apparatus for driving a driven member by utilizing an extension/contraction function of a piezoelectric element and/or an electrostrictive element.

2. Description of the Related Art

U.S. Pat. No. 4,894,579, for example, discloses a conventional piezoelectric actuator wherein one end of a piezoelectric element is fixed to a moving member which is put in slidable frictional engagement with a stationary member, and the other end of the piezoelectric element is fixed to an inertia member. When the piezoelectric actuator is operated, the piezoelectric element is extended or contracted quickly so as to accelerate the inertia member. A resultant inertia force is transmitted to the moving member, and thereby the moving member is slid over the stationary member and the piezoelectric actuator runs by itself.

In addition, for example, Jap. Pat. Appln. KOKAI Publications Nos. 4-63309 and 4-69071 disclose structures wherein the above-described actuator is utilized to drive a camera lens. For example, Jap. Pat. Appln. KOKAI Publication No. 4-177214 discloses a structure wherein the above actuator is utilized to drive an optical system of an endoscope, to bend a treatment instrument to be inserted into a body cavity, to open/close a forceps, etc.

However, in the above conventional structures, one end of the piezoelectric element of the piezoelectric actuator is fixed to the moving member and the other end of thereof is fixed to the inertia member. Consequently, the number of structural parts increases, the size of the entire piezoelectric actuator increases, and the processing and assemblage costs increases.

Furthermore, when external mechanical shock is applied to the piezoelectric actuator, the inertia force of the inertia member acts on the piezoelectric element. As a result, a very large load acts on the piezoelectric element, and the piezoelectric element may be destroyed.

SUMMARY OF THE INVENTION

The present invention has been made in consideration of the above circumstances, and its object is to provide an actuator apparatus wherein the number of structural parts is reduced, the size of the entire body is reduced, the processing and assembling costs are reduced, and, when an external mechanical shock is applied, a deformation element is not easily damaged.

According to this invention, there is provided an actuator apparatus for driving a movable portion within an endoscope, the apparatus comprising:

a moving member put in slidable frictional engagement with a base of the endoscope, the moving member having coupling means for coupling with the movable portion within the endoscope;

a deformation element coupled to the moving member, the deformation element being able to take a basic shape and a deformed shape different from the basic shape, the deformation element and the moving member alone constituting a body of the actuator apparatus; and driving means for causing quick deformation in the deformation element, enabling the deformation element to apply an impulse force to the moving member, thereby moving the moving member against a frictional engagement force acting between the base and the moving member.

When the deformation element deforms quickly, an inertia force of the deformation element acts on the moving member and thereby the moving member is slid over the base against a frictional engagement force acting between the base and the moving member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6B is a characteristic graph showing a waveform of a driving signal for advancing the actuator shown in FIG. 6A;

FIG. 6C is a characteristic graph showing a waveform of a driving signal for retreating the actuator shown in FIG. 6A;

FIG. 7A is a vertical cross-sectional view showing an important structural portion of a second embodiment of the present invention;

FIG. 7B is a vertical cross-sectional view showing an important structural portion of a modification of the second embodiment;

FIG. 9 is a vertical cross-sectional view showing an important structural portion of a distal-end structure of an endoscope in which an actuator apparatus according to a fourth embodiment of the invention is built in;

FIG. 11A is a vertical cross-sectional view showing a first modification of the frictional engagement portion according to the fourth embodiment;

FIG. 11B is a vertical cross-sectional view showing a second modification of the frictional engagement portion according to the fourth embodiment;

FIG. 11C is a vertical cross-sectional view showing a third modification of the frictional engagement portion according to the fourth embodiment;

FIG. 12 is a vertical cross-sectional view showing an important structure of a fifth embodiment of the invention;

FIG. 13 is a vertical cross-sectional view showing an important structure of a sixth embodiment of the invention;

FIG. 20 is a vertical cross-sectional view showing an important structure of an external camera according to the eighth embodiment of the invention;

FIG. 21 is a plan view showing an important structure of an aperture mechanism of the external camera according to the eighth embodiment;

FIG. 22 is a vertical cross-sectional view showing an important structure of a stereoscopic solid endoscope according to a ninth embodiment of the invention;

FIG. 23 shows schematically the structure of a control apparatus for the stereoscopic solid endoscope according to the ninth embodiment;

FIG. 24 is a view for explaining a convergence angle of the stereoscopic solid endoscope according to the ninth embodiment;

FIG. 25 is a vertical cross-sectional view showing an important structure of a tenth embodiment of the invention;

FIG. 26 shows schematically the structure of a control unit for the actuator according to the tenth embodiment;

FIG. 27 shows characteristics of a driving pulse output for a second piezoelectric element according to the tenth embodiment, a phase shifter output and an edge trigger circuit output;

FIG. 28 is a vertical cross-sectional view showing an important structure of an eleventh embodiment of the invention;

FIG. 29 is a cross-sectional view taken along line 29—29 in FIG. 28;

FIG. 30 is a transverse cross-sectional view of a flexible cable according to the eleventh embodiment;

FIG. 31 is a vertical cross-sectional view showing an important structure of a twelfth embodiment of the invention;

FIG. 32 shows schematically the structure of a driving circuit for the actuator according to the twelfth embodiment;

FIG. 33 shows characteristics for explaining the operation of the actuator according to the twelfth embodiment;

FIG. 36 is a view for describing an important portion of the 14th embodiment;

FIG. 37 is a cross-sectional view taken along line 37—37 in FIG. 36;

FIG. 41 is a perspective view of a flexible pipe according to a 15th embodiment of the invention;

FIG. 42 is a perspective view of a flexible pipe according to a 16th embodiment of the invention;

FIG. 43 is a perspective view of a flexible pipe according to a 17th embodiment of the invention;

FIG. 48 is a plan view showing the structure of a 20th embodiment of the invention;

FIG. 49 is a plan view of the 20th embodiment;

FIG. 50 is a perspective view of a connecting portion between a piezoelectric element of a piezoelectric actuator and a flexible lead wire;

FIG. 51 is a graph showing a waveform of a driving signal for the piezoelectric actuator at the time a left driving signal is applied;

FIG. 52 is a graph showing a waveform of a driving signal for the piezoelectric actuator at the time a right driving signal is applied;

FIG. 53 is a characteristic graph showing a waveform of another left driving signal to be applied to the piezoelectric element of the piezoelectric actuator according to the 20th embodiment;

FIG. 54 is a characteristic graph showing a waveform of another right driving signal to be applied to the piezoelectric element of the piezoelectric actuator according to the 20th embodiment;

FIG. 55 is a characteristic graph showing a waveform of still another left driving signal to be applied to the piezoelectric element of the piezoelectric actuator according to the 20th embodiment;

FIG. 56 is a characteristic graph showing a waveform of still another right driving signal to be applied to the piezoelectric element of the piezoelectric actuator according to the 20th embodiment;

FIG. 58 shows a modification of a piezoelectric actuator of the 21th embodiment;

FIG. 59 is a cross-sectional view showing a focus driving mechanism according to a 22nd embodiment of the invention;

FIG. 60 is a block diagram showing the structure of a signal processing system of the focus driving mechanism;

FIG. 65 is a partial cross-sectional view of a self-advancing apparatus according to a 26th embodiment of the invention;

FIG. 66 is a view of a self-advancing apparatus according to a 27th embodiment of the invention;

FIG. 67 is a vertical cross-sectional view showing a 28th embodiment of the invention;

FIG. 68 is a cross-sectional view taken along line 68—68 in FIG. 67; and

FIG. 69 is a transverse cross-sectional view showing an important structure of the 28th embodiment.

DETAILED DESCRIPTION OF THE PREFERRED EMBODIMENTS

Preferred embodiments of the present invention will now be described with reference to the accompanying drawings.

Figure 1A:
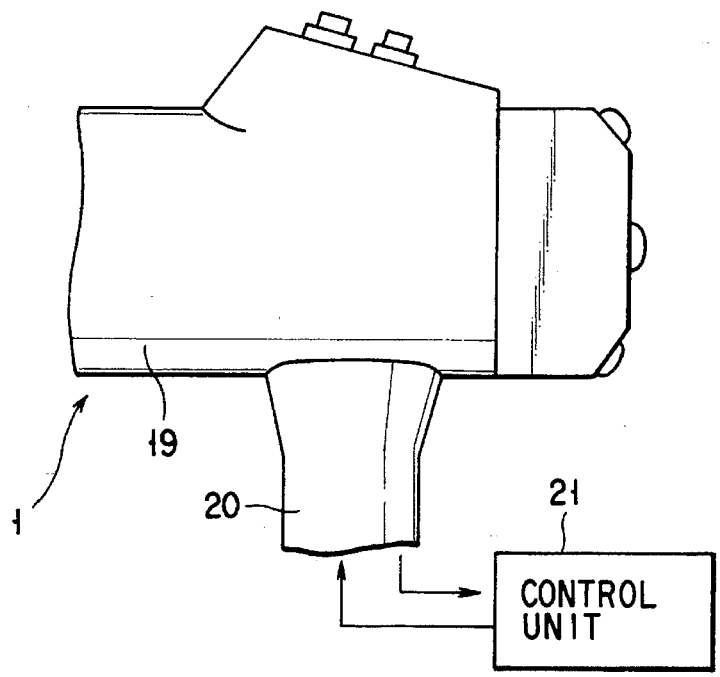
FIG. 1A is a side view showing an operating unit of an endoscope built in an actuator apparatus according to a first embodiment of the present invention.

FIGS. 1A to 5B show a first embodiment of the present invention. FIG. 1A shows an operating unit 19 of an endoscope 1, and FIG. 1B shows a focus adjusting mechanism 4 of an observation optical system built in a body 3a of a distal-end structure 3 in an insertion portion 2 of the endoscope 1. An actuator apparatus according to the first embodiment is applied to driving means for the focus adjusting mechanism 4.

Figure 1B:
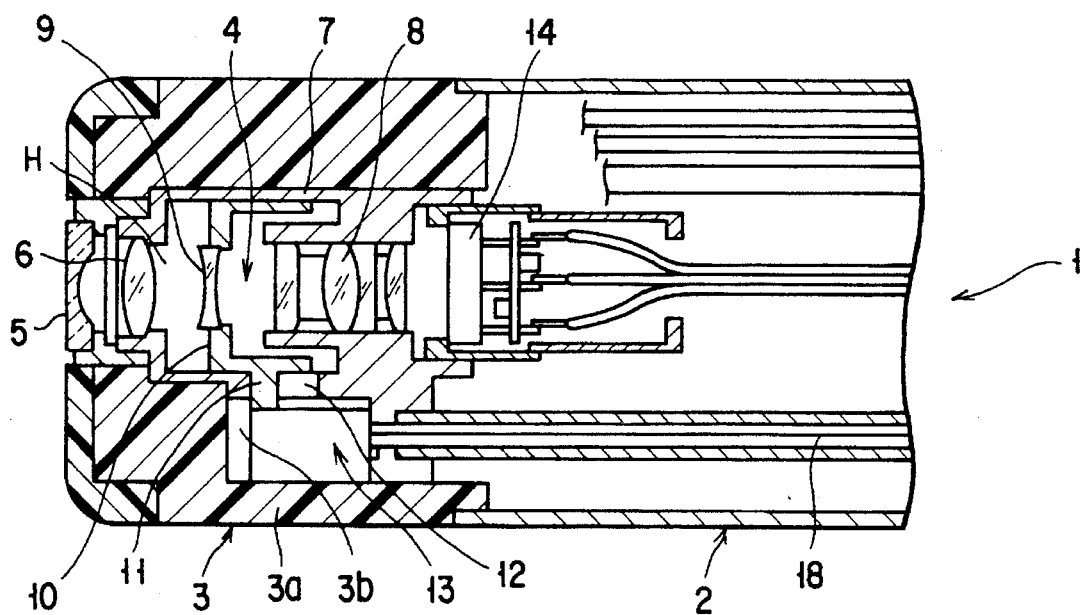
FIG. 1B is a vertical cross-sectional view showing a focus adjustment mechanism built in a distal-end structure of an insertion portion of the endoscope according to the first embodiment.

As is shown in FIG. 1B, an observation optical system mounting hole H is formed in the distal-end structure body 3a of the endoscope 1. An actuator mounting hole 3b of the focus adjusting mechanism 4 is formed around the mounting hole H in an adjoining fashion.

In addition, an observation window portion 5 is formed in a distal face of the distal-end structure 3. The observation window portion 5 is fitted in a distal end portion of the observation optical system mounting hole H.

The observation optical system is provided with a front stationary lens 6, a rear stationary lens 8 and a movable focus adjustment lens 9. The front stationary lens 6 is situated to face the observation window portion 5. The rear stationary lens 8 is situated to face the front stationary lens 6 at a distance. The movable focus adjustment lens 9 is movable along the optical axis of the observation optical system. The lenses 6, 8 and 9 constitute an objective lens group of the observation optical system.

A lens-barrel 7 for holding the front and rear stationary lenses 6 and 8 is fixed on the distal-end structure body 3a. A lens frame 10 of the focus adjustment lens 9 is supported on the inner periphery of the lens-barrel 7 so as to be movable along the optical axis of the observation optical system.

An actuator unit (actuator body) 13 of a piezoelectric actuator for moving the lens frame 10 of focus adjustment lens 9 is mounted between the outer periphery of the lens-barrel 7 and the inner bottom face of the actuator-mounting hole 3b in the distal-end structure body 3a. In this case, a coupling arm 11 extending towards the actuator mounting hole 3b is projected from the lens frame 10 of the focus adjustment lens 9. A guide hole 12 in which the coupling arm 11 is inserted is formed in the lens-barrel 7. A solid imaging element 14 such as a CCD is situated behind the rear stationary lens 8. The solid imaging element 14 converts an observed image obtained by the objective lens group of the observation optical system to an electric signal.

Figure 2:
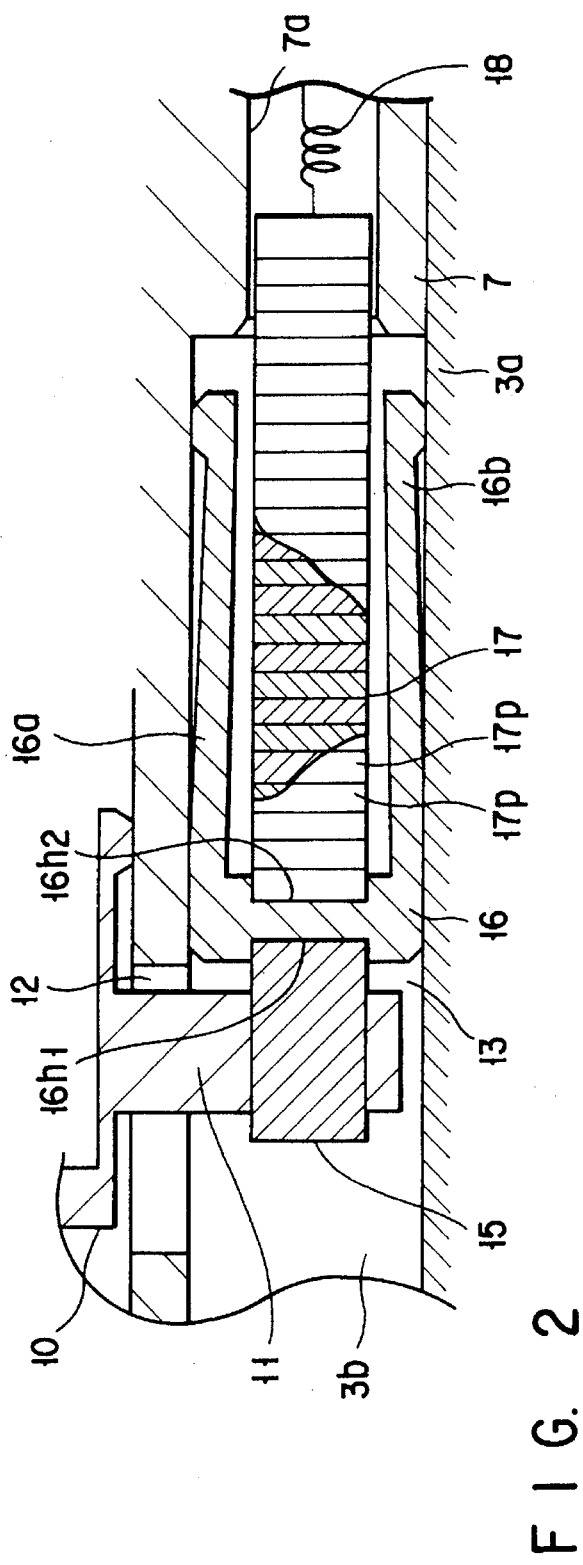
FIG. 2 is a vertical cross-sectional view showing an important structural portion of the actuator apparatus according to the first embodiment.

As is shown in FIG. 2, the actuator unit 13 of the piezoelectric actuator consists only of a moving member 16 and a piezoelectric element (or electrostrictive element) 17 which functions as a deformable element and is coupled to the moving member 16. The moving member 16 is put in slidable frictional engagement with the outer periphery of the lens-barrel 7, which is the base of the endoscope 1, and the inner bottom face of the actuator-mounting hole 3b in the distal-end structure body 3a.

The piezoelectric element (or electrostrictive element) 17 functioning as a deformable element is constituted such that an electrode is formed on a ceramic member formed of, e.g. barium titanate, lead zirconate titanate (PZT), or porcelain. A DC current is applied to the electrode and thereby the piezoelectric element (or electrostrictive element) 17 is mechanically deformed. A strain is caused to the piezoelectric element 17 by an inverse-voltage effect in proportion to an electric field intensity. On the other hand, when a driving voltage is applied to the electrostrictive element, a strain proportional to the square of the electric field intensity is caused therein.

The moving member 16 is coupled to the coupling arm 11 of lens frame 10 by means of a coupling member 15. A pair of upper and lower beams 16a and 16b extending rearwards are projected from the outer peripheral portion of the moving member 16. The extended end portions of the beams 16a and 16b are tightly fitted with suitable frictional force on a base constituted by the outer peripheral surface of the lens-barrel 7 and the inner bottom face of the actuator-mounting hole 3b in the distal-end structure body 3a. Three or more beams may be provided on the outer peripheral portion of the moving member 16, or a cylindrical beam portion may be provided on the outer peripheral portion of the moving member 16.

The front and rear end faces of the moving member 16 are provided with recess portions 16h1 and 16h2. A rear end portion of the coupling member 15 is adhered in the front-side recess 16h1, and a front end portion of the piezoelectric element 17 is adhered in the rear-side recess 16h2. In the case where the weight of the lens frame 10 is much greater than that of the actuator unit 13, the coupling member 15 is formed of an elastic material such as rubber.

The piezoelectric element 17 is connected to an external control unit 21 via a lead wire 18 extending through the insertion portion 2 and operating unit 19 of the endoscope 1 and a universal cord 20.

Figure 3:
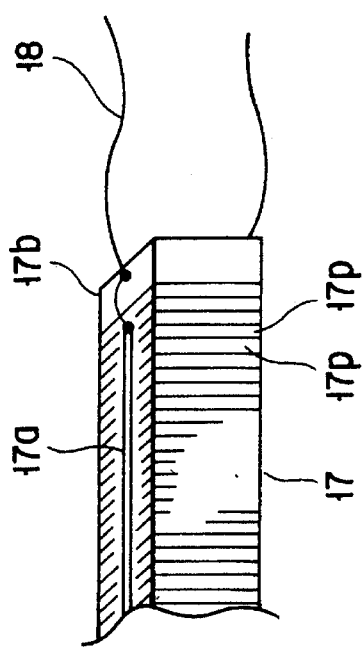
FIG. 3 is a perspective view showing the fixed state of a lead wire connected to a piezoelectric element according to the first embodiment.

As is shown in FIG. 3, the lead wire 18 is attached to the piezoelectric element 17 at two points. Specifically, the lead wire 18 is attached to an electrode portion 17a by soldering, and also attached to a dummy portion 17b of the piezoelectric element 17 by means of an adhesive. The piezoelectric element 17 may be of a vertical lamination type, a horizontal lamination type, or a single-layer type. In the vertical lamination type, a plurality of structural elements 17p are vertically laminated. In the horizontal lamination type, a plurality of structural elements 17p are horizontally laminated. In the present embodiment, the piezoelectric element 17 of the horizontal lamination type is used.

A support hole 7a for supporting the rear end portion of the piezoelectric element 17 is formed in the lens barrel 7. The rear end portion of the piezoelectric element 17 is loosely held in the support hole 7a.

For enhancing anti-friction properties, the surface of the lens-barrel 7 and the surface of the moving member 16 are subjected to surface treatment, e.g. oxalic-acid alumire coating and titanium coating. Furthermore, for enhancing anti-temperature/humidity properties and anti-chemical properties, parillin coating is applied.

The lens-barrel 7, which is the base of the endoscope 1, and the distal-end structure body 3a are formed by quenching, e.g. a stainless steel material SUS440C, thereby setting the vickers hardness number of the base of endoscope 1 at 650 Hv. Besides, the moving member 16 of the actuator unit 13 is formed of, e.g. an aluminum material which was subjected to oxalic-acid alumite treatment, and the surface of the moving member of aluminum material is subjected to vapor hole-closing treatment. Thereby, the vickers hardness number may be set at 400 Hv.

Figures 4A, 4B:
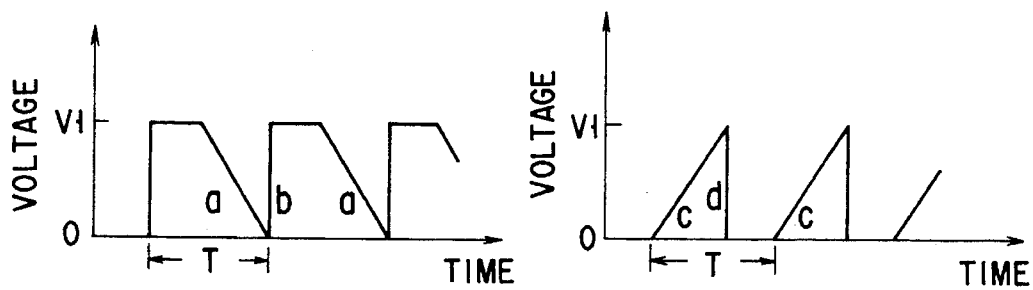
FIG. 4A is a characteristic graph showing a waveform of a first driving signal for the piezoelectric element in the first embodiment.
FIG. 4B is a characteristic graph showing a waveform of a second driving signal for the piezoelectric element in the first embodiment.

The control unit 21 is provided with voltage applying means for applying to the piezoelectric element 17 a first driving signal having a waveform as shown in FIG. 4A and a second driving signal having a waveform as shown in FIG. 4B. The waveform of the first driving signal includes a region a and a region b within a predetermined 1-pulse time period T. In the region a, an applied voltage is gradually decreased from a set potential v1 to zero potential. In the region b, the applied voltage is increased quickly from zero potential up to the set potential v1. On the other hand, the waveform of the second driving signal includes a region c and a region d within a predetermined 1-pulse time period T. In the region c, an applied voltage is gradually increased from zero potential to a set potential v1. In the region d, the applied voltage is decreased quickly from the set potential v1 to zero potential.

The operation of the above-described structure will now be described. The operation of the actuator unit 13 driven by the first driving signal having the waveform shown in FIG. 4A will first be described with reference to FIG. 5A. While the actuator unit 13 is stopped, the moving member 16 is held with suitable frictional force between the outer periphery of the lens-barrel 7 and the inner bottom face of the actuator-mounting hole 3b in the distal-end structure body 3a.

When the first driving signal is applied to the piezoelectric element 17 of the actuator unit 13, the piezoelectric element 17 contracts slowly in the region a of the waveform of the first driving signal and extends quickly in the region b, and this cycle is repeated.

Figure 5A:
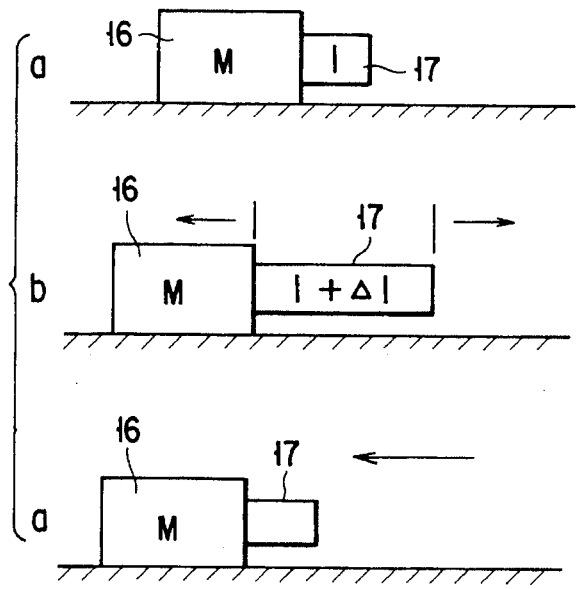
FIG. 5A is a view for illustrating the operation of the piezoelectric element according to the first embodiment, which is driven by the first driving signal having the waveform shown in FIG. 4A.

Specifically, in the region a of the waveform of the first driving signal, the piezoelectric element 17 contracts slowly. In this case, as shown in FIG. 5A(a), the moving member 16 remains stationary due to frictional force acting between the lens-barrel 7 and the distal-end structure body 3a.

In the region b of the waveform of the first driving signal, the piezoelectric element 17 extends quickly. In this case, an impulse for urging the moving member 16 in the left direction in FIG. 5A is produced by the quick extension of the piezoelectric element 17. Consequently, the moving member 16 is moved to the left in FIG. 5A(b) by the impulse of the piezoelectric element 17, with an immovable point set by the weight of the piezoelectric element 17 itself and the mass M of the moving member 16.

Figure 5B:
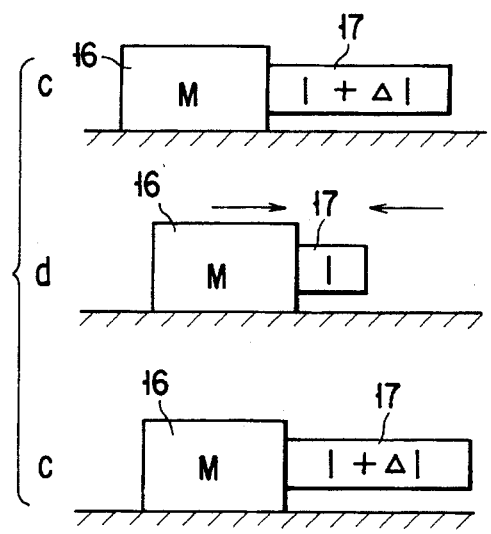
FIG. 5B is a view for illustrating the operation of the piezoelectric element according to the first embodiment, which is driven by the second driving signal having the waveform shown in FIG. 4B.

When the actuator unit 13 is driven by the second driving signal with the waveform shown in FIG. 4B, the actuator unit 13 moves as shown in FIG. 5B. When the second driving signal is applied to the piezoelectric element 17 of the actuator unit 13, the piezoelectric element 17 extends slowly in the region c of the waveform of the second driving signal and it contracts quickly in the region d, and this cycle is repeated.

Specifically, in the region c of the waveform of the second driving signal, the piezoelectric element 17 extends slowly. In this case, as shown in FIG. 5B(c), the moving member 16 remains stationary due to frictional force acting between the lens-barrel 7 and the distal-end structure body 3a.

In the region d of the waveform of the second driving signal, the piezoelectric element 17 contracts quickly. In this case, an impulse for pulling the moving member 16 in the right direction in FIG. 5B is produced by the quick contraction of the piezoelectric element 17. Consequently, the moving member 16 is moved to the right in FIG. 5B(d) by the impulse of the piezoelectric element 17, with an immovable point set by the weight of the piezoelectric element 17 itself and the mass M of the moving member 16.

Accordingly, when the first driving signal is applied to the piezoelectric element 17 in operation of the actuator unit 13, the moving member 16 moves to the left in FIG. 2. When the second driving signal is applied to the piezoelectric element 17, the moving member 16 retreats to the right in FIG. 2. In cooperation with the moving member 16, the lens frame 10 of the focus adjustment lens 9 moves in the same direction. Thus, the lens 9 can be moved to the right or left and thereby the focal point of the objective lens group of the observation optical system can be adjusted. The operations of the actuator unit 13 were confirmed by experiments conducted by the inventors of the present invention.

In the above-described embodiment, the actuator unit 13 is constituted only by the moving member 16 coupled to the coupling arm 11 of lens frame 10 via coupling member 15, and the piezoelectric element 17 which is fixed to the movable member 16 and is extended/contracted by application of voltage, thereby applying an impulse to the moving member 16. Therefore, an inertia member used in conventional piezoelectric actuators can be omitted. As a result, as compared to the conventional piezoelectric actuators, the number of structural parts can be decreased, the size of the entire actuator unit 13 reduced, and the processing and assemblage costs reduced.

Furthermore, since the actuator unit 13 with the above structure is applied to the focus adjustment mechanism 4 of the observation optical system of endoscope 1, an increase in axial length of a solid portion comprising the distal-end structure 3 of insertion portion 2 of endoscope 1 can be prevented. Thus, the strain on a patient can be reduced when the insertion portion 2 of endoscope 1 is inserted.

The front end portion of piezoelectric element 17 is fitted and adhered in the recess portion 16h2 in the rear end face of moving member 16, and the rear end portion of the piezoelectric element 17 is loosely held in the support hole 7a of the lens-barrel 7. Therefore, deformation of the piezoelectric element 17 in directions other than the extension/contraction direction can be restricted. Thus, it is possible to prevent the piezoelectric element 17 from being deformed and broken owing to external mechanical shock in directions other than the extension/contraction directions, and the piezoelectric element 17 can be provided with the structure which is robust to external mechanical shock.

In the case where the weight of the lens frame 10 is much greater than that of the actuator unit 13, the coupling member 15 is formed of an elastic material such as rubber, thereby preventing the lens frame 10 from following the quick motion of the moving member 16 of the actuator unit 13. Therefore, even if the weight of the lens frame 10 is much greater than that of the actuator unit 13, smooth movement of the actuator unit 13 is ensured. In this case, if the coupling member 15 is formed of a hard material, the immovable point becomes close to the center of the moving member 16 and the amount of movement of the moving member 16 achieved by one cycle of the driving waveform is reduced.

Figure 6A:
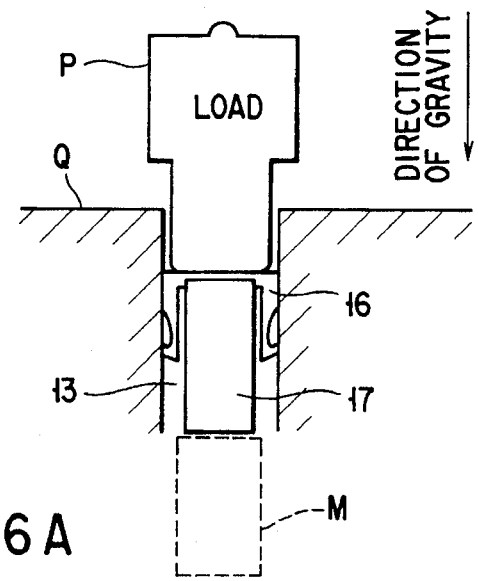
FIG. 6A shows schematically an experimental model relating to output characteristics of the actuator apparatus according to the first embodiment.

FIG. 6A shows an experimental model relating to the output characteristics in operation of the actuator unit 13. In FIG. 6A, symbol P denotes a load on the actuator unit 13, symbol Q a base, and symbol M a mass body of a conventional actuator. FIG. 6B shows a waveform of the first driving signal for advancing the actuator unit 13 of the experimental model, FIG. 6C a waveform of the second driving signal for retreating the actuator unit 13.

The waveform of the first driving signal comprises a first region, a second region and a third region within a predetermined 1-pulse time period T. In the first region, an applied voltage is quickly increased from zero potential up to a predetermined potential (74 v). In the second region, the applied voltage is maintained at the predetermined potential for a predetermined time period. In the third region, the applied voltage is gradually decreased from the predetermined potential to the zero potential. The ratio of the first region to the second region to the third region is 4:13:79.

The waveform of the second driving signal comprises a fourth region, a fifth region and a sixth region within a predetermined 1-pulse time period T. In the fourth region, an applied voltage is gradually increased from zero potential up to a predetermined potential (74 v). In the fifth region, the applied voltage is decreased quickly from the predetermined potential to zero potential. In the sixth region, the applied voltage gradually decreased from the applied voltage is maintained at zero potential. The ratio of the fourth region to the fifth region to the sixth region is 79:4:13. The size of the piezoelectric element 17 of the actuator unit 13 is 1.6×0.8×9, the amount of deformation thereof is 7 μm/100 vDC, and the weight thereof is 0.1 g. Besides, the weight of the moving member 16 is 30 mg.

TABLE 1 shows the results of experiments on the actuator unit 13 of the experimental model. The actuator mass is a sum of the weights of the moving member 16, piezoelectric element 17 and mass body M. The values accompanied with mark (*) were obtained when the mass of the body M is 0.0 g.

TABLE 1

| | DRIVING VOLTAGE (V-PEAK) | STATIC FRICTIONAL FORCE OF MOVABLE BODY (N) | DRIVING FREQUENCY (KHz) | LOAD (N) | ACTUATOR MASS (g) | OUTPUT/ WEIGHT (mm · N/ s/g) |
|---|---|---|---|---|---|---|
| 1 | 74 | 0.5 | 5 | 0.05 | 0.1* | 30 |
| 2 | | | | | 0.2 | 16 |
| 3 | | | | | 0.4 | 15 |
| 4 | | | 6 | 0.1 | 0.1* | 30 |
| 5 | | | | | 0.2 | 20 |
| 6 | | | | | 0.4 | 39 |

As is clear from TABLE 1, the output/weight characteristics of the actuator unit 13 with no mass body M are better than those of the actuator unit with the mass body M. The reason for this would appear to be that in the case of the actuator unit 13 with no mass body M, the portion corresponding to the mass body M is included in the piezoelectric element 17 and the piezoelectric element 17 is extended/contracted by the applied voltage to increase the amount of movement of the moving member 16.

FIG. 7A shows a second embodiment of the present invention. In this embodiment, a center portion of a plate spring 31 is attached to a rear end portion of the piezoelectric element 17. Both end portions are brought into pressure contact with the inner surfaces of the beams 16a and 16b of the moving member 16. Thereby, deformation of the piezoelectric element 17 in a direction perpendicular to the extension/contraction direction is restricted. In this case, it is possible to dispense with the support hole 7a for loosely fitting the rear end portion of the piezoelectric element 17 in the lens-barrel 7, and therefore the structure of the lens-barrel 7 can be simplified.

FIG. 7B shows a modification of the second embodiment. Restricting members 32 are projected from the inner surfaces of the beams 16a and 16b of moving member 16 towards the piezoelectric element 17. The rear end portion of the piezoelectric element 17 is interposed between both restricting members 32. Thereby, deformation of the piezoelectric element 17 in a direction perpendicular to the extension/contraction direction is restricted.

Figure 8:
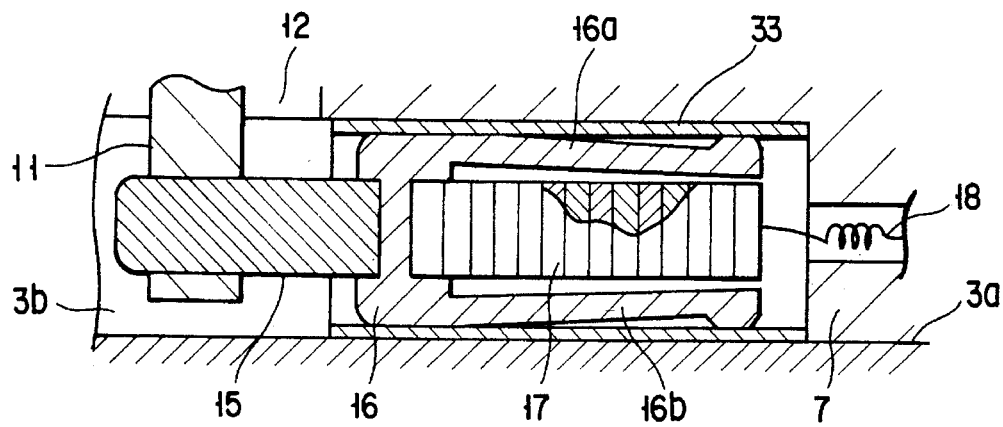
FIG. 8 is a vertical cross-sectional view showing an important structural portion of a third embodiment of the present invention.

FIG. 8 shows a third embodiment of the present invention, wherein a cylindrical pipe 33 is situated within the actuator-mounting hole 3b, and the moving member 16 of the actuator unit 13 is inserted in the cylindrical pipe 33. The cylindrical pipe 33 containing the moving member 16 is built within the lens barrel 7.

In the above embodiments, the actuator unit 13 is used for actuating the focus adjustment mechanism 4 of the observation optical system of endoscope 1. However, the actuator unit 13 may be used for actuating a zoom mechanism or an aperture adjustment mechanism of the observation optical system of endoscope 1.

Figure 9:
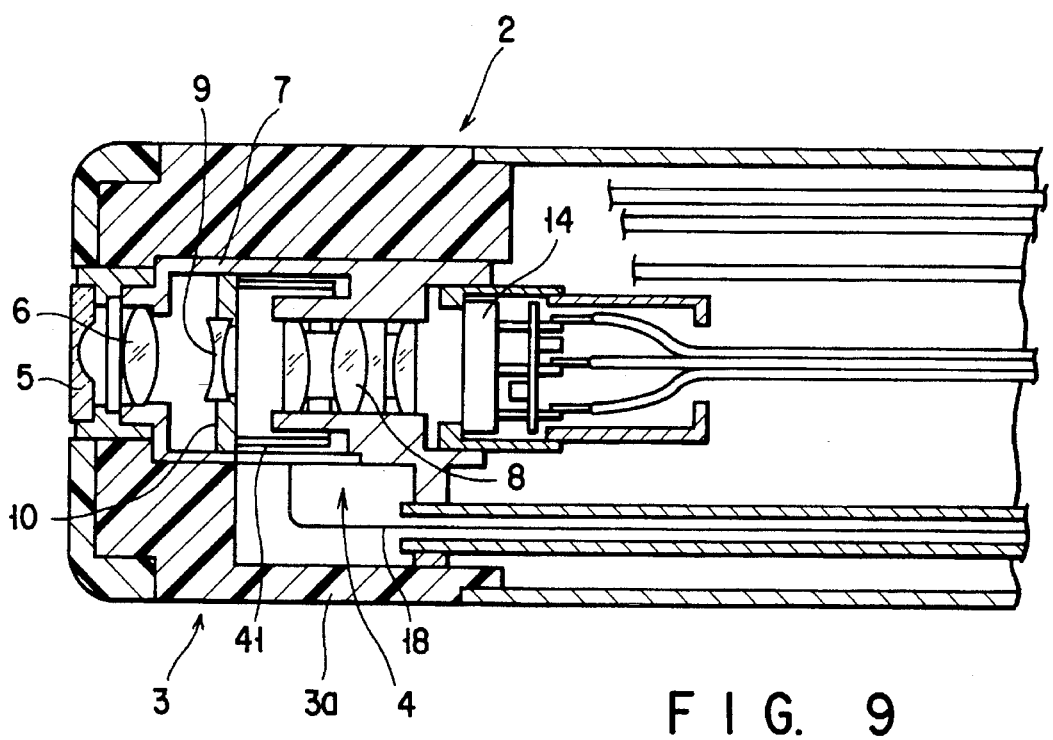

FIG. 9 shows a fourth embodiment of the present invention wherein the lens frame 10 of the focus adjustment lens 9 is utilized as a part of the actuator unit 13 for the focus adjustment mechanism 4.

In the fourth embodiment, a distal end portion of a cylindrical piezoelectric element 41 is attached to the lens frame 10, and this lens frame 10 functions as a moving member of the actuator unit 13. In this case, the surface of the cylindrical piezoelectric element 41 is subjected to blackening treatment, e.g. BCr treatment, in order to prevent diffused reflection.

Figure 10:
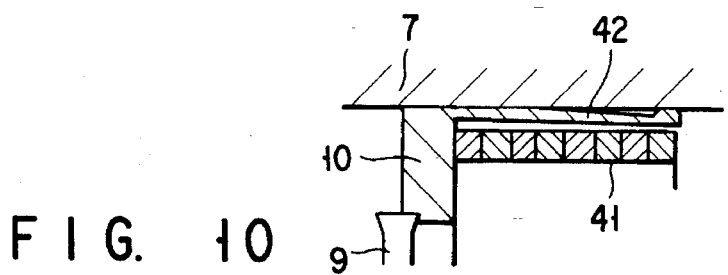
FIG. 10 is a vertical cross-sectional view of a frictional engagement portion for applying a static frictional force between a lens-barrel and a lens frame according to the fourth embodiment of the invention.

FIG. 10 shows a frictional engagement portion for applying a static frictional force between the lens barrel 7 and lens frame 10. In this case, a beam 42 extending rearwards is provided on an outer peripheral portion of the lens frame 10. An extended end portion of the beam 42 is put in frictional engagement with the lens-barrel 7 with a suitable frictional force.

When the driving signals of waveforms shown in FIGS. 4A and 4B are applied to the cylindrical piezoelectric element 41, the element 41 is extended or contracted along the optical axis of the focus adjustment lens 9 of the endoscope 1. As a result, the lens frame 10 or the moving member advances or retreats according to the waveforms of the driving signals. Thereby, the focus adjustment lens 9 can be moved forwards and backwards and the focal point of the objective lens group of the observation optical system can be adjusted.

With the fourth embodiment, the same advantage as in the first embodiment can be obtained. In particular, in the fourth embodiment, since the lens frame 10 of the focus adjustment lens 9 is utilized as a part of the actuator unit 13 for the focus adjustment mechanism 4, the outside diameter of the distal-end structure 3 of endoscope 1 can be decreased, and the strain on the patient at the time of inserting the insertion portion 2 of endoscope 1 can further be reduced.

FIG. 11A shows a first modification of the frictional engagement portion for applying a static frictional force between the lens-barrel 7 and lens frame 10. Specifically, an electromagnet 43 is attached to the lens-barrel 7. In this case, the lens frame 10 is formed of a material with high magnetic permeability, such as iron. The lens frame 10 is attracted by the magnetic force of the electromagnet 43 of the lens-barrel 7, thereby applying a static frictional force between the lens-barrel 7 and lens frame 10.

FIG. 11B shows a second modification of the frictional engagement portion. A second piezoelectric element 44, which can extend or contract in the diametrical direction of endoscope 1, is provided between the lens-barrel 7 and lens frame 10. The piezoelectric element 44 is extended to apply a static frictional force between the lens-barrel 7 and lens frame 10.

FIG. 11C shows a third modification of the frictional engagement portion. A first electrode 45 is attached to the lens-barrel 7, and a second electrode 46 is attached to the surface of the lens frame 10 which faces the lens-barrel 7. Lead wires 47 and 48 are attached to the first and second electrodes 45 and 46, respectively. Voltages of opposite polarities are applied to the electrodes 45 and 46, whereby the electrodes 45 and 46 are pulled to each other. As a result, a static frictional force is applied between the lens-barrel 7 and lens frame 10.

FIG. 12 shows a fifth embodiment of the invention. In the fifth embodiment, the actuator of the present invention is applied to driving means of an opening/closing mechanism for opening/closing a forceps body 64 provided at a distal end portion of an insertion portion 62 of a treatment instrument 61.

A cylindrical distal solid portion 63 which constitutes a unit casing for an actuator unit 66 is attached to the distal end portion of the insertion portion 62. A moving member 67 of the actuator is housed within the distal solid portion 63 such that it is put in slidable frictional engagement with the inner peripheral wall of the distal solid portion 63.

An opening/closing portion 65 of the forceps body 64, which is constituted by a "pantograph" mechanism, is attached to the moving member 67. The moving member 67 of the actuator moves forwards and backwards within the distal solid portion 63, thereby actuating the opening/closing portion 65.

One end portion of a lead wire 70 is connected to a piezoelectric element 68 of the actuator unit 66. An approximately middle portion of the lead wire 70 is fixed to a stopper 69 situated within the distal solid portion 63. Thus, even if the moving member 67 of the actuator unit 66 moves, a proximal end portion of the lead wire 70 is not pulled.

Accordingly, like the first embodiment, the inertia member used in the conventional piezoelectric actuator can be omitted. Therefore, the number of structural parts can be reduced, as compared to the conventional piezoelectric actuator, the processing/assembling cost can be reduced, and the size of the entire actuator unit 66 reduced.

FIG. 13 shows a sixth embodiment of the invention. In the sixth embodiment, the driving means of the focus adjustment mechanism 4 of the observation system of endoscope 1 according to the first embodiment is modified. Specifically, in the sixth embodiment, a first electrostrictive element 72 and a second electrostrictive element 73 are provided as deformation elements within the actuator unit 71.

The first and second electrostrictive elements 72 and 73 are situated in front of and behind a coupling arm 11 of lens frame 10 so as to sandwich the coupling arm 11. A rear end portion of the first electrostrictive element 72 and a front end portion of the second electrostrictive element 73 are fixed on the coupling arm 11.

The lens frame 10 is provided with a first beam portion 10a extending on the front side of the coupling arm 11 and a second beam portion 10b extending on the rear side of the coupling arm 11. In this case, a front end portion of the first beam portion 10a extends on the front side of the guide hole 12, and a rear end portion of the second beam portion 10b extends on the rear side of the guide hole 12, and these two end portions 10a and 10b are put in slidable contact with the lens-barrel 7. The first and second electrostrictive elements 72 and 73 are connected to the external control unit 21 via lead wires 74 and 75.

In addition, a magnet 76 is fitted in the lens-barrel 7 of endoscope 1. The entire lens-barrel 7 is provided with magnetic force by the magnetic force of the magnet 76, whereby the lens frame 10 is attracted and slidably held by the lens-barrel 10.

The operation of the above structure will now be described. When the focus adjustment mechanism 4 of the observation optical system of endoscope 1 is driven, a driving signal having an equilateral-triangular voltage waveform, as shown in FIG. 14, is applied to either the first electrostrictive element 72 or second electrostrictive element 73.

Figure 14:
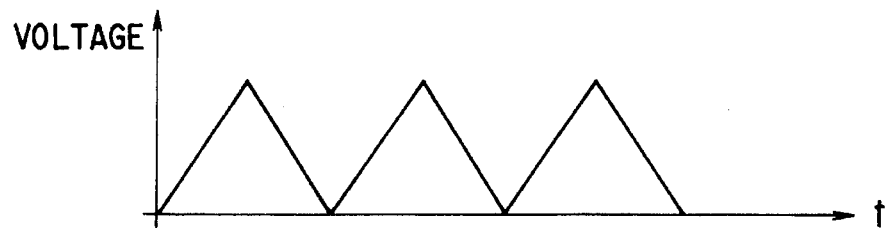
FIG. 14 is a characteristic graph showing a waveform of a driving signal for the actuator shown in FIG. 13.
Figure 15:
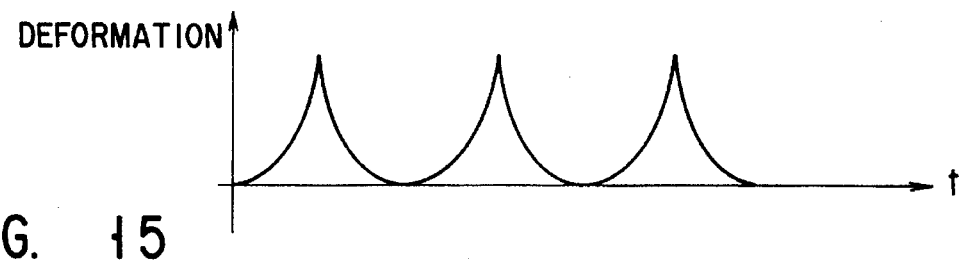
FIG. 15 is a characteristic graph showing the extended/contracted state of an electrostrictive element of the actuator shown in FIG. 13.

When the driving signal of the waveform as shown in FIG. 14 is applied to the first electrostrictive element 72, the first electrostrictive element 72 extends and contracts, as shown in FIG. 15. Thus, an impulse force is generated within the first electrostrictive element 72 at a point where the direction of extension/contraction changes steeply, and the lens frame 10 is moved in a stepwise manner to the right (the direction of retreating) in FIG. 13. When the driving signal of the waveform as shown in FIG. 14 is applied to the second electrostrictive element 73, the lens frame 10 is moved to the left (the direction of advancing) in FIG. 13.

In the above structure, the first electrostrictive element 72 and second electrostrictive element 73 are provided within the actuator unit 71, and when the focus adjustment mechanism 4 is driven, the driving signal of the equilateral-triangular voltage waveform as shown in FIG. 14 is applied to either the first electrostrictive element 72 or second electrostrictive element 73. Thereby, the lens frame 10 is moved forwards and backwards. Therefore, unlike the case where the piezoelectric element 17 according to the first embodiment is situated within the actuator unit 71, the lens frame of the focus adjustment mechanism 4 can be moved forwards and backwards by using the single driving signal having only the equilateral-triangular voltage waveform.

Specifically, the piezoelectric element 17 according to the first embodiment extends/contracts in proportion to the applied voltage. If a driving voltage of a triangular waveform is applied to the piezoelectric element 17, the piezoelectric element 17 extends/contracts in accordance with the triangular waveform. As a result, the impulse force produced when the piezoelectric element 17 is completely extended is equal to the impulse force produced when the element 17 is completely contracted. Thus, the impulse force produced when the piezoelectric element 17 is completely extended cancels the impulse force produced when the element 17 is completely contracted, and the moving member 16 does not move in total. By contrast, the electrostrictive elements 72 and 73 according to the sixth embodiment move in proportion to the square of the applied voltage, and the impulse force produced when the piezoelectric element 72 is completely extended is different from the impulse force produced when the element 73 is completely contracted. Therefore, the moving member 16 can be moved in total.

Figure 16:
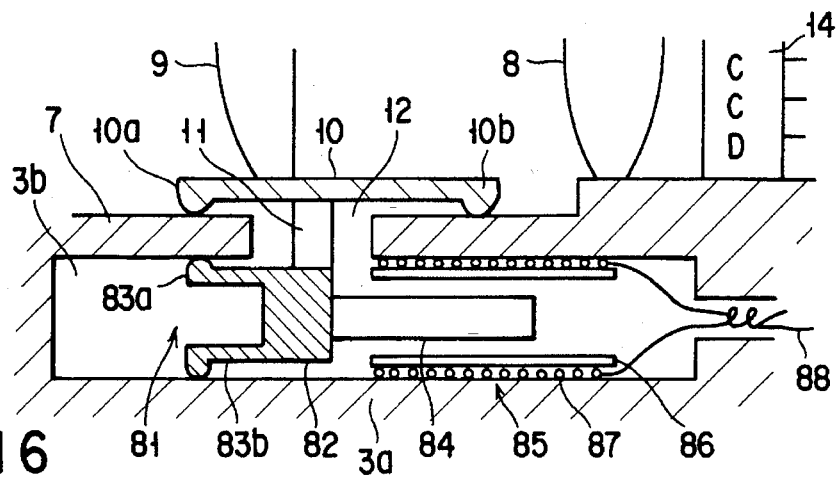
FIG. 16 is a vertical cross-sectional view of an important structure of a seventh embodiment of the invention.
Figure 17:
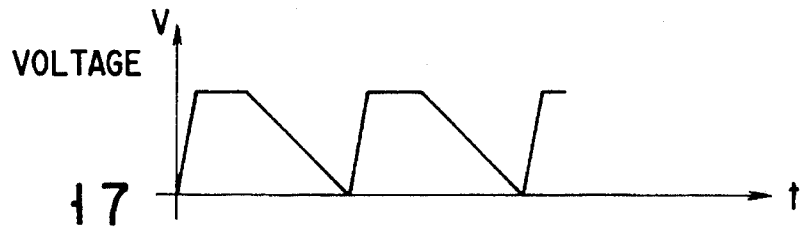
FIG. 17 is a characteristic graph showing a waveform of a driving signal for moving forward the actuator shown in FIG. 16.
Figure 18:
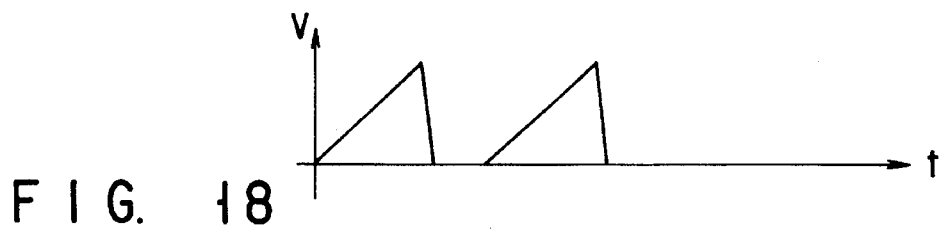
FIG. 18 is a characteristic graph showing a waveform of a driving signal for moving backward the actuator shown in FIG. 16.

FIGS. 16 to 18 show a seventh embodiment of the invention. In the seventh embodiment, the driving means of the focus adjustment mechanism 4 of the observation system of endoscope 1 according to the first embodiment is further modified. Specifically, in the seventh embodiment, a super-magnetostrictive member (an alloy of a rare-earth metal and iron) 84 is provided within the actuator unit 81. The super-magnetostrictive member is made of, e.g. an alloy of nickel, chromium, cobalt, etc. or an aluminum alloy, and these alloys are extended or contracted when a magnetic field is applied thereto. The super-magnetostrictive member 84 is made of a rare-earth-based alloy and has a strain degree which is 1,000 to 10,000 times greater than that of a general magnetostrictive element.

In the actuator unit 81, a moving member 82 is fixed to a lower end portion of a coupling arm 11 of the lens frame 10. The moving member 82 is provided with beam portions 83a and 83b extending forwards. The beam portions 83a and 83b are put in slidable frictional engagement with the inner peripheral surface of the lens-barrel 7 of endoscope 1. A front end portion of the super-magnetostrictive member 84 is fixed to the rear end face of the moving member 82.

Further, the super-magnetostrictive member 84 is surrounded by a driving pipe 85 for driving the super-magnetostrictive member 84. The driving pipe 85 is constructed such that a coil 87 is wound around the outer periphery of a pipe body 86 made of an alnico magnet. A lead wire 88 is connected to the coil 87. The coil 87 is connected to the external control unit 21 via the lead wire 88.

The operation of the above structure will now be described. When the focus adjustment mechanism 4 is driven, a driving signal with a voltage waveform shown in FIG. 17 or a driving signal with a voltage waveform shown in FIG. 18 is applied to the coil 87 of the actuator unit 81. Thereby, the super-magnetostrictive member 84 extends and contracts quickly.

when the driving signal with the voltage waveform shown in FIG. 17 is applied to the coil 87, an impulse force is applied to the moving member 82 by the quick deformation action of the super-magnetostrictive member 84 at this time and thereby the lens frame 10 is slightly slid within the lens-barrel 7 in the forward direction. On the other hand, when the driving signal with the voltage waveform shown in FIG. 18 is applied to the coil 87, an impulse force is applied to the moving member 82 by the quick deformation action of the supermagnetostrictive member 84 at this time and thereby the lens frame 10 is slightly slid within the lens-barrel 7 in the rearward direction.

According to the above structure, the supermagnetostrictive member 84 is provided within the actuator unit 81, and the driving signal with the voltage waveform shown in FIG. 17 or FIG. 18 is applied to the coil 87 of the driving pipe 85 provided around the super-magnetostrictive member 84, thereby driving the super-magnetostrictive member 84. Thus, it is not necessary to connect the lead wire 88 directly to the super-magnetostrictive member 84 within the actuator unit 81. Therefore, when the actuator unit 81 is moved, the lead wire 88 does not become a load. Furthermore, malfunction does not occur due to disconnection of the lead wire 88.

Figure 19:
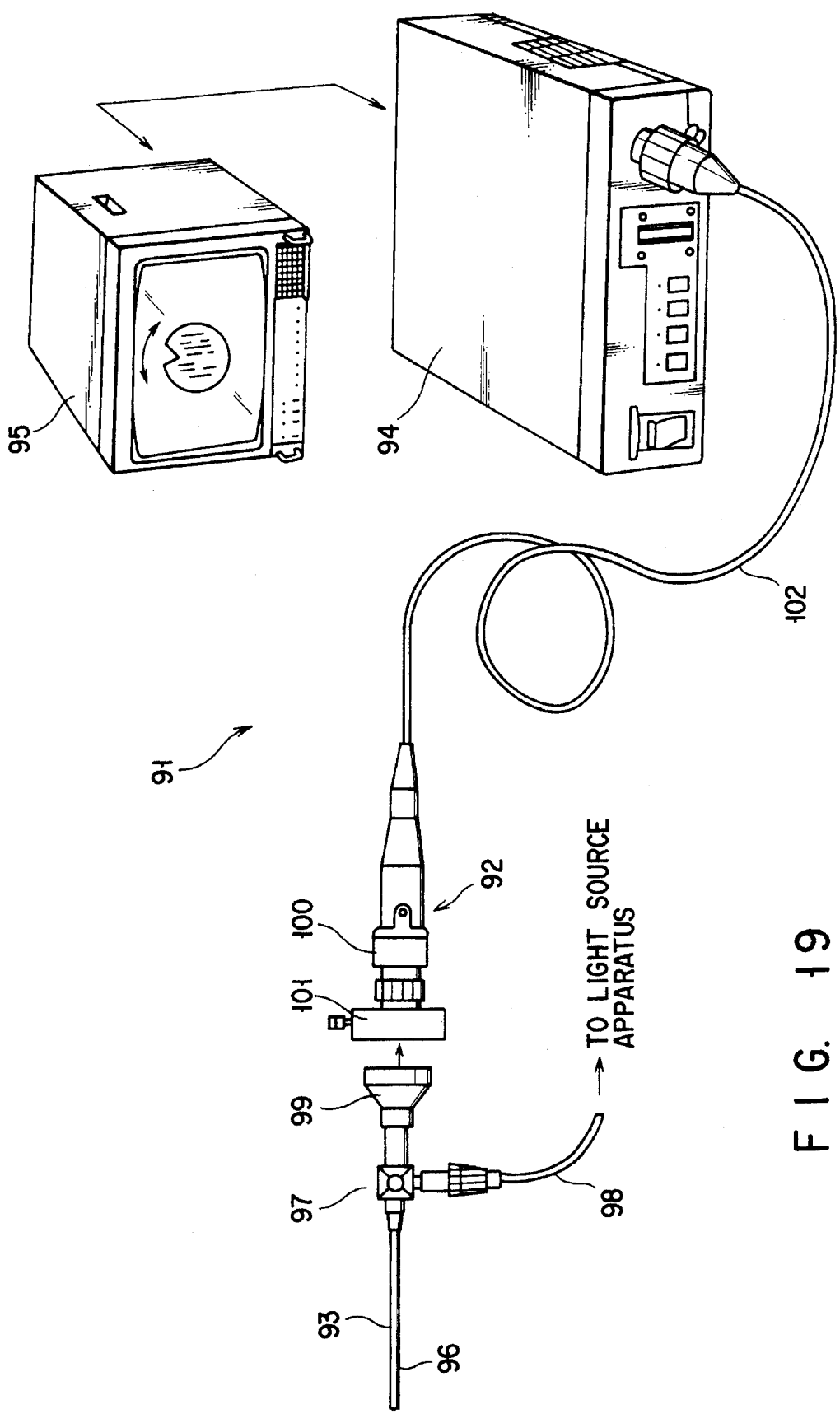
FIG. 19 is a perspective view showing the structure of the entire system of an imaging apparatus for an endoscope according to an eighth embodiment of the invention.

FIGS. 19 to 21 show an eighth embodiment of the invention. FIG. 19 shows the structure of the entire system of an endoscope imaging apparatus 91. Reference numeral 93 denotes an endoscope, 92 an external camera detachably coupled to the endoscope 93, 94 a camera control unit, and 95 a monitor.

As regards the endoscope 93, a proximal-end-side operating unit 97 is attached to a proximal end portion of an insertion portion 96 to be inserted into the living body. A connection cord 98 is detachably connected to the operating unit 97. The operating unit 97 is connected to a light source apparatus (not shown) via the connection cord 98. Besides, an eyepiece 99 is provided on an end portion of the operating unit 97.

A coupling portion 101 for coupling with the endoscope 93 is provided on a distal end portion of a camera body 100 of the external camera 92. The eyepiece 99 of endoscope 93 is detachably coupled to the coupling portion 101.

A connection cord 102 is connected to a proximal end portion of the camera body 100, and the camera body 100 is connected to the camera control unit 94 via the connection cord 102. Furthermore, the camera control unit 94 is connected to the monitor 95. An endoscope image obtained by the external camera 92 is displayed on the monitor 95 via the camera control unit 94.

As is shown in FIG. 20, an aperture mechanism 103 is situated within the external camera 92 on the optical axis of this camera 92. As is shown in FIG. 21, the aperture mechanism 103 is provided with a rotary plate 104 and three aperture blades 105. In this case, each aperture blade 105 is attached to a camera-body-(100)-side stationary portion such that it is rotatable on a rotary shaft 106. In addition, a proximal end portion of each aperture blade 105 is rotatably attached to the rotary plate 104 by means of a coupling pin 107.

A linear actuator 108 for opening/closing the aperture mechanism 103 is situated around a lens holder for each lens 110 of the optical system such that the actuator 108 can move forwards and backwards along the optical axis of the external camera 92. One end portion of a coil sheath 109 is attached to the actuator 108, and the other end portion of the coil sheath 109 is fixed to the rotary plate 104 of the aperture mechanism 103 at a position on the rotary plate 104 which is displaced circumferentially from the axis of the actuator 108.

The operation of the above structure will now be described. When the aperture mechanism 103 is operated, the linear actuator 108 is moved forwards and backwards. In accordance with the operation of the actuator 108, the coil sheath 109 is pushed and pulled. In this case, the rotary plate 104 is rotated by the force of the coil sheath 109 which is pushed and pulled, since the fixing point between the coil sheath 109 and rotary plate 104 is displaced from the axis of the actuator 108 in the circumferential direction of the rotary plate 104. Moreover, the aperture blades 105 are rotated on the rotary shafts 106 by the rotation of the rotary plate 104, and the optical path of the external camera 92 is opened and closed.

In the above structure, when the rotary plate 104 is rotated by the linear actuator 108, the actuator 108 can be situated in parallel to the rotational axis of the rotary plate 104. Thus, as compared to the case where the actuator 108 is situated perpendicular to the rotational axis of the rotary plate 104, an increase in diameter of the aperture mechanism 103 of external camera 92 can be reduced, and therefore the size of the entire external camera 92 can be reduced.

FIGS. 22 to 24 show a ninth embodiment of the invention. FIG. 22 shows a main structure of a stereoscopic solid endoscope 121. In the endoscope 121, a proximal-end-side operating unit 123 is connected, as shown in FIG. 23, to a proximal end portion of a solid insertion portion 122 to be inserted into the living body.

Further, the stereoscopic solid endoscope 121 is provided with a pair of right and left relay optical systems 124a and 124b for stereoscopic observation, and CCDs 125a and 125b for imaging object images transmitted by the relay optical systems 124a and 124b, thereby obtaining right and left object images with a parallax.

The pair of right and left relay optical systems 124a and 124b are housed within the insertion portion 122 of the stereoscopic solid endoscope 121. The relay optical systems 124a and 124b are light-shielded from each other by a light-shielding member (not shown).

In the proximal-end-side operating unit 123, a prism 126 is provided for reflecting object images transmitted through the relay optical systems 124a and 124b in a direction perpendicular to the optical axis of the operating unit 123. In addition, the operating unit 123 includes mirrors 127a and 127b for reflecting the two object images, which have been reflected by the prism 126, in a direction parallel to the optical axis of the relay optical systems 124a and 124b, and image-focusing lenses (not shown) for focusing the images reflected by the mirrors 127a and 127b on the exposed surfaces of the CCDs 125a and 125b. Peripheral circuits 128a and 128b are provided on rear ends of the CCDs 125a and 125b.

The CCDs 125a and 125b are designed to convert the focused right object image and left object image to electric signals and output them to a control unit 130 via the peripheral circuits 128a and 128b and signal cables.

An illumination optical system (not shown) is provided within the stereoscopic solid endoscope 121. Illumination light supplied from a light source device (not shown) is guided to an illumination window portion formed at a distal end of the insertion portion 122 through the illumination optical system, and thereby the illumination light is radiated on the object.

Besides, the control unit 130 includes signal processors 132a and 132b for subjecting the electric signals output from the CCDs 125a and 125b to processing such as &C correction. The signal processors 132a and 132b are connected to a three-dimensional (3D) conversion processor 136 via A/D converters 133a and 133b, frame memories 134a and 134b, and D/A converters 135a and 135b. The 3D conversion processor 136 is connected to a monitor 131.

The image signals output from the signal processors 132a and 132b are A/D converted by the A/D converters 133a and 133b, and the A/D-converted signals are stored in the frame memories 134a and 134b in units of a frame. Subsequently, the signals read out from the frame memories 134a and 134b are D/A converted by the D/A converters 135a and 135b. The outputs from the D/A converters 135a and 135b are displayed on the monitor 131 alternately by the 3D conversion processor 136.

The control apparatus 130 drives the CCDs 125a and 125b, processes electric signals output from the CCDs 125a and 125b, and displays the right and left object images on the monitor 131 alternately, for example, 30 times per second.

In this case, the observer puts on, e.g. spectacles, in which polarizing shutters are built, for alternately opening and closing the right and left fields of vision in synchronism with the switching operation of the display screen of the monitor 131. Thereby, the observer can observe the object as a stereoscopic image. The observer can have stereoscopic sensation by virtue of an afterimage phenomenon. Since the right and left object images transmitted through the two relay optical systems 124a and 124b have a parallax, the observer can view the stereoscopic image.

In order to create stereoscopic images, the right and left images can be displayed on the monitor 131 simultaneously, in addition to the technique wherein these images are displayed alternately.

The A/D converters 133a and 133b are connected to an image error detector 138 for detecting errors of right and left images via contour extraction circuits 137a and 137b. The image error detector 138 is connected to memory controllers 139a and 139b, an error detection button 140 provided in the operating unit 123 of endoscope 121, and an actuator control circuit 149 (described later).

The contours of images are extracted from the image signals output from the A/D converters 133a and 133b by contour extraction circuits 137a and 137b. The outputs from the contour extraction circuits 137a and 137b are compared by the image error detector 138 and errors of the right and left images are detected. Subsequently, read-out of data from the frame memories 134a and 134b is controlled by the memory controllers 139a and 139b in accordance with the output from the image error detector 138.

When the error detection button 140 of the operating unit 123 of the endoscope 121 is depressed, the image error detector 138 detects errors of the right and left images. The memory controllers 139a and 139b control the address read-out orders in the frame memories 134a and 134b so as to make the degrees of errors of right and left images coincide with each other.

The control unit 130 may detect the degrees of errors of right and left images only once. Alternatively, it may detect the errors of the right and left images once again by means of the image error detector 138, thereby confirming that errors of the right and left images have fallen within a proper range. If the errors are out of the proper range, the errors of the right and left images are adjusted once again so that they coincide with each other. Image signals read out from the frame memories 134a and 134b are viewed by the observer as stereoscopic object images, the display positions of which coincide with each other substantially.

The stereoscopic solid endoscope 121 is provided with a convergence angle adjusting mechanism 141 which adjusts a convergence angle θ defined between the optical axes of right and left incidence beams traveling through the right and left relay optical systems 124a and 124b. As is shown in FIG. 24, the convergence angle adjusting mechanism 141 includes a pair of prisms 142a and 142b which are situated on the optical axis of both eyes within an observation window 122W in a distal end face of the insertion portion 122. The prisms 142a and 142b are fixed on inner end portions of mount bases 143a and 143b. The mount bases 143a and 143b are rotatably attached to the stationary portion of the insertion portion 122 via support shafts 144a and 144b.

Rods 145a and 145b are fixed at one end to outer end portions of the mount bases 143a and 143b via coupling rubbers 146a and 146b. The rods 145a and 145b are connected at the other end to actuators 147a and 147b constructed, for example, similarly with the piezoelectric actuator according to the first embodiment. The actuators 147a and 147b are movable along the optical axis. The actuators 147a and 147b are connected to the actuator control circuit 149 via lead wires 148a and 148b.

The operation of the convergence angle adjusting mechanism 141 of the stereoscopic solid endoscope 121 having the above structure will now be described. Images obtained from the right and left eyes of the endoscope 121 are subjected to signal processing, the degrees of errors of the right and left images are detected by the image error detector 138 (a good 3D image is not obtained if the degrees of errors are large), and a 3D image is obtained. At this time, data items representing the degrees of errors are simultaneously fed to the actuator control circuit 149.

The actuator control circuit 149 moves the actuators 147a and 147b back and forth on the basis of an output signal from the image error detector 138. The mount bases 143a and 143b are rotated on the support shafts 144a and 144b in accordance with the operations of the actuators 147a and 147b, so that the prisms 142a and 142b are rotated in the directions of double-headed arrows in FIG. 22. Thus, the convergence angle θ is varied.

In accordance with the variation of convergence angle θ, the intersection of optical axes of incident light beams from the right and left eyes of the endoscope 121 moves. In this case, the actuator control circuit 149 controls the actuators 147a and 147b so that the intersection of the optical axes of right and left incident beams lies at the object to be observed (when the intersection of the optical axes of right and left incident beams lies at the object to be observed, the degrees of errors of right and left images are minimum).

In the above structure, since the intersection of the optical axes of right and left incident beams can be positioned at the object to be observed, by the control of the convergence angle adjusting mechanism 141 of the stereoscopic solid endoscope 121, a 3D image can be obtained even if the distance between the object to be observed and the endoscope 121 varies.

FIG. 25 shows a tenth embodiment of the invention wherein the structure of the driving means for the focus adjusting mechanism 4 of the observation system of endoscope 1 according to the first embodiment is modified. Specifically, in the tenth embodiment, a substantially L-shaped moving member 152 is provided within an actuator unit 151. A distal end portion of a horizontal portion 153 of the moving member 152 is provided with a coupling unit 154 having an insertion hole in which a coupling arm 11 of a lens frame 10 is loosely inserted.

A first piezoelectric element 156 situated in a direction perpendicular to the optical axis of the focus adjusting lens 9 is provided on the proximal-end-side of the horizontal portion 153 of the moving member 152. When the first piezoelectric element 156 is extended, the moving member 152 is put in tighter frictional engagement with the lens-barrel 7. The horizontal portion 153 of the moving member 152 is coupled to the coupling arm 11 of the lens frame 10.

A second piezoelectric element 157 is attached to a vertical portion 155 coupled to the rear end portion of the horizontal portion 153 of the moving member 152, such that the extension/contraction direction of the second piezoelectric element 157 is parallel to the optical axis of the focus adjusting lens 9.

The first piezoelectric element 156 is connected to a first amplifier 160, shown in FIG. 26, via a lead wire 158. The first amplifier 160 is connected to a phase-shifter circuit 162 via an edge trigger circuit 161.

The second piezoelectric element 157 is connected to a second amplifier 163 via a lead wire 159. The second amplifier 163 is connected to the phase-shifter circuit 162 via a second piezoelectric element pulse circuit 164. FIG. 27 shows timing charts wherein (A) shows an output from the second piezoelectric element pulse circuit 164, (B) shows an output from the phase-shifter circuit 162, and (C) shows an output from the edge trigger circuit 161.

The operation of the above structure will now be described. When the focus adjusting mechanism 4 of the observation optical system of endoscope 1 is driven, a rectangular-wave pulse, the phase of which has been advanced suitably with respect to a driving pulse (triangular- or parallelepiped-wave pulse) for the second piezoelectric element 157, is applied to the first piezoelectric element 156. Thereby, driving pulses, which have been adjusted to make the timing of the rising edge of the triangular wave (or parallelepiped wave) substantially equal to that of the rising edge of the rectangular wave, are applied to the first piezoelectric element 156 and second piezoelectric element 157. Thus, when an impulse force due to the second piezoelectric element 157 is exerted to the moving member 152, the first piezoelectric element 156 contracts and the frictional force acting on the moving member 152 decreases. Therefore, the impulse force to the moving member 152 does not decrease due to friction, and the moving member 152 can be moved greatly.

Moreover, the lens 9, along with the lens frame 10, is moved back and forth along the optical axis according to the movement of the moving member 152, thus effecting zooming or focusing of the observation optical system of endoscope 1.

With the above structure, too, the same advantage as in the first embodiment can be obtained, and the amount of movement of the moving member 152 at the time of driving the focus adjusting mechanism 4 can be increased. Therefore, the operation speed for zooming or focusing of the observation system of endoscope 1 can be increased.

FIG. 28 shows an eleventh embodiment wherein the structure of the driving means for the focus adjusting mechanism 4 of the observation system of endoscope 1 according to the first embodiment is further modified. Specifically, in this embodiment, a hollow moving member 172 is situated within an actuator unit 171. A permanent magnet 174 is fitted within the moving member 172. A coupling arm 11 of a lens frame 10 is coupled to the permanent magnet 174 by attraction force.

A piezoelectric element 173 is attached to the moving member 172. Flexible cables 175a and 175b are connected to positive (+) and negative (−) poles of the piezoelectric element 173 by means of an electrically conductive adhesive.

As is shown in FIG. 30, each of the flexible cables 175a and 175b is constructed such that a conductor of a copper foil 177 is formed integrally on a polyimide film (insulative film) 176. An electrode mounting portion 178 is formed at one end portion of the copper foil 177. Each flexible cable 175a, 175b has an original shape, as shown in FIG. 30. When the actuator unit 171 is moved, the flexible cables 175a and 175b are folded so as not to interfere with each other, as shown in FIG. 29.

The operation of the above structure will now be described. When the focus adjusting mechanism 4 of the observation optical system of endoscope 1 is driven, the moving member 172 is put in frictional engagement with the lens-barrel 7 by the action of the permanent magnet 174. If a triangular- or parallelepiped-wave driving signal is applied to the piezoelectric element 173, an impulse force is exerted on the moving member 172 and the moving member 172 slides. At the same time, the lens 9 moves to effect zooming or focusing.

With the above structure, too, the same advantage as in the first embodiment is obtained, without the need to attach the lens frame 10 to the moving member 172. Thus, the assembly of the actuator unit 171 is easier.

FIG. 31 shows a twelfth embodiment wherein the structure of the driving means for the focus adjusting mechanism 4 of the observation system of endoscope 1 according to the first embodiment is further modified. Specifically, in this embodiment, contact electrodes 182a and 182b are electrically connected to positive (+) and negative (−) electrodes of a piezoelectric element 17 of an actuator unit 181. Distal end portions of the contact electrodes 182a and 182b are put in contact with positive (+) and negative (−) electrode plates 183a and 183b provided within a lens barrel 7. The (+) and negative (−) electrode plates 183a and 183b are connected to positive (+) and negative (−) lead wires.

FIG. 32 shows an actuator driving circuit 191 including an astable multivibrator 192 to which a duty ratio variable resistor is connected. The astable multivibrator 192 is connected to first and second one-shot vibrators 193 and 194.

The first one-shot vibrator 193 is connected to a first contact point of a second analog switch 197 via a first analog switch 195. A common contact point of the second analog switch 197 is connected to an amplifier circuit 199 via an output switch 198. The amplifier circuit 199 is connected to a laminated piezoelectric element 17 via a lead wire.

The second one-shot vibrator 194 is connected to a second contact point of the second analog switch 197 via a third analog switch 196. The second analog switch 197 is connected to a waveform changing switch 200. The second analog switch 197 is operated in accordance with the operation of the waveform changing switch 200.

The operation of the above structure will now be described. A triangular-wave pulse (V1) and a parallelepiped-wave pulse (V2) for moving the actuating unit 181 back and forth are formed in the following manner. As is shown in FIG. 33, the analog switches 195 and 196 are switched according to rectangular pulses produced by the one-shot vibrators 193 and 194, and thereby outputs from the analog switches 195 and 196 are switched between 0 V and 5 V. In this time, these outputs are integrated by RC circuits connected thereto.

In this case, a pulse of desired frequency is output from the multivibrator 192. At the rising edge of the pulse, rectangular pulses are output from the one-shot vibrators 193 and 194. These output pulses are shaped by the analog switches 195 and 196 and the peripheral RC circuits, thus producing triangular- and parallelepiped-wave signals. Further, the triangular-wave pulse or parallelepiped-wave pulse is selected by the second analog switch 197, and the selected pulse is fed to the amplifier circuit 199. This amplifier circuit 199 supplies the piezoelectric element 17 with power.

The one-shot vibrators 193 and 194 are triggered by a rectangular pulse (MY) from the astable multi-vibrator 192. If the oscillation frequency of the astable multivibrator 192 is changed, the rate of occurrence of triangular- or parallelepiped-wave pulses per unit time is varied and accordingly the velocity of movement of the actuator unit 181 is varied.

Even if the frequency of the multivibrator 192 is changed, the rising speed or falling speed of the waveform signals output from the analog switches 195 and 196 and RC circuits does not vary. However, since the number of pulses per unit time varies, the velocity of movement of the actuator unit 181 varies. In addition, the parallelepiped-wave pulse and triangular-wave pulse are switched when the switch 200 changes the voltage applied to the analog switch 197.

By the above-described operation, the actuator unit 181 is moved back and forth along the optical axis of the endoscope 1, thereby effecting zooming or focusing of the focus adjusting mechanism 4 of the observation optical system.

In the above structure, the contact electrodes 182a and 182b are electrically connected to positive (+) and negative (−) electrodes of the piezoelectric element 17 of actuator unit 181, and distal end portions of the contact electrodes 182a and 182b are put in contact with positive (+) and negative (−) electrode plates 183a and 183b provided within the lens barrel 7. Thus, the actuator unit 181 can be supplied with power without moving lead wires.

The actuator driving circuit 191 is free from the drawback: if a triangular- or parallelepiped-wave driving frequency is simply changed, the waveform varies and therefore a proper impulse force cannot be exerted and the piezoelectric element 17 may be destroyed by stress concentration occurring therein. Therefore, the actuator unit 181 can be driven stably.

Figure 34:
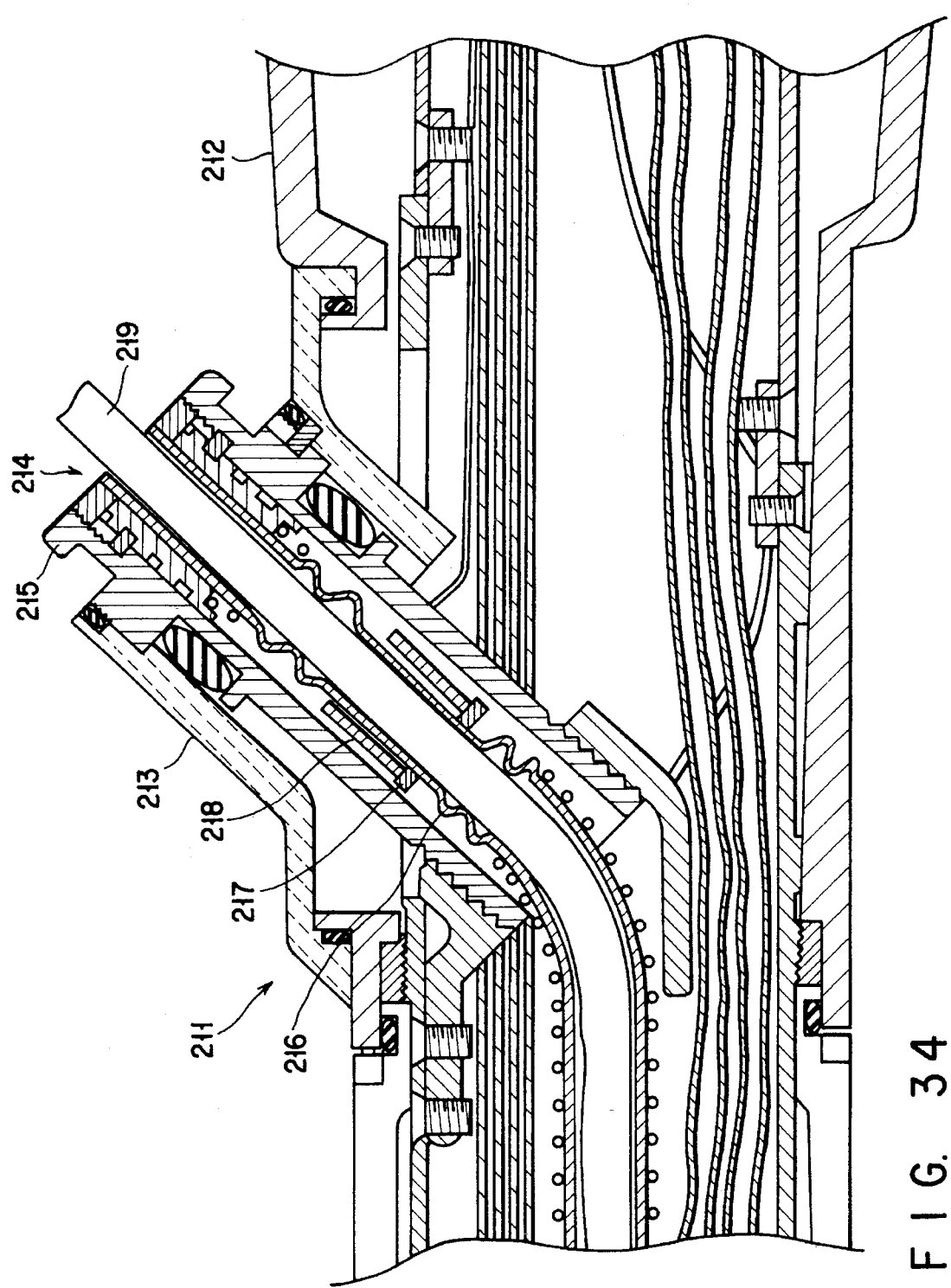
FIG. 34 is a vertical cross-sectional view showing an important structure of a 13th embodiment of the invention.

FIG. 34 shows a 13th embodiment wherein an annular fixing member 217 is attached on the outside of a channel tube 216 of a forceps tap 214 mounted in a treatment instrument insertion body 213. The insertion body 213 is projected from an operating unit 212 of endoscope 211. In addition, a cylindrical piezoelectric element 218 is attached to the fixing member 217.

In this case, the fixing member 217 is fixed to a forceps body 215 of the forceps tap 214 by means of an elastic member. A treatment instrument 219 is slidably inserted in the channel tube 216.

The operation of the above structure will now be described. When an impulse force is applied to the fixing member 217 by the piezoelectric element 218, the channel tube 216 and treatment instrument 219 slide on each other. At this time, the fixing member 217 restores to the original position by the elastic force of the elastic member, and therefore the channel tube 216 and the treatment instrument 219, which is frictionally engaged with the channel tube 216, moves along with the fixing member 217. At last, the treatment instrument 219 moves within the channel tube 216.

By virtue of the above structure, the treatment instrument 219 can be automatically inserted into the endoscope 211 only by slightly inserting the instrument 219 in the forceps tap 214. In addition, there is no need to finely adjust the insertion position of the treatment instrument 219.

Figure 35:
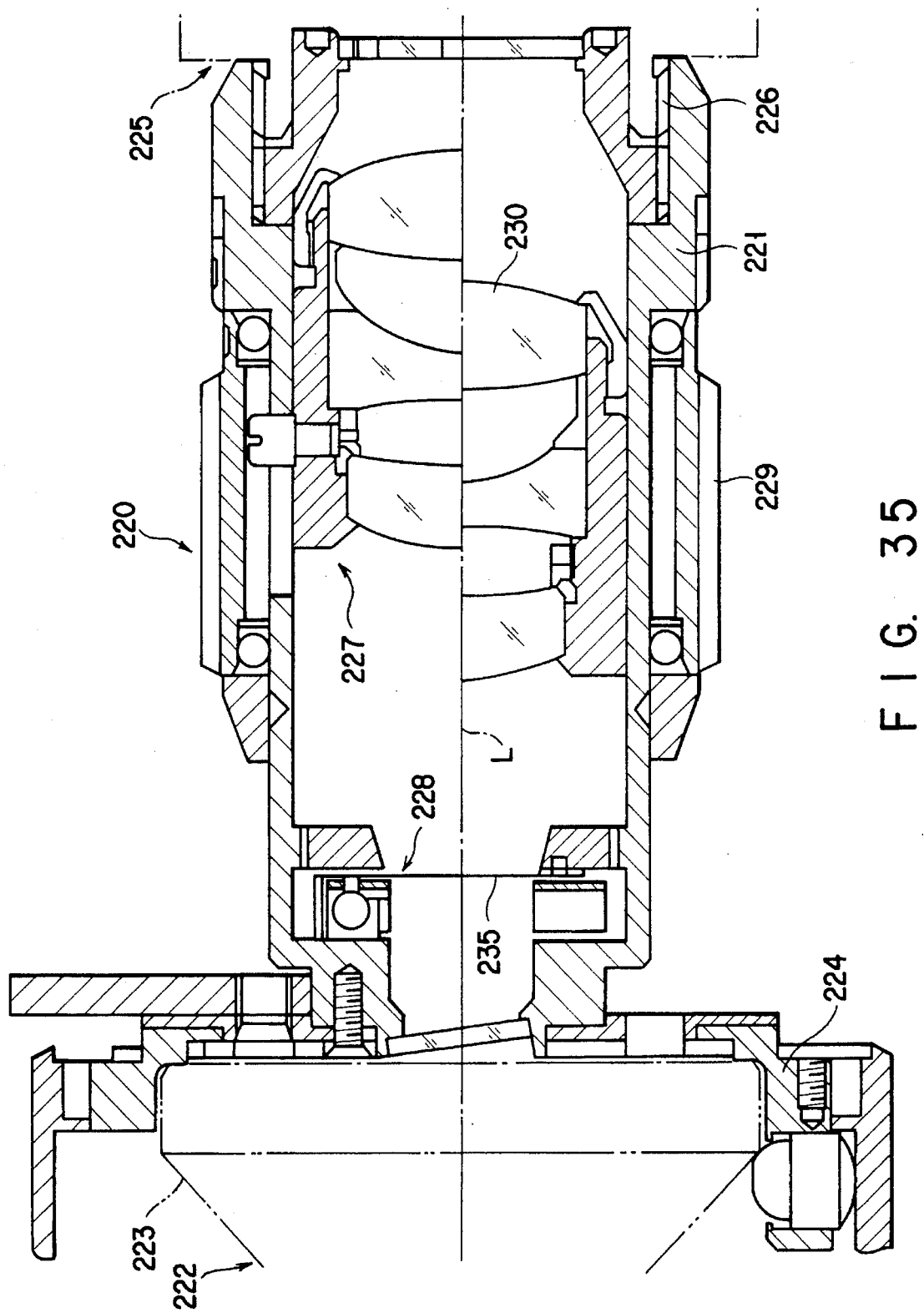
FIG. 35 is a vertical cross-sectional view showing a 14th embodiment of the invention wherein the apparatus of this invention is applied to an aperture mechanism in a TV camera adapter of an endoscope.

FIGS. 35 to 37 show a 14th embodiment of the invention wherein the actuator apparatus of this invention is applied to an aperture mechanism in a TV camera adapter 220 of an endoscope. In FIG. 35, reference numeral 221 denotes a lens-barrel of the adapter 220. One end portion of the lens-barrel 221 is provided with a first mounting portion 224 which is detachably coupled to an eyepiece 223 of the endoscope 122. The other end portion of the lens-barrel 221 is provided with a second mounting portion 226 in which the TV camera 225 is detachably mounted.

The lens-barrel 221 of adapter 220 is provided with a focus adjusting mechanism 227 and an aperture mechanism 228. The focus adjusting mechanism 227 is provided with an adjusting ring 229. By rotating the adjusting ring 229, the position of a lens group 230 on the optical axis L is varied to adjust focus.

The aperture mechanism 228 adjusts the stop degree by rotating a plurality of aperture blades 235 of an aperture mechanism portion (described later). The aperture mechanism 228 will now be described specifically. As is shown in FIG. 36, the aperture mechanism 228 is equipped with an annular rotary disc 236 which rotates about the optical axis L. A moving member 237 is provided on one face of the rotary disc 236. A laminated piezoelectric element 238 is fixed on the moving member 237.

The rotary disc 236 is provided with a piezoelectric element frame 239 in which the piezoelectric element 238 is attached. A groove 240 for attachment of the piezoelectric element 238, which extends in a direction tangent to an imaginary circle defined about the optical axis L, is formed in the piezoelectric element frame 239. The piezoelectric element 238 is situated within the attachment groove 240 such that the element 238 can extend and contract in the tangent direction to the imaginary circle defined about the optical axis L.

The moving member 237 and rotary disc 236 are formed as one unit, and a substantial rotatable body is constituted. As is shown in FIG. 37, one side face of the moving member 237 is put in slidable pressure contact with the wall of the frame 241 of the lens-barrel 221, and the other side face of the moving member 237 is put in slidable pressure contact with the wall of the rotary disc 236. Accordingly, if the aforementioned driving voltage is applied to the piezoelectric element 238, the rotary disc 236 can be rotated.

The rotary disc 236 is provided with three aperture blades 235 equidistantly. A substantially ring-shaped aperture holding member 240a is situated to be opposed to the outer face of the rotary disc 236. Support pins 241a for the aperture blades 235 are erected on the aperture holding member 240a. A middle portion of each aperture blade 235 is held pivotally by a support pin 241a. A proximal end portion of each aperture blade 235 is coupled to a driving pin 242 erected on the rotary disc 236. If the rotary disc 236 is rotated, the aperture blades 235 rotate on the support pins 241, thereby adjusting the aperture degree.

Guide holes 244 are formed in the rotary disc 236. Pins 243 provided between the piezoelectric element frame 239 and aperture holding member 240a are fitted in the guide holes 244. Movement of each pin 243 is restricted at both ends of each guide hole 244, thereby defining the range of rotation of the rotary disc 236.

Figures 38, 39:
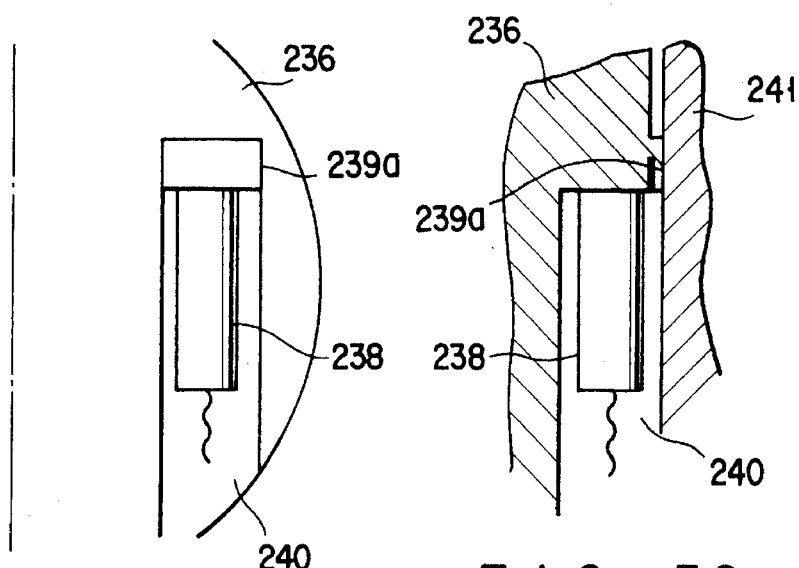
FIG. 38 is a view for describing an important portion of a modification of the 14th embodiment.
FIG. 39 is a vertical cross-sectional view showing the state in which the piezoelectric element according to the modification shown in FIG. 38 is attached.

In the above embodiment, the moving member 237 is provided separately from the rotary disc 236. However, a structure as shown in FIGS. 38 and 39 may be adopted. Specifically, in FIGS. 38 and 39, the attachment groove 240 for the piezoelectric element 238 is formed in the rotary disc 236, and the piezoelectric element 238 situated within the attachment groove 240 is attached directly to the rotary disc 236. In this case, as shown in FIG. 39, a projecting portion 239a is formed on a portion of the rotary disc 236, and the projecting portion 239a is put in slidable pressure contact with the wall of the frame 241 of lens-barrel 221.

Figure 40:
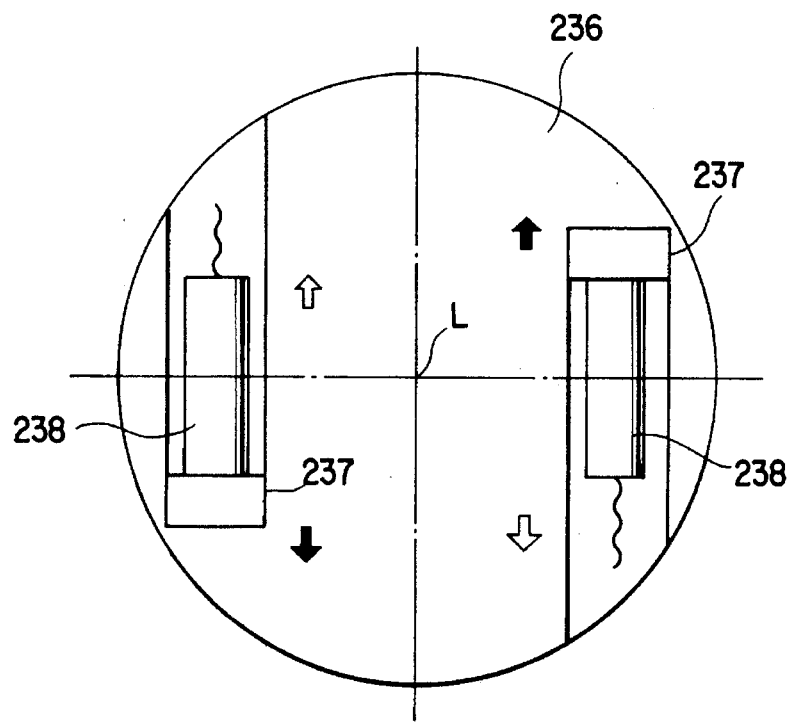
FIG. 40 is a view for describing an important portion of another modification of the 14th embodiment.

Moreover, as is shown in FIG. 40, a plurality of piezoelectric elements 238 may be arranged in point-symmetry with respect to the optical axis L.

FIG. 41 shows a 15th embodiment of the invention wherein a piezoelectric actuator is assembled in a curved portion 251 of an insertion portion of an endoscope. Specifically, the curved portion 251 comprises a distal curve component 252 and an intermediate curve component 253. A distal end portion of the intermediate curve component 253 is pivotally coupled to a rear end portion of the distal curve component 252.

The distal curve component 252 and intermediate curve component 253 are coupled by a pair of pivotal connection pins 254 such that the components 252 and 253 can bend vertically. Coupling portions between the distal curve component 252 and intermediate curve component 253 constitute frictional engagement portions 255 which are fastened by the pivotal connection pins 254 to produce predetermined frictional force.

The distal curve component 252 and intermediate curve component 253 are provided with a piezoelectric actuator which will now be described. Specifically, the distal curve component 252 functions as a moving member 256 in relation to the intermediate curve component 253, and the intermediate curve component 253 functions as a stationary member 257 in relation to the distal curve component 252.

The distal curve component 252 and intermediate curve component 253 are movable (rotatable) relative to each other via the frictional engagement portions 255. Laminated piezoelectric elements 258 are attached to an upper face portion and a lower face portion of a rotational end portion of the distal curve component 252. In this case, a pair of upper and lower recesses 259 are formed in the outer periphery of the rotational end portion of the distal curve component 252. The laminated piezoelectric elements 258 are attached to the outer periphery of the distal curve component 252 in the state in which the piezoelectric elements 258 are contained in the recesses 259. Layers of each laminated piezoelectric element 258 are laminated in a direction perpendicular to the axis of the distal curve component 252. More specifically, the upper and lower laminated piezoelectric elements 258 are arranged symmetrically in a vertical direction, and the extension/contraction direction of each piezoelectric element 258 is set to be tangent to an imaginary circle defined about the rotational center of the distal curve component. In this case, the pair of laminated piezoelectric elements 258 are situated in opposite directions.

The outer surface of each laminated piezoelectric element 258 is not substantially provided with another member such as an inertia member. This embodiment, however, covers a structure wherein a piezoelectric element is held by, e.g. an elastic member, for which an action of an inertia member is not expected. Each laminated piezoelectric element 258 is connected to a lead wire (not shown) through which a driving voltage is applied. The lead wire is connected to an actuator driving control apparatus through the insertion portion of the endoscope.

In the above structure, the driving voltage is applied selectively to either of the upper and lower piezoelectric elements 258. By quick deformation of the piezoelectric element 258, a rotational moment is applied from the piezoelectric element 258 to the distal curve component 252 so as to rotate the distal curve component 252 on the pivotal pins 254. Thus, the distal curve component 252 is rotated relative to the intermediate curve component 253. With the above structure, too, the piezoelectric actuator for applying a bending force is constituted by only the moving member 256 and piezoelectric element 258, and a separate inertia member used in the conventional piezoelectric actuator is omitted. Therefore, as compared to the conventional actuator, the number of structural parts is reduced, and the processing and assembly costs can be decreased. In addition, the entire unit of the piezoelectric actuator can be reduced in size and, accordingly, it can be easily assembled in the curved portion 251 of the flexible tube of the endoscope. Furthermore, when an external mechanical shock is applied, an excessive shock does not occur in the piezoelectric element 258 and this element 258 is not easily destroyed.

Besides, the moving member 256 is constituted by making use of the distal curve component, and the stationary member 257 is formed by making use of the intermediate curve component 253, and the piezoelectric elements 258 can be built in compactly by making use of the outer periphery of the distal curve component 252. Thus, the structural members of the curved portion 251 of the flexible tube can be used effectively. In particular, the number of structural parts can be reduced, and the processing and assembling costs reduced. Furthermore, the curved portion 251 of the flexible tube can be reduced in diameter and size.

FIG. 42 shows a 16th embodiment of the invention wherein the piezoelectric elements 258 are built in a manner different from that in the 15th embodiment. Specifically, piezoelectric elements 258 are attached to those portions of the inner periphery of the rear edge portion of the distal curve component 252, which are eccentric to the rotational center of the curve component 252. The direction of lamination of each piezoelectric element 258 coincides with the axial direction of the distal curve portion 252.

In this embodiment, too, the driving voltage is applied selectively to either of the upper and lower piezoelectric elements 258. By quick deformation of the piezoelectric element 258, a rotational moment is applied from the piezoelectric element 258 to the distal curve component 252 so as to rotate the distal curve component 252 on the pivotal pins 254. Thus, the distal curve component 252 is rotated relative to the intermediate curve component 253. With the above structure, the same advantage as in the 15th embodiment can be obtained.

Figure 44:
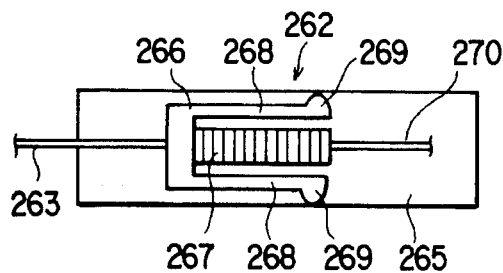
FIG. 44 is a view for describing the structure of a piezoelectric actuator according to the 17th embodiment.

FIGS. 43 and 44 show a 17th embodiment of the invention wherein a curved portion 261 of an insertion flexible tube 260 of an endoscope is made flexible over the entire length. Specifically, the curved portion 261 includes a plurality of curve components 264. Each curve component 264 is vertically rotatable on a pair of right and left rotational pins 264a.

Piezoelectric actuators 262 are situated within the flexible tube 260 in upper and lower regions. The piezoelectric actuators 262 are connected respectively to proximal end portions of angle wires 263. A distal end portion of each angle wire 263 is fixed to a foremost one of the curve components 264 of the curved portion 261. The aforementioned driving voltage is applied selectively to either of the upper and lower piezoelectric actuators 262, and the angle wire 263 associated with the selected actuator 262 is pulled and consequently the curved portion 261 is curved.

The piezoelectric actuator 262 is constructed, as shown in FIG. 44, and it comprises a moving member 266 situated within a cylindrical stationary member (base) 265, and a laminated piezoelectric element 267 coupled to the moving member 266. An inertia member as a separate member is not provided.

A plurality of leg portions 268 extend rearwards from a proximal portion of the moving member 266. The leg portions 268 are elastically opened outwards. A slide-contact projection 269 is provided on an outer portion of a distal portion of each leg portion 268. The projection 269 is put in elastic pressure contact with the inner surface of the stationary member 265.

A front end portion of the laminated piezoelectric element 267 is attached to a proximal end portion of the moving member 266. In this case, the other end portion of the piezoelectric element 267 is a free end portion extending rearwards. When the voltage is applied to the piezoelectric element 267, the piezoelectric element 267 extends and contracts in the direction of lamination.

A flexible lead wire 270 is connected to the free end portion of the piezoelectric element 267. The aforementioned driving signal is applied to the piezoelectric element 267 via the lead wire 270, and thereby the moving member 266 moves in the direction of lamination of the piezoelectric element 267 along the inner wall of the stationary member 265.

A proximal end portion of each angle wire 263 is attached to the moving member 266 of the corresponding piezoelectric actuator 262. Distal end portions of angle wires 263 extend up to the curved portion 261 and they are coupled to upper and lower end portions of the foremost curve component 264.

For example, if the upper piezoelectric actuator 262 is driven to pull the upper angle wire 263, the curved portion 261 is bent upwards. If the lower piezoelectric actuator 262 is driven to pull the lower angle wire 263, the curved portion 261 is bent downwards.

Figure 45:
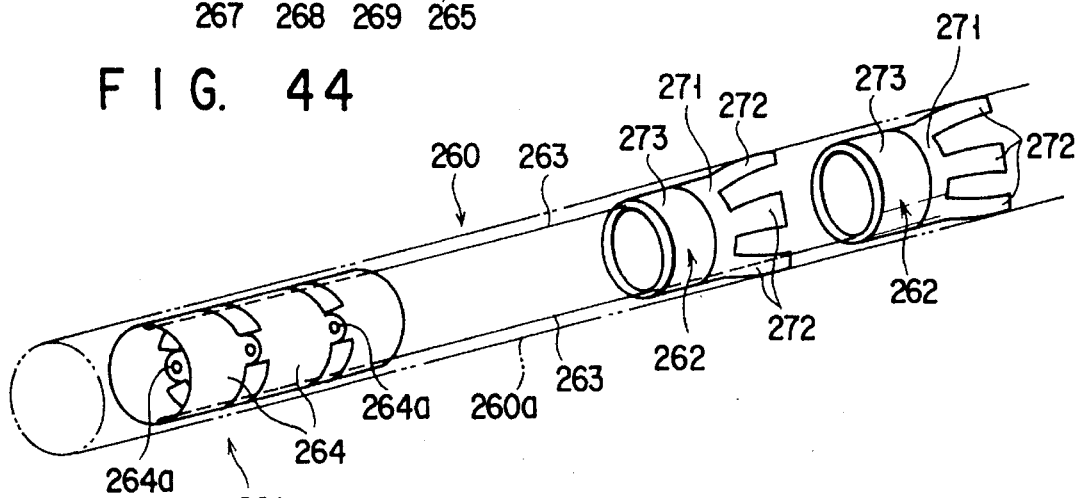
FIG. 45 is a view for describing the structure of a piezoelectric actuator according to an 18th embodiment of the invention.
Figure 46:
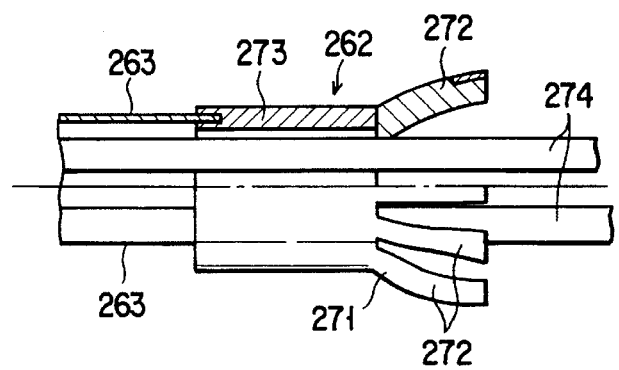
FIG. 46 is an enlarged, cross-sectional view of an important portion of the 18th embodiment; 10

FIGS. 45 and 46 show an 18th embodiment of the invention wherein, like the 17th embodiment, angle wires 263 are pulled by upper and lower piezoelectric actuators 262 situated within the flexible tube 260, thereby bending the curved portion 261 of the insertion flexible tube 260 of the endoscope.

However, the 18th embodiment differs from the 17th embodiment with respect to the structure of the piezoelectric actuator 262. Specifically, in the 17th embodiment, the stationary member is constituted by a body 260a of the flexible tube 260. Furthermore, a pair of front and rear piezoelectric actuators 262 are situated within the flexible tube 260.

Each piezoelectric actuator 262 is provided with a hollow moving member 271 which is put in slidable contact with the inner periphery of the flexible tube 260. As is shown in FIG. 46, the moving member 271 is coupled to a cylindrical laminated piezoelectric element 273. An inertia member as a separate member is not provided. A plurality of leg portions 272 are extended rearwards from the proximal end portion of the moving member 271. These leg portions 272 are elastically opened outwards and put in slidable contact with the inner periphery of the flexible tube 260.

Proximal end portions of angle wires 263 are attached respectively to the laminated piezoelectric elements 273 of the front and rear piezoelectric actuators 262. Distal end portions of the angle wires 263 are extended up to the curved portion 261 and coupled to the upper and lower end portions of the foremost curve component 264.

For example, if the front piezoelectric actuator 262 is driven to pull the upper angle wire 263, the curved portion 261 is bent upwards. If the rear piezoelectric actuator 262 is driven to pull the lower angle wire 263, the curved portion 261 is bent downwards.

An internal structural part 274 such as a light guide or an image guide is inserted in the hollow moving member 271 and laminated piezoelectric element 273. With this structure, the space for installing the piezoelectric actuators 262 is efficiently used, and the diameter of the flexible tube 260 can be decreased.

Figure 47:
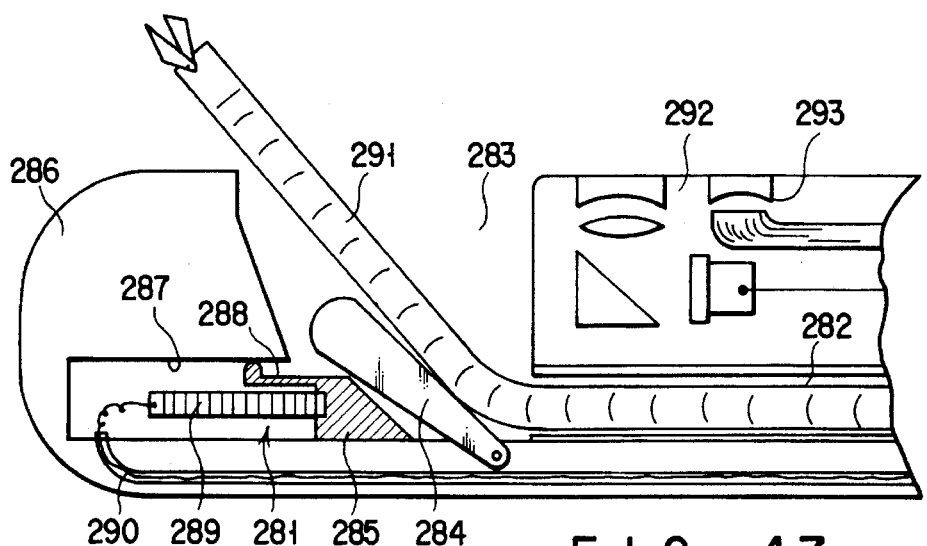
FIG. 47 is a cross-sectional view showing an important structure of a 19th embodiment of the invention.

FIG. 47 shows a 19th embodiment of the present invention. In this embodiment, a piezoelectric actuator 281 is utilized to actuate a forceps raising member 284 provided at a channel opening 283 of a forceps channel 282 of a side-view endoscope.

The channel opening 283 is formed in an outer peripheral surface of a distal portion body 286 of the endoscope. A proximal end portion of the forceps raising member 284 is pivotally attached to a bottom portion in the channel opening 283 of the distal portion body 286.

A guide hole 287 in which the piezoelectric actuator 281 is mounted is formed within the distal portion body 286. The guide hole 287 is opposed to the forceps channel 282 and extends along the axis of the insertion portion of the endoscope. A moving member 285 of the piezoelectric actuator 281 is slidably contained within the guide hole 287. The moving member 285 is situated to face the rear face of the forceps raising member 284.

The moving member 285 is provided with a leg portion 288 which is in elastic contact with the inner face of the guide hole 287. The moving member 285 is coupled to a laminated piezoelectric element 289. The outer periphery of the piezoelectric element 289 is subjected to water proof treatment, for example, by applying a parillin coating thereto.

A lead wire 290 is connected to the laminated piezoelectric element 289. When the aforementioned driving signal is applied to the piezoelectric element 289 via the lead wire 290, the moving member 285 moves back and forth in the direction of lamination of the piezoelectric element 289 along the inner wall of the guide hole 287. In addition, the forceps raising member 284 is actuated in accordance with the movement of the moving member 285, thereby selecting the direction in which a treatment instrument 291 is advanced. In FIG. 47, reference numeral 292 denotes an illumination optical unit and numeral 293 denotes an observation optical unit, both situated within the distal portion body 286.

FIGS. 48 to 52 show a 20th embodiment of the invention. As is shown in FIGS. 48 and 49, a piezoelectric actuator unit 301 includes a moving member 303, which is in slidable contact with a cylindrical stationary member (base) 302, and a laminated piezoelectric element 304. The moving member 303 has a plurality of leg portions 306 extending rearwards from a proximal portion 305 with elasticity. A distal outer portion of each leg portion 306 is provided with a slide-contact projection 307. This projection 307 is put in elastic pressure contact with the inner surface of the stationary member 302.

The laminated piezoelectric element 304 comprises a plurality of laminated crystal plates (structural elements) 308. A front end portion of the crystal plates 308 in the direction of lamination is attached to the proximal portion of the moving member 303.

A rear end portion of the piezoelectric element 304 is a free end portion projecting rearwards. The free end portion of the piezoelectric element 304 is not substantially provided with an inertia member as a separate member. This, however, does not exclude cases where a member, for which an action of an inertia member is not expected, is used, or the piezoelectric element 304 is held by, e.g. an elastic member. When a voltage is applied to the piezoelectric element 304, the piezoelectric element 304 extends and contracts in the direction of lamination of the crystal plates 308.

As is shown in FIGS. 49 and 50, electrode films 309 connected to electrodes of the crystal plates 308 are attached to both side surfaces of the piezoelectric element 304. Each electrode film 309 is formed by depositing, e.g. gold. Each electrode film 309 of the piezoelectric element 304 is formed in a strip extending in the direction of lamination of the crystal plates 308. A rear end portion of each electrode film 309 is extended to a free end face of the piezoelectric element 304. Power supply terminals 310 situated on the free end face of the piezoelectric element 304 are formed at the rear end portions of the respective electrode films 309. The power supply terminals 310 are provided within the range of the outside diameter of the piezoelectric element 304.

A flexible lead wire 311 is connected to the free end face of the piezoelectric element 304. The flexible lead wire 311 is formed such that a pair of conductor patterns 312 are buried in a strip-shaped elastic substrate made of a high-molecular thin film. The conductor patterns 312 of the flexible lead wire 311 are connected to the corresponding power supply terminals 310 at the rear end face of the piezoelectric element 304.

An operating member 313 for operating various working mechanisms are provided on the proximal portion 305 of the moving member 303. The various working mechanisms are operated by utilizing the movement of the moving member 303.

The operation of the piezoelectric actuator unit 301 having the above structure will now be described. At first, a description will be given of the operation of the actuator unit 301 when a first driving signal of a voltage waveform shown in FIG. 51 is applied. In this case, the piezoelectric actuator operates in the order of (a), (b) and (a) in FIG. 5A.

Initially, the moving member 303 is put in pressure contact with the stationary member 302, and it stands still while engaged frictionally with the stationary member 302. In this state, if the first driving signal of the voltage waveform shown in FIG. 51 is applied, the piezoelectric element 304 contracts slowly in the region (a) of the waveform. In the region (b) the element 304 extends quickly. This cycle is repeated.

Specifically, in the region (a) of the driving voltage waveform, since the piezoelectric element 304 contracts slowly, the moving member 303 remains frictionally fixed on the stationary member 302.

In the region (b) of the waveform, since the piezoelectric element 304 extends quickly, an impulse force for pushing the moving member 303 occurs in accordance with the quick deformation of the piezoelectric element 304 for the following reason. That is, at the time of quick deformation of the piezoelectric element 304, an inertia force due to the mass of the piezoelectric element 304 itself occurs. By the impulse pushing force exerted by the piezoelectric element 304, the moving member 303 overcomes the force due to frictional engagement with the stationary member 302 and it moves slightly to the left in FIG. 48. In this case, the moving member 303 moves slightly, while the center of gravity determined by the weight of the piezoelectric element 304 and the mass of the moving member 303 function as a steady point.

Thereafter, in the region (a), the piezoelectric element 304 contracts slowly. This process is repeated, and the center of gravity is moved little by little.

When the second driving signal of the voltage waveform shown in FIG. 52 is applied to the piezoelectric actuator unit 301, the piezoelectric actuator 301 operates in the order of (c), (d) and (c) in FIG. 5B. In the region (c) of the driving signal waveform, the piezoelectric element 304 extends slowly. In the region (d) it contracts quickly. This cycle is repeated.

Specifically, when the piezoelectric element 304 extends slowly in the region (c) of the driving signal waveform, the moving member 303 remains frictionally fixed on the contact face of the stationary member 302.

In the region (d) of the driving signal waveform, the piezoelectric element 304 contracts quickly. In this case, an impulse force for pulling the moving member 303 to the right in FIG. 48 is produced by the quick contraction of the piezoelectric element 304. Thus, the moving member 303 is moved by the impulse force exerted by the piezoelectric element 304, while the center of gravity determined by the weight of the piezoelectric element 304 and the mass of the moving member 303 function as a steady point.

In accordance with the operation of the piezoelectric actuator unit 301, the operating member 313 can operate the various working mechanisms.

Since the piezoelectric actuator comprises only the moving member 303 and piezoelectric element 304, a separate inertia member used in the conventional piezoelectric actuator can be omitted. Thus, as compared to the conventional piezoelectric actuator unit, the number of structural parts can be reduced and the processing and assembling costs reduced. In addition, the entire structure of the piezoelectric actuator unit 301 can be reduced in size. Accordingly, the actuator of this invention can easily be built in various working mechanisms. Moreover, when an external mechanical shock is applied, the shock on the piezoelectric actuator unit 301 can be reduced, and, in particular, the possibility of destruction of the piezoelectric element 304 can be lowered.

Besides, since the power supply flexible lead wire 311 is connected to the free end face of the piezoelectric element 304, the lead wire 311 can be situated within the range of the outside diameter of the piezoelectric element 304 and an increase in size of the entire apparatus can be prevented. Thus, the piezoelectric actuator can be built compactly in equipment to be used. Furthermore, since the flexible lead wire 311 is used as lead wire for supplying power to the piezoelectric element 304, the durability of the lead wire 311 against the bending due to movement of the piezoelectric element 304 is high, although the flexible lead wire 311 is thin.

Besides, a driving voltage having waveforms as shown in FIGS. 53, 54, 55 and 56 can be applied to the piezoelectric element 304. If the driving voltage of the waveform shown in FIG. 53 is applied to the piezoelectric element 304, the moving member 303 slides to the left at a point P where a time differential value of voltage is inverted discontinuously (i.e. a point where the movement of extension of the piezoelectric element 304 is changed to that of contraction steeply). The step movement amount at this time is normally less than about several μm. If the driving voltage of the waveform shown in FIG. 54 is applied to the piezoelectric element 304, the moving member 303 slides to the right at a point p where a time differential value of voltage is inverted discontinuously (i.e. a point where the movement of contraction of the piezoelectric element 304 is changed to that of extension steeply). In other time points in the waveform, the moving member 303 does not slide.

With waveforms shown in FIGS. 55 and 56, the actuator can be driven as in the cases of FIGS. 51 and 52. In the waveform shown in FIG. 55, the moving member 303 moves to the left in FIG. 48. In the waveform shown in FIG. 56, the moving member 303 moves to the right.

Figure 57:
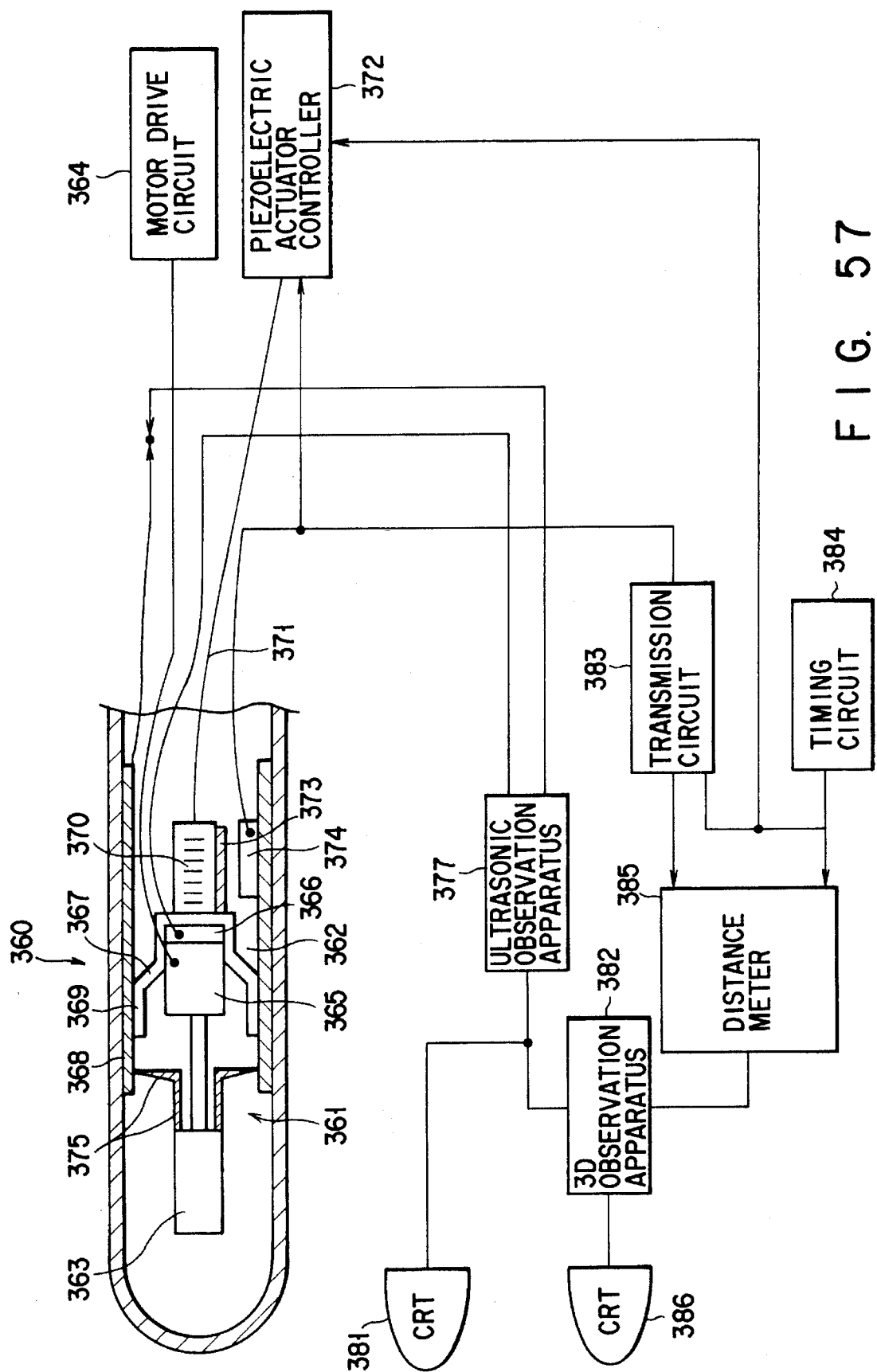
FIG. 57 shows the structure of a three-dimensional ultrasonic endoscope apparatus according to a 21th embodiment of the invention.

FIG. 57 shows a 21st embodiment of the invention wherein an ultrasonic transmission/reception unit 361 provided in a probe 360 of a three-dimensional (3D) ultrasonic endoscope apparatus is moved by a piezoelectric actuator 362, thereby effecting scan.

An ultrasonic transmission/reception element 363 is supported on a rotational shaft of a motor 365 the rotation of which is controlled by a motor driving circuit 364. The rotation of the motor 365 is detected by an encoder 366. A unit comprising the ultrasonic transmission/reception element 363, motor 365 and encoder 366 is held and moved by a moving member 367 of the piezoelectric actuator 362.

The moving member 367 has a plurality of leg portions 369 which are put in pressure contact with the inner surface of a cylindrical stationary member 368, so that the moving member 367 can slide along the inner surface of the stationary member 368. The moving member 367 can move along the rotational axis of the ultrasonic transmission/ reception element 363.

A laminated piezoelectric element 370 similar to the above-described piezoelectric element is attached to the moving member 367 such that the direction of lamination of the piezoelectric element 370 coincides with the axial direction of the probe 360. One end portion of the piezoelectric element 370 is attached to a proximal portion of the moving member 367. A lead wire 371 is connected to a free end portion of the piezoelectric element 370. The lead wire 371 is connected to a piezoelectric actuator controller 372.

A magnetic thin film 373, which is polarized in a stripe-fashion in the axial direction, is attached to a side face of the piezoelectric element 370. An MR sensor 374 is attached to the inner surface of the cylindrical stationary member 368 so as to face the magnetic thin film 373.

A pair of spring electrodes 375 are projected from the ultrasonic transmission/reception element 363. The spring electrodes 375 are held in contact with electrodes formed on the inner surface of the stationary member 368. The spring electrodes 375 are connected to an ultrasonic observation apparatus 377 via the stationary member 368.

A signal from the MR sensor 374, which senses the magnetic thin film 373 and detects the position of the moving member 367 of piezoelectric actuator 362, is supplied to a transmission circuit 383 and to piezoelectric actuator controller 372.

The ultrasonic observation apparatus 377 receives a signal from the encoder 366 and an echo signal from the ultrasonic transmission/reception element 363. An output signal from the ultrasonic observation apparatus 377 is input to a first CRT 381 and employed to display an ultrasonic two-dimensional image obtained by radial scan. The output signal from the ultrasonic observation apparatus 377 is also input to a 3D observation apparatus 382.

A reference clock signal generated by a timing circuit 384 is input to a distance meter 385 and to the piezoelectric actuator controller 372. The piezoelectric actuator controller 372 controls the operation of the piezoelectric actuator 362 in accordance with the timing of the reference clock signal.

The piezoelectric actuator controller 372 outputs a driving signal in response to the reference clock signal from the timing circuit 384 and the signal from the MR sensor 374. For example, the piezoelectric actuator controller 372 drives the piezoelectric actuator 362 by the driving signals having waveforms shown in FIGS. 51 and 52, thereby moving the moving member 367 suitably. Since this operation has been described above in detail, the details are omitted. By this operation, the rotating ultrasonic transmission/reception element 363 is moved and scanned in its axial direction.

An output signal from the distance meter 385 for measuring the distance of movement of the piezoelectric actuator 362 is input to the 3D observation apparatus 382. The 3D observation apparatus 382 executes image processing on the basis of the signal from the distance meter 385 and the signal from the ultrasonic observation apparatus 377. The output from the 3D observation apparatus 382 is input to the second CRT 386 and used for displaying 3D images.

FIG. 58 shows a modification of the ultrasonic transmission/reception unit 361 and piezoelectric actuator 362 according to the 21st embodiment. In this modification, an ultrasonic reflection mirror 391 is mounted on a rotational shaft of the motor 365, and an ultrasonic transmission/reception element 392 is situated fixedly to face the ultrasonic reflection mirror 391.

Transmission/reception of signals via the ultrasonic transmission/reception element 392 is effected through the ultrasonic reflection mirror 391. A spring electrode 393 is provided on a free end portion of the laminated piezoelectric element 370. The spring electrode 393 is put in contact with an electrode formed on the inner surface of the stationary member 368 and is connected to the piezoelectric actuator controller 372.

FIGS. 59 and 60 show a 22nd embodiment of the invention. FIG. 59 shows a part of a focus driving mechanism provided in an observation optical system 401 of a distal end portion of the insertion portion of the endoscope. Reference numeral 402 denotes a front-side distal portion body of the insertion portion of the endoscope. A focusing lens 404 is attached, with a movable lens frame 405 interposed, to a lens-barrel 403 mounted in a hollow portion of the distal portion body 402. A CCD 406 is situated on the rear side of the lens 404 in the optical axial direction. The CCD 406 is fixed on the lens-barrel 403 with a CCD fixing frame 407 interposed.

The movable lens frame 405 has an arm 409 extending in a direction perpendicular to the optical axis and passing through a notch 408 made in the lens-barrel 403. A distal end portion of the arm 409 is inserted in an actuator mounting hole defined, e.g. by a cylindrical hollow portion, and is engaged with a focus actuator.

The focus actuator includes a piezoelectric element 411 and a moving member 412 attached to the piezoelectric element 411. The moving member 412 is attached to a front end portion of the piezoelectric element 411. A rear end portion of the piezoelectric element 411 is a free end portion.

The piezoelectric element 411 is formed of a piezoelectric crystal having piezoelectric characteristics such as quartz crystal or Rochelle salt. A signal line 414 is connected to an electrode attached to the piezoelectric element 411. When a driving signal is applied to the piezoelectric element 411 via the signal line 414, the piezoelectric element 411 extends or contracts back and forth in parallel to the optical axis of the piezoelectric element 411. Accordingly, if the piezoelectric element 411 is extended or contracted quickly, the moving member 412 can be moved in accordance with the extension/contraction of the piezoelectric element 411.

A pair of upper and lower beams 415 are provided on the moving member 412. A distal end portion of each beam 415 is put in frictional engagement with the wall of the lens-barrel 403 and distal portion body 402. Furthermore, a pin 413 having an H-shaped cross section is coupled to the front end portion of the moving member 412.

An actuator coupling hole 409a is formed in a distal end portion of the arm 409. A stepped narrow portion 418 of pin 413 attached to the front end of the moving member 412 is engaged in the actuator coupling hole 409a with a slight gap, whereby the arm 409 is engaged with the pin 413. Since the moving member 412 is connected to the movable lens frame 405 via the pin 413 and arm 409, the movable lens frame 405 and focus lens 404 are moved according to the movement of the moving member 412.

when the piezoelectric element 411 is extended or contracted slowly, the moving member 412 can be held to stand still by frictional engagement between the beams 415 and the wall face.

A linear encoder 417 fixed on the wall of the distal portion body 402 is connected to the distal end portion of the beam 415 via a coupling rod 416. The linear encoder 417 detects movement of the distal end portion of the beam 415.

In this embodiment, the stepped narrow portion 418 of pin 413 is engaged in the coupling hole 409a of arm 409 with a slight gap, whereby the arm 409 is engaged with the pin 413. In this case, as shown in FIG. 59, the width (length) of the narrow portion 418 of pin 413 along the optical axis is greater than the width of the distal end portion of the arm 409. A small gap Δ (e.g. Δ=about 0.05 mm) is provided between both ends of the narrow portion 418 of pin 413 and the distal end portion of the arm 409. Thus, if the arm 409 or movable lens frame 405 is inclined with respect to the direction of movement, a resultant force is absorbed by a contact portion between, e.g. the lens frame 405 and lens-barrel 403, thereby preventing the force due to inclination from being transmitted to the moving member 412 via the pin 413.

More specifically, since the gap Δ is provided at the connecting area between the pin 413 and arm 409 which constitute the transmission mechanism for transmitting the driving force from the piezoelectric element 411 to the movable lens frame 405, the force due to possible inclination of the movable lens frame 405 is not transmitted to the pin 413 or moving member 412 by virtue of the gap Δ.

Accordingly, the inclination of the lens frame 405 is not transmitted to the moving member 412 and the force component which is not transmitted is absorbed by the contact portion between the lens frame 405 and lens-barrel 403. Thus, the frictional force at the distal end portion of each beam 415 does not vary. As a result, the moving member 412 moves and the thick portion of pin 413 at both sides of the narrow portion 418 pushes the distal end portion of the arm 409. Thereby, the movable lens frame 405 can be smoothly moved in parallel to the optical axis of the focus lens 404.

FIG. 60 shows the structure of a driving system for the piezoelectric element 411. An output signal from the CCD 406 is input to an image signal processing circuit 421, and an image signal is produced and output to a monitor (not shown). A luminance signal component of the image signal output from the image signal processing circuit 421 is input to a piezoelectric element controller 422. The piezoelectric element controller 422 also receives movement information detected by the linear encoder 417.

The piezoelectric element controller 422 extracts a high-spatial-frequency portion from the luminance signal component, and determines whether a focused state has been achieved. If the focusing lens is not in the focused state, the driving signal for driving the piezoelectric element 411 is applied to the piezoelectric element 411. If the piezoelectric element control circuit 422 determines the focused state, the output of the driving signal is stopped.

The operation of the focusing drive mechanism will now be described.

If the voltage pulse as shown in FIG. 4A or 4B is applied, as a driving signal, to the piezoelectric element 411, the piezoelectric element 411 exerts an impulse force to the moving member 412 and the moving member 412 slides slightly relative to the lens-barrel 403. If the voltage pulse is applied repeatedly, the moving member 412 can be moved over a long distance.

When the arm 409 of lens frame 405 is pushed by the thick portion of pin 413, the lens 404 moves in accordance with movement of the moving member 412. At this time, based on video information from the CCD 406 and position information on the moving member 412 from the linear encoder 417, the application of the voltage pulse to the piezoelectric element 411 is controlled and the focused state can be automatically achieved. This technique is applicable not only to focusing but also to zooming.

Figure 61:
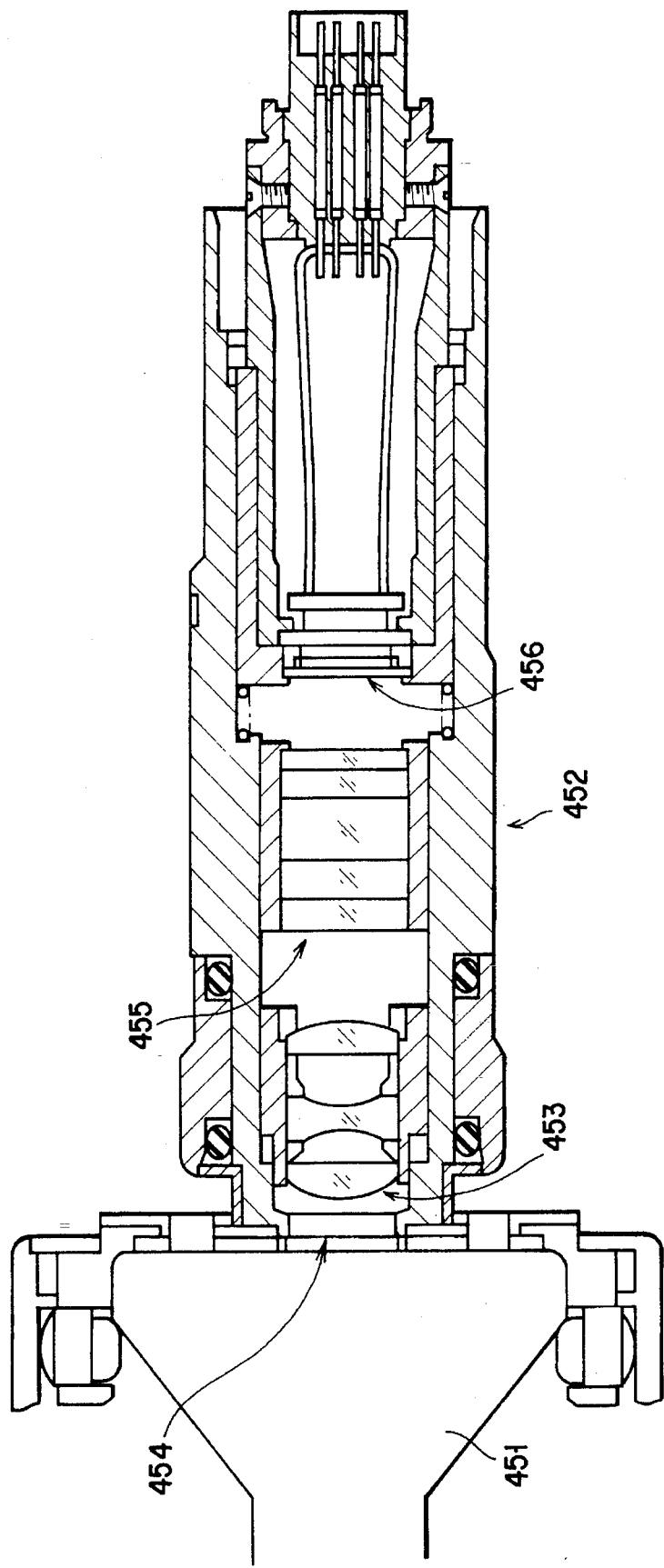
FIG. 61 is a cross-sectional view showing an external camera having an aperture apparatus according to a 23rd embodiment of the invention.
Figure 62:
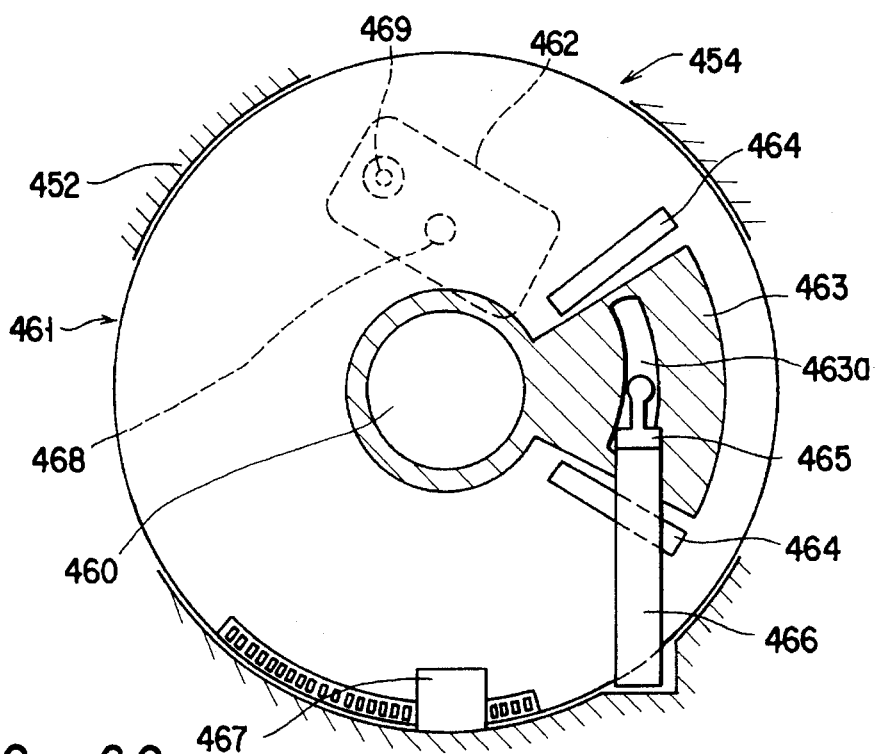
FIG. 62 shows schematically the structure of the aperture apparatus according to the 23rd embodiment.

FIGS. 61 and 62 show a 23rd embodiment of the invention. FIG. 61 shows an external camera 452 which is detachably coupled to an eyepiece 451 of an endoscope. An aperture device 454 is situated in front of an objective lens system 453 of the external camera 452. In addition, an optical filter 455 and a CCD 456 are attached behind the objective lens system 453.

FIG. 62 shows the aperture device 454. The aperture device 454 has a rotary plate 461 which is rotatable relative to the body of the external camera 452. An aperture hole 460 is formed at a center of the rotary plate 461. The rotary plate 461 is supported such that it is put in loose frictional engagement with the body of the external camera 452.

A plurality of aperture blades 462 (only one is shown in FIG. 62) are rotatably attached to the rotary plate 461. Each aperture blade 462 is rotatably fixed to the rotary plate 461 by means of a holding pin 468. In addition, each aperture blade 462 is rotated by a driving pin 469 fixed on the external camera 452.

An abutment portion 463 is rotatably provided on that surface of the rotary plate 461, which is opposite to the surface on which the aperture blades 462 are situated. A small gap is provided between the abutment portion 463 and rotary plate 461. An arcuated groove 463a is formed in the abutment portion 463.

A vibrating shaft 465 is put in tight frictional engagement in the arcuated groove 463a of the abutment portion 463. One end portion of a piezoelectric element 466 in the extension/contraction direction is fixed to the vibrating shaft 465. The other end portion of the piezoelectric element 466 in the extension/contraction direction is fixed on the body of the external camera 452. When the piezoelectric element 466 deforms quickly, an impulse force is applied from the piezoelectric element 466 to the abutment portion 463 and the abutment portion 463 is rotated.

Projections 464 are attached on the rotary plate 461 on both sides of the abutment portion 463. These projections 464 may abut on the abutment portion 463 to apply a rotational force to the rotary plate 461. Reference numeral 467 denotes an encoder provided at an outer peripheral portion of the rotary plate 461.

The operation of the above structure will now be described.

If the driving voltage pulse is applied to the piezoelectric element 466, the abutment portion 463 slides and rotates relative to the vibrating shaft 465 and abuts on one of the projections 464. At this time, the rotary plate 461 receives a rotational force from the projection 464 and rotates.

As a result, the aperture blades 462 receive the rotational force and rotate on the holding pins 468, thereby opening/closing the aperture hole 460. In this embodiment, too, automatic aperture adjustment is effected by the control system as shown in FIG. 60.

The advantage of this embodiment is as follows: since there is a gap between the optical element and the member for transmitting force from the piezoelectric element to the optical element, the piezoelectric element does not incline even if the optical element inclines within the optical apparatus, and therefore the characteristics of the driving apparatus do not change greatly.

Even if the vibrating shaft 465 and the rotary plate 461 are put in direct frictional engagement, the same aperture mechanism can be achieved. Moreover, even if the vibrating shaft 465 is replaced by a magnet, the same aperture mechanism can be achieved.

Figure 63:
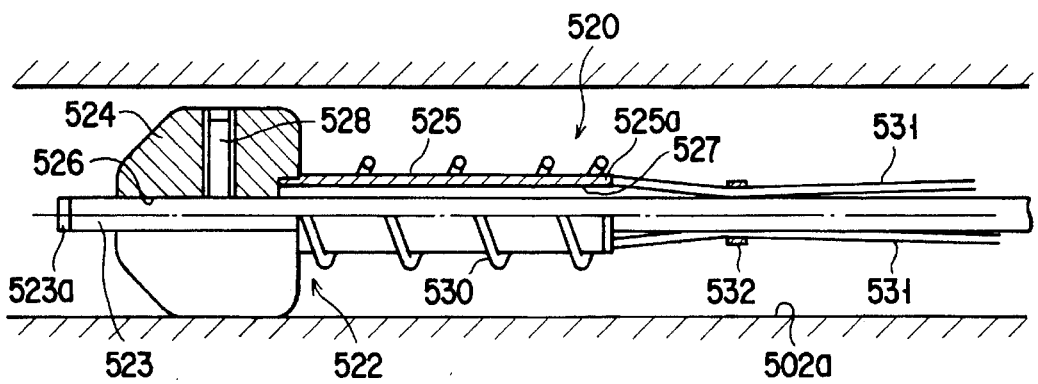
FIG. 63 is a partial cross-sectional view of a self-advancing apparatus according to a 24th embodiment of the invention.

FIG. 63 shows a 24th embodiment of the invention. In FIG. 63, reference numeral 520 denotes a self-advancing apparatus for guiding movement of an insertion portion 523 of an endoscope within a tube passage 502a.

Specifically, a movable actuator 522 of this self-advancing apparatus 520 includes a front-end member (or moving member) 524 and a hollow laminated piezoelectric element (PZT: lead zirconate titanate) 525 having one end portion connected to the front-end member 524.

Insertion holes 526 and 527 for insertion of the insertion portion 523 of the direct-view type endoscope are formed within the front-end member 524 and piezoelectric element 525. The insertion hole 526 of the front-end member 524 has a small diameter so that the insertion portion 523 of the endoscope can be passed tightly, and the insertion hole 527 of the piezoelectric element 525 has a large diameter so that the insertion portion 523 of the endoscope can be passed loosely.

The front-end member 524 is provided with a fixing screw 528 for fastening the insertion portion 523 inserted in the hole 526. As is shown in FIG. 63, the insertion portion 523 of the endoscope is passed into the insertion hole 526 in the front-end member 524 through the insertion hole 527 in the hollow laminated piezoelectric element 525, and the insertion portion 523 is fastened by the screw 528. A tip portion 523a of the insertion portion 523 for direct-view observation is exposed from the front end face of the front-end member 524 and is directed to the front.

A coil 530 is wound around the hollow laminated piezoelectric element 525 to protect the piezoelectric element 525. Electrodes 525a of the laminated piezoelectric element 525 are connected to voltage-applying lead wires 531. The lead wires 531 are extended rearwards within the tube passage 502a along the insertion portion 523 of the endoscope. The lead wires 531 are fixed on the outer periphery of the insertion portion 523 by a fixing member 532. In this way, the lead wires 531 are connected to a driving power supply (not shown), and voltage applied to the laminated piezoelectric element 525 is controlled by control means.

The outside diameter of the front-end member 524 of the self-advancing apparatus 520 is greater than that of the laminated piezoelectric element 525. The front-end member 524 is put in frictional contact with the inner surface of the tube passage 502a, while the rear-side portion of the laminated piezoelectric element 525 is not put in contact with the inner surface of the tube passage 502a. In FIG. 63, although the front-end member 524 is not partly put in contact with the inner surface of the tube passage 502a, the front-end portion 524 may have any shape if a frictional force is produced between the front-end member 524 and the inner surface of the tube passage 502a. There may be a gap partly between the front-end member 524 and the inner surface of the tube passage 502a, as shown in FIG. 63, or the front-end member 524 may entirely be put in contact with the inner surface of the tube passage 502a.

When the self-advancing apparatus 520 according to this embodiment moves within the tube passage 502a, the insertion portion 523 of the endoscope, which is fixed to the front-end member 524, is also moved along the tube passage 502a.

Figure 64:
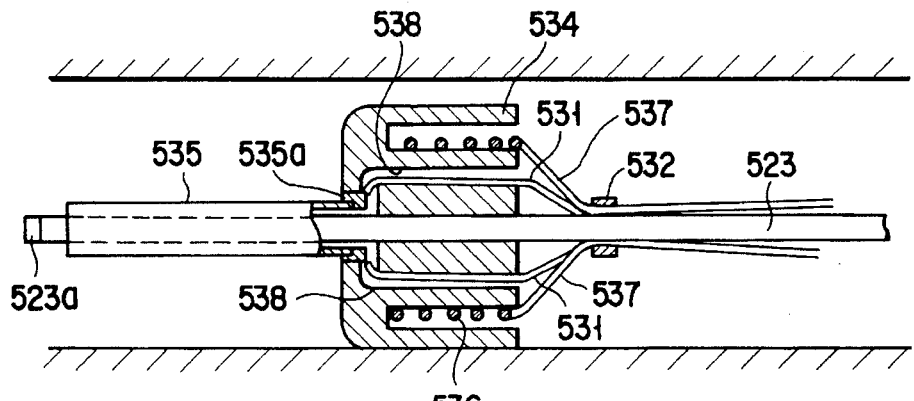
FIG. 64 is a partial cross-sectional view of a self-advancing apparatus according to a 25th embodiment of the invention.

FIG. 64 shows a 25th embodiment of the invention wherein a frictional force acting between a moving member 534 and the inner surface of the tube passage 502a is increased by magnetism.

In this embodiment, a hollow laminated piezoelectric element 535 is situated on the front side, and a moving member 534 is situated on the rear side. As has been described above, the insertion portion 523 of the endoscope is inserted through the moving member 534 and piezoelectric element 535, and the insertion portion 523 is fixed on the moving member 534, e.g. by a screw (not shown). The moving member 534 is made of a magnetic material (but not necessarily be made of a magnetic material).

An electromagnetic coil 536 is arranged concentrically within the moving member 534 about the axis thereof. Thereby, the moving member 534 is constituted as an electromagnet. Lead wires 537 connected to the electromagnetic coil 536 and voltage-applying lead wires 531, which are connected to electrodes 535a of the laminated piezoelectric element 535, as described above, are gathered and fixed on the outer periphery of the insertion portion 523 by means of the fixing member 532. The voltage-applying lead wires 531 are extended rearwards through a hole formed within the moving member 534.

In this embodiment, the moving member 534 is constituted as an electromagnet. When the apparatus according to this embodiment is run, as described above, the electromagnetic coil 536 is excited and the moving member 534 is magnetically attracted on the inner surface of the tube passage 502a. Since the frictional force between the moving member 534 and the inner surface of the tube passage 502a can be increased, the stable operation is achieved. In addition, since the frictional force acting on the wall of the tube passage 502a can be increased, the mass of the moving member 534 can be decreased. Besides, the running speed and running power can be enhanced. Moreover, when the tube passage, in which the apparatus is to be run, is not horizontal, for example, when the tube passage is situated vertically or inclined, the apparatus can easily be run along the inner surface of the tube passage. The other features of this embodiment are the same as those of the preceding embodiment.

In this embodiment, the moving member may be constituted by a permanent magnet, instead of the electromagnet. In the case where the moving member is constituted by the electromagnet, the electromagnet may be activated only in the step in which the moving member is to be made stationary, thereby stabilizing the stationary state of the moving member.

FIG. 65 shows a 26th embodiment of the invention. In this embodiment, the electromagnet used in the 25th embodiment for increasing the frictional force is replaced with a balloon 539 which is provided on the outer periphery of the moving member 534. The inside of the balloon 539 communicates with a supply passage 540 and an exhaust passage 541 formed within the moving member 534. The supply passage 540 is connected to a supply tube 542 and the exhaust passage 541 is connected to an exhaust tube 543. The supply tube 542 and exhaust tube 543, along with voltage-applying lead wires 531, are fixed on the outer periphery of the insertion portion 523.

A pressurized fluid is supplied to the balloon 539 through the supply tube 542, thereby expanding the balloon 539 and putting the same in pressure contact with the inner surface of the tube passage 502a in which the apparatus moves. Thereby, the frictional force acting on the inner surface of the tube passage 502a is increased. In this embodiment, the tube passage 502a, in which the self-advancing apparatus moves, may be formed of a magnetic material or a non-magnetic material.

FIG. 66 shows a self-advancing apparatus according to a 27th embodiment of the invention. This self-advancing apparatus is constituted as a medical-treatment capsule 550 which can move to the stomach, duodenum, etc.

The medical-treatment capsule 550 includes a capsule body 552 functioning as a moving member engageable with the inner surface of a body cavity 502b and movable actuators 556a and 556b. Each movable actuator 556a, 556b comprises an axially extendible/contractible laminated piezoelectric element 555a, 555b having one end portion attached to a fixed portion 554 projecting inwards from the inner surface of the capsule body 552. Lead wire bundles 551a and 551b connected to electrodes formed on the rear end portions of the laminated piezoelectric elements 555a and 555b are extended rearwards and combined and led to the outside of the capsule body 552 as an insulated cord 551. The insulated cord 551 is connected to a driving power supply (not shown), and the voltage applied to the laminated piezoelectric elements 555a and 555b is controlled by the control means.

In this embodiment, a pH detector 553 is situated at the tip portion of the capsule body 552. An amplifier 557, a telemetry unit 558 and a power supply 559, which are electrically connected to the pH detector 553, are contained within the capsule body 552. Information is transmitted to and received from the outside via the telemetry unit 558. The capsule body 552 has an entirely sealed structure. The area where the pH detector 553 is situated, as well as the area where the insulated cord 551 is led out, is sealed.

Like the preceding embodiment, the medical-treatment capsule 550 comprises two movable actuators 556a and 556b. By activating these actuators 556a and 556b independently, the capsule 550 can be moved in a desired direction. For example, if the movable actuators 556a and 556b are simultaneously driven in the same direction at the same velocity, the medical-treatment capsule 550 moves straight. If only one of the actuators 556a and 556b is driven or both actuators 556a and 556b are driven in opposite directions, the capsule 550 is rotated.

In this embodiment, two movable actuators are provided, but three or more movable actuators may be provided if necessary.

FIGS. 67 to 69 show a 28th embodiment of the present invention. FIG. 67 shows an observation optical system built in a solid body 563a of a distal-end structure 563 in an insertion portion 562 of an endoscope 561. An actuator apparatus according to this embodiment is applied to driving means for an aperture mechanism 564 of the observation optical system.

In FIG. 67, reference numeral 565 denotes an observation window portion, 566 a plurality of objective lenses built in the observation optical system, and 567 an imaging CCD.

A body 568 of the aperture mechanism 564 is situated on the front side of the object lens group 566. As is shown in FIGS. 68 and 69, the aperture mechanism 568 is provided with a rotary plate 569 and a plurality of aperture blades 570.

Stopper pins 571 and driving pins 572 are projected from the rotary plate 569. The number of the stopper pins 571 and the number of the driving pins 572 are, respectively, equal to that of the aperture blades 570. Support pins 573, the number of which is equal to that of the aperture blades 570, are fixed on the distal-end structure body 563a. The aperture blades 570 are engaged with the driving pins 572 on the rotary plate 569 and with the support pins 573 on the distal-end structure body 563a.

The stopper pins 571 are fitted in recesses 574 formed in the distal-end structure body 563a. The recesses 574 are defined by substantially arcuated grooves for restricting the degree of rotation of the rotary plate 569. When the rotary plate 569 is rotated, the aperture blades 570 are rotated on the support pins 573 by the driving pins 572. If the rotary plate 569 rotates to a preset degree, the stopper pins 571 abut on the end portions of the arcuated grooves of the recesses 574. Thus, the rotation of the rotary plate 569 is restricted.

A slope portion 575 inclined to the direction of rotation is cut in an outer peripheral portion of the rotary plate 569. An actuator 576 serving as driving means for the aperture mechanism 564 is put in contact with the slope portion 575 of the rotary plate 569. The actuator 576 is situated within a tube-shaped cavity 577 formed on a side of the objective lens group 566. The actuator 576 is movable back and forth in a direction perpendicular to the direction of rotation of the rotary plate 569.

The rotary plate 569 is surrounded by the distal-end structure body 563 so as to be immovable except in a rotational direction. A return spring 578 is provided between the rotary plate 569 and the distal-end structure body 563a. The return spring 578 gains a spring force from the rotation of the rotary plate 569.

The actuator 576 operates according to the same principle as in the preceding embodiments. In FIGS. 67 and 68, a stopper (not shown) for restricting the rightward movement of the actuator 576 is provided on the right side of the actuator 576.

In operation of the aperture mechanism 564 having the above structure, if the actuator 576 moves to the left in FIGS. 67 and 68, it pushes the slope portion 575 of the rotary plate 569 and rotates the rotary plate 569. As a result, the aperture blades 572 are closed.

If the actuator 576 is moved to the right in FIGS. 67 and 68 in the state in which the rotary plate 569 has been rotated to the closure position of the aperture blades 572, the rotary plate 569 is rotated by the spring force of the return spring 578 and the aperture blades 572 are opened. In accordance with the opening/closing operation of the aperture blades 572, the amount of light incident on the objective lens group 566 is controlled and the depth-of-field is adjusted.

With the above structure, the depth-of-field of the endoscope 561 in the observation visual field can be varied between the near-point observation mode and far-point observation mode, and a wider observation range can be obtained.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An actuator apparatus for driving a movable portion within an endoscope, said apparatus comprising:

a moving member put in slidable frictional engagement with a base of said endoscope, said moving member having coupling means for coupling with said movable portion within the endoscope;

a deformation element coupled to said moving member, said deformation element being able to take a basic shape and a deformed shape different from said basic shape, said deformation element and said moving member alone constituting a body of said actuator apparatus; and driving means for causing quick deformation in said deformation element, enabling said deformation element to apply an impulse force to said moving member, thereby moving said moving member against a frictional engagement force acting between said base and said moving member.

2. The actuator apparatus according to claim 1, wherein said driving means causes a difference between a deformation speed of a first deforming operation, in which the shape of said deformation element is changed from said basic shape to said deformed shape, and a deformation speed of a second deforming operation, in which the shape of said deformation element is changed from said deformed shape to said basic shape, whereby at a high-speed deformation time at which the deformation speed is higher, said moving member is moved by an inertia force of said deformation element acting on said moving member against the frictional engagement force acting between said base and said moving member, and at a low-speed deformation time at which the deformation speed is lower, said moving member is kept stationary by the frictional engagement force acting between said base and said moving member.

3. The actuator apparatus according to claim 1, wherein said base is formed of a solid portion of the endoscope.

4. The actuator apparatus according to claim 3, wherein said endoscope includes an insertion portion having a distal end portion and a proximal end portion, and said moving member is movable substantially along an axis of said insertion portion of the endoscope.

5. The actuator apparatus according to claim 4, wherein said solid portion of the endoscope constitutes a distal-end structure portion provided at said distal end portion of the insertion portion, said distal-end structure portion including a lens of at least one of an observation optical system and an illumination optical system, and said movable portion is constituted by a moving mechanism for moving said lens along the optical axis of said lens.

6. The actuator apparatus according to claim 3, wherein said solid portion of the endoscope constitutes a distal-end structure portion provided at said distal end portion of the insertion portion, said distal-end structure portion including an observation optical system, and said movable portion is constituted by an aperture mechanism for adjusting the amount of light incident on said observation optical system.

7. The actuator apparatus according to claim 3, wherein said endoscope includes a pair of observation optical units for stereoscopic observation, and said movable portion is constituted by a convergence angle adjusting mechanism for adjusting a convergence angle defined between the optical axes of incident light beams incident on said pair of observation optical units.

8. The actuator apparatus according to claim 3, wherein said endoscope includes an insertion portion having a distal end portion and a proximal end portion, and said solid portion of the endoscope constitutes a distal-end structure portion provided at said distal end portion of the insertion portion, said endoscope further includes:

an operating unit coupled to said proximal end portion of the insertion portion, said operating unit having a treatment instrument insertion portion for insertion of a treatment instrument, a treatment instrument lead-out portion, provided at said distal-end structure portion, for leading said treatment instrument out of the insertion portion, and a treatment instrument insertion passage, provided within said insertion portion, for insertion of the treatment instrument, said treatment instrument insertion passage having one end portion coupled to said treatment instrument insertion portion and the other end portion coupled to said treatment instrument lead-out portion, and said movable portion is constituted by lead-out direction adjusting means, provided at said treatment instrument lead-out portion, for adjusting the direction in which the treatment instrument is led from the treatment instrument insertion passage to the outside.

9. The actuator apparatus according to claim 1, wherein said endoscope includes an insertion portion having a distal end portion and a proximal end portion, said insertion portion having a solid distal-end structure portion at said distal end portion, said endoscope further includes:

an operating unit provided at said proximal end portion of the insertion portion, said operating unit having a treatment instrument insertion portion for insertion of a treatment instrument, a treatment instrument lead-out portion, provided at said distal-end structure portion, for leading said treatment instrument out of the insertion portion, and a treatment instrument insertion passage, provided within said insertion portion and said operating unit, for insertion of the treatment instrument, said treatment instrument insertion passage having one end portion coupled to said treatment instrument insertion portion and the other end portion coupled to said treatment instrument lead-out portion, and said movable portion is constituted by a moving mechanism for moving the treatment instrument inserted in said treatment instrument insertion passage along said treatment instrument insertion passage.

10. The actuator apparatus according to claim 1, wherein said endoscope includes an insertion portion having a distal end portion and a proximal end portion, said insertion portion having a solid distal-end structure portion at said distal end portion, and an operating unit coupled to said proximal end portion of the insertion portion, and said movable portion is constituted by a direction-changing mechanism coupled to said distal-end structure portion and operated to be enabled to change the direction of said distal-end structure portion.

11. An actuator apparatus for driving an object to be moved, comprising:

a body consisting essentially of:

a moving member in slidable frictional engagement with a portion acting as a base of movement of said object to be moved, said moving member being coupled to said object one of (i) integrally and (ii) by means of coupling means; and a deformation element coupled to said moving member, said deformation element being able to take a basic shape and a deformed shaped different from said basic shape, said deformation element and said moving member alone forming the body of said actuator apparatus., without any weight being added thereto; and driving means for causing quick deformation in said deformation element, enabling said deformation element to apply an impulse force to said moving member, thereby moving said moving member against a frictional engagement force acting between said base and said moving member.

12. The actuator apparatus according to claim 11, wherein said driving means causes a difference between a deformation speed of a first deforming operation, in which the shape of said deformation element is changed from said basic shape to said deformed shape, and a deformation speed of a second deforming operation, in which the shape of said deformation element is changed from said deformed shape to said basic shape, whereby at a high-speed deformation time at which the deformation speed is higher, said moving member is moved by an inertia force of said deformation element acting on said moving member against the frictional engagement force acting between said base and said moving member, and at a low-speed deformation time at which the deformation speed is lower, said moving member is kept stationary by the frictional engagement force acting between said base and said moving member.

13. The actuator apparatus according to claim 11, wherein said deformation element comprises at least one of a piezoelectric element and an electrostrictive element.

14. The actuator apparatus according to claim 13, wherein said driving means includes control means for driving said deformation element at a predetermined cycle, said control means controlling the deformation of the deformation element by inverting the direction of deformation of the deformation element within one cycle, whereby an acceleration applied by said deformation element to said moving member is made sufficient for the moving member to slide relative to said base.

15. The actuator apparatus according to claim 13, wherein said deformation element is formed by laminating a plurality of structural elements in the direction of deformation.

16. The actuator apparatus according to claim 13, wherein said deformation element includes a cylindrical body.

17. The actuator apparatus according to claim 13, wherein said driving means includes a lead wire for supplying electric power to said deformation element, and said lead wire is slackened at least to such a degree as to correspond to the amount of movement of the body of the actuator apparatus.

18. The actuator apparatus according to claim 13, wherein said driving means includes a lead wire for supplying electric power to said deformation element, and said lead wire is formed of a flexible cable in which a conductor wire is integrally formed on an insulated film.

19. The actuator apparatus according to claim 13, wherein said driving means includes a lead wire for supplying electric power to said deformation element, and said deformation element has a power supply terminal connected to said lead wire, said power supply terminal being formed on a rear end face of said deformation element in the direction of deformation.

20. The actuator apparatus according to claim 13, further comprising movement-direction restricting means for preventing said moving object from moving in a direction other than the direction of movement.

21. The actuator apparatus according to claim 13, wherein said deformation element includes a contact electrode put in slidable contact with an electrode plate provided on said base.

22. The actuator apparatus according to claim 11, wherein said moving member includes mechanical frictional engagement means for putting said moving member in slidable frictional engagement with said base by mechanical elastic force.

23. The actuator apparatus according to claim 22, wherein said moving member includes a pair of beams extending in the direction of movement of the moving member, these beams being coupled to each other at one end, and said deformation element is situated between said beams of the moving member, and one end portion of said deformation element is fixed between coupling portions of said beams.

24. The actuator apparatus according to claim 11, wherein said moving member includes magnetic frictional engagement means for putting the moving member in slidable frictional engagement with said base by magnetic force.

25. The actuator apparatus according to claim 11, wherein said moving member includes frictional engagement means for putting said moving member in slidable frictional engagement with said base by a deforming action of a piezoelectric element.

26. The actuator apparatus according to claim 11, wherein said moving member includes operating direction restricting means at a coupling portion with said object to be moved, said operating direction restricting means absorbing movement in said actuator apparatus in a direction other than the direction of movement of said moving object.

27. The actuator apparatus according to claim 11, wherein said moving member has a low-rigidity surface having a lower surface rigidity than said base.

28. The actuator apparatus according to claim 11, wherein said driving means includes a pulse voltage supply means for supplying pulse voltage to said deformation element, said pulse voltage supply means including movement speed varying means for varying the speed of movement of said moving member by varying the number of pulses of said pulse voltage per unit time, without varying the rising speed or falling speed of a waveform of said supplied pulse voltage.

29. The actuator apparatus according to claim 11, wherein said object to be moved is an optical unit.

30. The actuator apparatus according to claim 29, wherein said optical unit comprises a lens of an observation optical system, focus detecting means for said lens, means for detecting the position of said lens, and focus position adjusting means for adjusting the focus position of said lens on the basis of a detection result from said lens position detecting means, and said object to be moved includes said focus position adjusting means.

31. The actuator apparatus according to claim 29, wherein said optical unit includes an auto-focus system comprising a lens of an observation optical system, an aperture mechanism for adjusting the amount of light incident on said observation optical system, light amount detecting means for detecting the amount of light from an object to be observed of said observation optical system, and aperture adjusting means for adjusting the aperture of said aperture mechanism on the basis of a detection result from said light amount detecting means, and said movable portion includes said aperture adjusting means.

32. The actuator apparatus according to claim 11, wherein said object to be moved is an insertion portion of an endoscope.

33. The actuator apparatus according to claim 11, wherein said object to be moved includes a rotary body supported rotatably on said base.

34. The actuator apparatus according to claim 11, wherein said object to be moved includes a joint member comprising at least one pair of flexible elements and coupling means for flexibly coupling said flexible elements.

* * * * *